United States Patent [19]

Takemura et al.

[11] Patent Number: 4,763,133
[45] Date of Patent: Aug. 9, 1988

[54] REFLECTOR FOR CIRCULAR POLARIZATION ANTENNA AND PROCESS FOR THE PRODUCTION THEREOF

[75] Inventors: Kenji Takemura, Saitama; Mikio Kobayashi, Kanagawa; Mitsunobu Machida, Kanagawa; Hirokazu Yoshida, Kanagawa, all of Japan

[73] Assignee: Showa Denko Kabushiki Kaisha, Tokyo, Japan

[21] Appl. No.: 694,193

[22] Filed: Jan. 23, 1985

[30] Foreign Application Priority Data

| Jan. 23, 1984 | [JP] | Japan | 59-8535 |
| Jan. 23, 1984 | [JP] | Japan | 59-8536 |
| Jan. 24, 1984 | [JP] | Japan | 59-9465 |
| Jan. 24, 1984 | [JP] | Japan | 59-9467 |
| Jan. 30, 1984 | [JP] | Japan | 59-13517 |
| Jan. 31, 1984 | [JP] | Japan | 59-14478 |
| Feb. 10, 1984 | [JP] | Japan | 59-21856 |
| Feb. 17, 1984 | [JP] | Japan | 59-26945 |
| Mar. 7, 1984 | [JP] | Japan | 59-41982 |
| Mar. 28, 1984 | [JP] | Japan | 59-58346 |
| Apr. 5, 1984 | [JP] | Japan | 59-66652 |
| Apr. 6, 1984 | [JP] | Japan | 59-67456 |

[51] Int. Cl.$^4$ .......................................... H01Q 15/14
[52] U.S. Cl. .................................................. 343/912
[58] Field of Search ................................ 343/840, 912

[56] References Cited

U.S. PATENT DOCUMENTS

| 2,747,180 | 5/1956 | Brucker | 343/912 |
| 2,948,896 | 8/1960 | Hart | 343/912 |
| 3,150,030 | 9/1964 | Mondano | 343/912 |
| 3,536,800 | 10/1970 | Hubbard | 264/104 |
| 4,030,953 | 6/1977 | Rutschow et al. | 343/912 |
| 4,188,358 | 2/1980 | Withoos et al. | 264/255 |

FOREIGN PATENT DOCUMENTS 2120854  12/1983  United Kingdom ............... 343/912

OTHER PUBLICATIONS

Grant, Howard A., "Direct Broadcast From Lower Power Satellites", Conf. Rec. Int. Conf. Commun. vol. 1/2 (1981), pp. 26.1.1–26.1.5.
Millar, G. H. and Gandy, C., "Antennas for Direct Reception of Broadcasts from Satellites", I.E.E. Conf. Publ. (219) pp. 365–368 (1983).

Primary Examiner—William L. Sikes
Assistant Examiner—Robert E. Wise
Attorney, Agent, or Firm—Sughrue, Mion, Zinn, Macpeak & Seas

[57] ABSTRACT

A reflector for a circular polarization antenna is described, comprising (A) a thermoplastic resin layer having a thickness of from 5 μm to 5 mm or a coating layer having a thickness of 5 μm to 1 mm and good weather resistance;

(B) a metallic layer having a thickness of from 5 μm to 1 mm; and (C) an inorganic filler-containing thermoplastic resin layer having a thickness of from 500 μm to 15 mm and an inorganic filler content of from 10 to 80% by weight.

37 Claims, 1 Drawing Sheet

U.S. Patent    Aug. 9, 1988    4,763,133
FIG.1
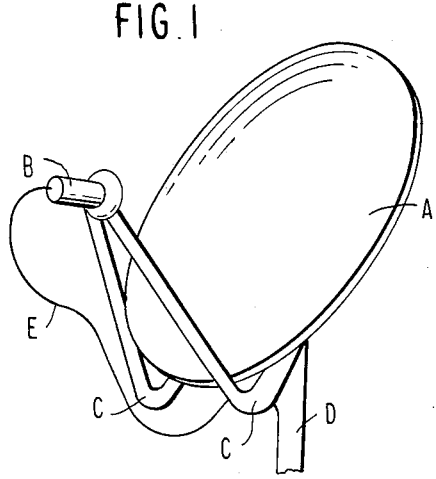
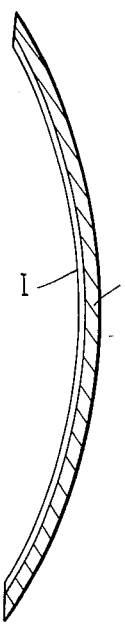
FIG.2
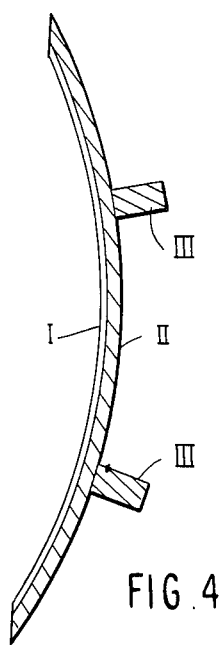
FIG.4
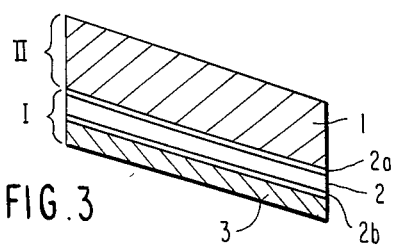
FIG.3
FIG.5
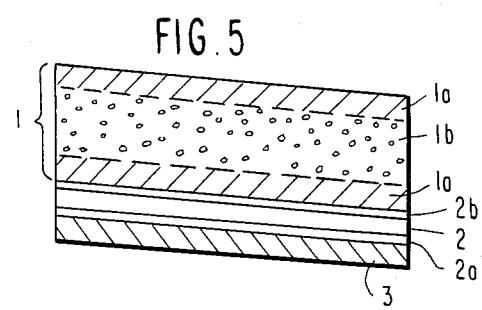
FIG.6
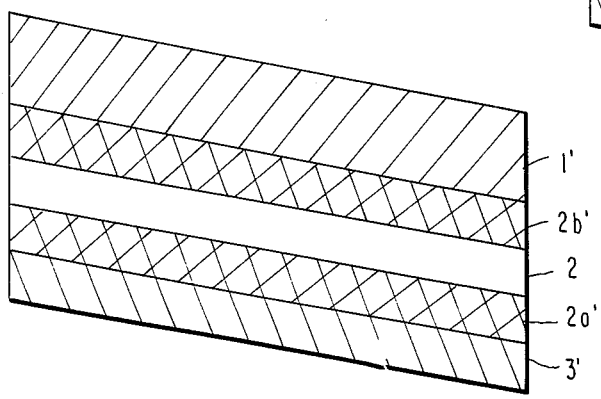
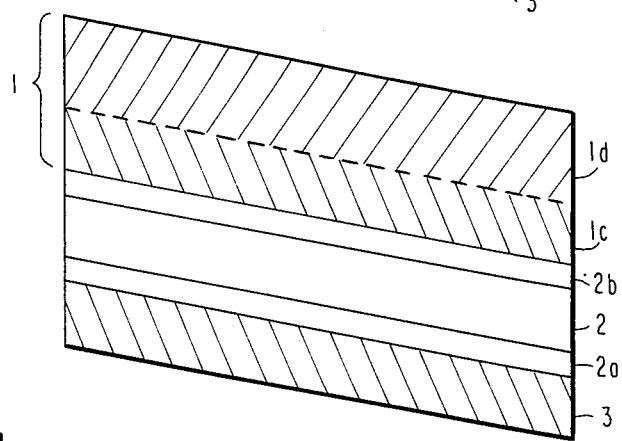
FIG.7

REFLECTOR FOR CIRCULAR POLARIZATION ANTENNA AND PROCESS FOR THE PRODUCTION THEREOF

FIELD OF THE INVENTION

The present invention relates to a reflector for a circular polarization antenna and a process for the production thereof. More particularly, it is concerned with a reflector for a circular polarization antenna comprising a thermoplastic resin layer or other coating layer having good weather resistance and an inorganic filler-containing thermoplastic resin layer with a metallic layer sandwiched therebetween, and a process for producing the reflector.

BACKGROUND OF THE INVENTION

Space communications using a geostationary satellite, including transmissions of such as high quality TV signals, still image signals, PCM audio signals and/or facsimile signals, are beginning to be put into practical use in many countries of the world (see *I.E.E. Conf. Publ.*, (219), 365–368 (1983) and *Conf. Rec. Int. Conf. Commun.*, Vol. 1/2, 26.1.1–26.1.5 (1981)). However, with a large number of such geostationary satellites in the single orbit, there is a significant signal interference thereamong. In order to reduce such interference, it may be helpful to provide to a receiving antenna a channel discrimitation function utilizing the cross polarization if linear polarization is employed. That is, it may be enough to match a plane of polarization of the antenna to a plane of horizontal or vertical polarization from the satellite. However, it is difficult to match the polarization planes to each other, due, for example, to deviations of the plane of polarization from the satellite by ionspheric disturbance and/or of the propagation path and the incident angle of the wave at the receiving site.

However, if a circular polarization is used for the satellite communication, the channel discrimination can be easily achieved by merely directing an antenna to a desired satellite correctly. Such adjustment of the direction of the receiving antenna is very easy compared with the case of the linear polarization.

For this reason, in future satellite communication systems, the circular polarization is expected to be generally used. Conventionally used circular polarization antennas include those of a conical horn type, a dipole type comprising two dipoles combined together orthogonally, and a parabola type using any of the above type antenna as a primary radiator.

In general, the parabolic antenna is made of a metallic plate or metallic net. Since, however, the metal is subjected to corrosion, it is necessary to use anticorrosive alloys or to apply anticorrosive coating. These anticorrosive alloys, however, are expensive. In the case of applying an anticorrosive coating, it is necessary to apply repeated coatings in order to provide satisfactory anticorrosion properties. This results in high production costs. Furthermore, if such an antenna is used for long periods of time, the coating is deteriorated. An attempt has been made to produce a wavereflecting plate comprising a thermoplastic resin (e.g., an unsaturated polyester resin) layer and a glass fiber layer, the surface of which has been metallized as a wave-reflecting layer (see U.S. Pat. Nos. 4,188,358 and 3,536,800). This is complicated in a method of production and, furthermore, it is very difficult to produce a wave-reflecting layer having a uniform thickness, i.e., having no irregularity in thickness.

SUMMARY OF THE INVENTION

One object of the present invention is to provide a reflector for a circular polarization antenna which can be produced in a simplified manner, and which has good wave reflection performance that can be maintained for long periods of time.

Another object of the present invention is to provide a process for producing a reflector for a circular polarization antenna having characteristics as described above.

It has been found that these objects can be attained by sandwiching a metallic layer between specific thermoplastic resin layers.

Thus, the present invention is directed to a reflector for a circular polarization antenna, comprising (A) a thermoplastic resin (I) layer having a thickness of from 5 $\mu$m to 5 mm or a coating (paint) layer having a thickness of from 5 $\mu$m to 1 mm and good weather resistance;

(B) a metallic layer having a thickness of from 5 $\mu$m to 1 mm; and (C) an inorganic filler-containing thermoplastic resin (II) layer having a thickness of from 500 $\mu$m to 15 mm and an inorganic filler content of from 10 to 80% by weight.

BRIEF DESCRIPTION OF THE DRAWINGS

FIG. 1 is a partial perspective view of an antenna equipped with a reflector for a circular polarization antenna of the present invention;

FIG. 2 is a cross sectional view of the reflector of FIG. 1;

FIG. 3 is a partial further-enlarged view of the cross section of the reflector of FIG. 1;

FIG. 4 is a cross sectional view of a reflector for a circular polarization antenna which includes an expanded inorganic filler-containing olefin polymer layer;

FIG. 5 is a partial further-enlarged cross sectional view of the reflector of FIG. 4;

FIG. 6 is a cross sectional view of one preferred reflector for a circular polarization antenna of the present invention; and FIG. 7 is a cross sectional view of another preferred reflector for a circular polarization antenna of the present invention.

In FIGS. 1 to 7, A is a reflector for a circular polarization antenna, B is a convertor, C is a supporting rod for the convertor, D is a supporting rod for the reflector, E is a wire, 1 is an inorganic filler-containing thermoplastic resin (II) layer, 1' is an inorganic filler-containing olefin polymer layer, 2 is a metallic layer (e.g., a metallic foil), 3 is a thermoplastic resin layer or coating layer having good weather resistance, 3' is an olefin polymer layer, 1a is a skin layer, 1b is a core layer, 1c is a (inorganic filler-free) thermoplastic resin (II) layer, 1d is a thermoplastic resin (II) layer containing an inorganic filler, 2a and 2b are primer layers, 2a' and 2b' are modified olefin polymer layers, I is a laminated material comprising a thermoplastic resin (I) layer or coating layer having good weather resistance, a primer layer, a metallic layer, and a primer layer (each of the primer layers may be omitted), II is an inorganic filler-containing thermoplastic resin (II) layer, and III is a thick cylindrical part.

DETAILED DESCRIPTION OF THE INVENTION

The reflector of the present invention has the following advantages.

(1) The wave reflection characteristics of the reflector do not change, even over long periods of time, because of its excellent corrosion resistance.

(2) Since there is only a very small difference in the coefficient of thermal expansion between the metallic layer and the inorganic filler-containing thermoplastic resin layer, even if the reflector is subjected to repeated heat cycles (cycles of heating and cooling) for long periods of time, no layer separation occurs.

(3) The reflector is lightweight and can be produced in a simplified manner.

(4) There is no irregular wave reflection in the reflector because the metallic layer can be molded uniformly.

(5) Since the inorganic filler-containing thermoplastic resin layer can be readily molded in various complicated shapes, the reflector has good appearance and high performance.

(6) The reflector is excellent in mechanical strength, particularly stiffness.

The present invention is hereinafter explained in more detail.

(A) Thermoplastic Resins (I) for Thermoplastic Resin Layer (A)

Thermoplastic resins (I) are used in the preparation of the thermoplastic resin layer (A) of the reflector of the present invention. These thermoplastic resins (I) are industrially produced and widely used, and their methods of production and physical properties are well known. The molecular weight varies with the type of the thermoplastic resin; in general, it is from 10,000 to 1,000,000.

Typical examples of the thermoplastic resins (I) include homopolymers of monomers containing a double bond, such as ethylene, propylene, vinylidene fluoride, vinyl chloride, and styrene, copolymers comprising at least 50% by weight of the above monomers, an acrylonitrile/styrene copolymer (an AS resin), a resin comprising mainly methyl methacrylate (an MMA resin), graft copolymers prepared by graft copolymerization of styrene, solely or in combination with vinyl compounds (e.g., acrylonitrile and methyl methacrylate), onto rubbers (e.g., a butadiene rubber, an acrylonitrile/butadiene rubber, a styrene/butadiene rubber, an acryl rubber, an ethylene/propylene rubber (EPR), an ethylene/propylene/diene copolymer (EPDM), and chlorinated polyethylene), a polyamide resin, a polyester resin, a polyphenylene oxide resin, and a polycarbonate resin.

In addition, resins resulting from modification, such as graft polymerization, of the above thermoplastic resins with organic compounds containing at least one double bond (e.g., unsaturated carboxylic acids and their anhydrides) can be used, and are often preferable as being superior in moldability. In particular, modified resins prepared by graft polymerization of organic compounds containing at least one double bond (in particular, unsaturated carboxylic acids and their anhydrides) onto olefin polymer resins (an ethylene homopolymer, a propylene homopolymer, and copolymers made mainly of ethylene and/or propylene) are desirable, in that if the thermoplastic resin layer is made of compositions containing the modified resins or the modified resins alone, it exhibits superior adhesiveness to the metallic layer.

Furthermore, compositions prepared by adding the above rubbers to the thermoplastic resins (I) (the amount of the rubber added is usually 40% by weight or less) can be used.

Of the thermoplastic resins (I), fluorine-containing resins such as polyvinylidene fluoride are desirably used because of their superior weather resistance. In addition, compositions of resins made mainly of vinyl chloride or resins made mainly of ethylene and/or propylene, with ultraviolet absorbers as described hereinafter are preferably used because the addition of such ultraviolet absorbers enables improvement of the weather resistance of these resins.

Ultraviolet absorbers are additives to be used to protect thermoplastic resins against modification, deterioration, or breakdown due to the action of ultraviolet rays. As these ultraviolet absorbers, compounds capable of absorbing ultraviolet rays can be used.

Typical examples of these ultraviolet absorbers include salicylic acid derivatives such as phenyl salicylate, p-octylphenyl salicylate, and p-tertbutylphenyl salicylate; benzophenone compounds such as 2,4-dihydroxybenzophenone, 2-hydroxy-4-methoxybenzophenone, 2,2'-dihydroxy-4-methoxybenzophenone, and 4-dodecyloxy-2-hydroxybenzophenone; benzotriazole compounds such as 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole, and 2-(2'-hydroxy-4'-n-octoxyphenyl)benzotriazole; oxalic anilide derivatives; hindered amine type compounds; benzoic acid derivatives; and nickel chelate compounds.

Physical properties of these ultraviolet absorbers are described along with their trade names in *Rubber/Plastic Additive Handbook*, edited by Rubber Digest Co., Ltd. (1974), pp. 115–123 and also described in Norbert M. Bikales et al., *Encyclopedia of Polymer Science and Technology* (hereafter "Encyclopedia"), Vol. 14, pp. 125–148, Interscience Publisher (A division of John Wiley & Sons. Inc.) (1964–1971).

The fluorine-containing resins are homopolymers or copolymers prepared by polymerization or copolymerization of fluorine compounds having 2 or 3 carbon atoms and one double bond (e.g., vinylidene fluoride, ethylene trifluoride, and ethylene tetrafluoride) in the presence of peroxides. In the case of the copolymers, the fluorine compound content is at least 50 mol %.

The acrylonitrile/styrene copolymer (an AS resin) is prepared by copolymerization of styrene and acrylonitrile, the molar ratio of styrene to acrylonitrile being 2/1 to 5/1, in the presence of peroxides or azo compounds.

These fluorine-containing resins and acrylonitrile/styrene copolymers are well known, produced industrially, and widely used in various fields (see "Encyclopedia", Vol. 7, pp. 179–219 (1967)).

The other resins described above may also be used as the thermoplastic resin (II) and are explained in detail in the section of Thermoplastic Resins (II) below (indicated with "*").

(B) Paints for Coating Layer (A)

Paints produced industrially and used widely as paints for metals can be used in the preparation of the metallic layer with a coating layer having good weather resistance. Their methods of preparation and physical properties are well known (see "Encyclopedia", Vol.

13, p. 486). These paints can be divided into solvent type paints using organic solvents such as toluene and xylene, aqueous emulsion type paints, and nonsolvent type paints. Any desired type of paint can be chosen, depending on the coating method. Typical examples of these paints include unsaturated or saturated polyester resin-based paints, polyurethane resin-based paints prepared by reacting polyester polyol, polyether polyol, or polyurethane polyol with diisocyanates, aminoalkyd resin-based paints, acryl resin-based paints, melamine resin-based paints, epoxy resin-based paints, silicone resin-based paints, vinyl chloride resin-based paints, acrylurethane resin-based paints, amide resin-based paints, fluorine-containing resin-based paints (e.g., vinylidene fluoride resin-based paints), alkyd resin-based paints, vinylidene chloride resin-based paints, chlorinated polypropylene resin-based paints, xylene resin-based paints, cumarone resin-based paints, petroleum resin-based paints, phenol resin-based paints, butyral resin-based paints, and vinyl acetate resin-based paints.

To these paints can be added delustering agents (e.g., silicic acid), colorants (e.g., pigments and dyes), antioxidants, ultraviolet absorbers, and so forth.

Of the above-described paints, polyurethane resin-based paints, acryl resin-based paints, epoxy resin-based paints, silicone resin-based paints, aminoalkyd resin-based paints, and vinylidene fluoride resin-based paints are desirable to use since they are superior in weather resistance. It is preferred that antioxidants and ultraviolet absorbers be compounded to the paints of the present invention, since this also contributes to the formation of paints having good weather resistance.

The above-noted solvents for the solvent type paints are substances generally used as solvents for organic compounds such as ketones (e.g., diacetone alcohol, methyl ethyl ketone, and methyl isobutyl ketone), alcohols (e.g., n-butyl alcohol), esters (e.g., ethyl acetate, butyl acetate, and cellosolve acetate), aromatic, aliphatic or alicyclic hydrocarbons (e.g., toluene, xylene, hexane, petroleum ether, and cyclohexane), and chlorinated hydrocarbons (e.g., trichloroethane, trichloroethylene, carbon tetrachloride, α-chloronaphthalene, and chlorotoluene). Preferred are those solvents which are liquid under the conditions of a temperature of from 0° to 50° C. and atmospheric pressure, and having a boiling point of 300° C. or less under atmospheric pressure. The solvent to be used is determined appropriately depending on the type of paints used.

Resins for paints which are to be used in the present invention are described below in further detail.

Acryl resins can be divided into two groups: thermoplastic resins made mainly of acrylic or methacrylic acid esters and thermosetting acryl resins obtained by reacting (or suspending) a styrene-based copolymer having a reactive functional group (e.g., a carboxyl group, a hydroxy group, an amido group, a methylol group, an epoxy group, and a glycidyl group) at its side chain with (or in) a thermoplastic resin made mainly of acrylic acid, methacrylic acid or esters thereof. The thermoplastic resins are usually dissolved in solvents composed mainly of toluene, xylene or cellosolve acetate, and curing accelerators such as nitro cellulose, vinyl chloride, and vinyl acetate are often added. The resin content is usually from 15 to 50% by weight, and the viscosity at 25° C. is from 200 to 2,500 cps. In the case of thermosetting resins, they are usually dissolved in solvents composed mainly of xylene, toluene, n-butyl alcohol or methyl isobutyl ketone, for example. Usually the acid value is from 2 to 18 and the viscosity (Gardner) is from S to Z as measured according to ASTM D-803.

Alkyd resins are also called phthalic acid resins. They are prepared by condensation of polybasic acids such as phthalic anhydride, isophthalic acid, terephthalic acid, and tetrahydrophthalic acid, and polyhydric alcohols such as glycerin and pentaerythritol. Alkyd resins in which part of the polybasic acid component is replaced by maleic anhydride, fumaric acid, succinic acid, adipic acid, sebacic acid, and tetrachlorophthalic anhydride can be used. In addition, those resins prepared by modification using vegetable oils such as linseed oil, tung oil, castor oil, sunflower oil, soybean oil, and coconut oil can be used. They are commercially available in the form of solutions prepared using solvents such as toluene, xylene, mineral spirit, naphtha, or their mixtures, in which the resin content is from 50 to 70% by weight. Usually the viscosity (Gardner) at 20° C. is from L to Z, and the acid value is 20 or less.

Epoxy resins are generally prepared by condensing epichlorohydrin and bisphenol A at a temperature ranging from 90° to 120° C. in the presence of sodium hydroxide. The bond of the main chain is an ether bond. The average molecular weight is usually from about 300 to 400 for liquid resins, from about 900 to 4,000 for solid resins, and about 280 to 560 for ring-like aliphatic resins. The epoxy equivalent value is generally from 180 to 200 for liquid resins, from 450 to 3,000 for solid resins, and from about 150 to 160 for ring-like aliphatic resins. In general, the epoxy resins are used in the form of solutions in solvents such as ketones (e.g., methyl ketone and ethyl ketone), diacetone alcohol, cellosolve, butyl acetate, cellosolve acetate, toluene, and xylene. In cases wherein the epoxy resins are used as paints, it is preferred for them to be used in the form of two-component type paints wherein the epoxy resin and a hardener such as amines (e.g., diethylenetriamine, triethylenetetramine, and methaphenylenediamine) or polyamide are dissolved in the respective solvents selected from the above-described solvents.

Vinylidene chloride resins are copolymers of vinylidene chloride and acrylonitrile or acrylic or methacrylic acid esters (the acrylic or methacrylic acid content is generally from 10 to 40% by weight), and the average degree of polymerization is from 50 to 1,000. These vinylidene chloride resins can be divided into two types: solvent type and latex type.

Vinyl chloride resins are generally copolymers of vinyl chloride and vinyl acetate (the proportion of the vinyl chloride is usually from 60 to 95% by weight), which may further contain 10% by weight or less of maleic anhydride. The average degree of polymerization is from 100 to 800. These vinyl chloride resins can be divided into two groups: solvent type and latex type. Usually they are used in a state that they are dissolved in a mixed solvent of ketone and toluene or butyl acetate and toluene.

Chlorinated polypropylene resins are prepared by chlorination of polypropylene. It is available in the form of a powdered resin, or a solvent type resin. Usually, the chlorine content of the powdered resin is from 50 to 70% by weight, and its softening point is from 100° to 120° C. The chlorine content of the solvent type resin is from 20 to 40% by weight, and it is usually used in the form of a solution having a concentration of from 20 to 40% by weight. The viscosity of the solution at 25° C.

is from 4 to 20 poises. Solvents which can be used for this purpose include hydrocarbons, ketones, and esters.

Xylene resins are prepared by reacting xylene and formaldehyde in the presence of sulfuric acid as a catalyst. Those resins modified with phenols and rosins, for example, can also be used. In the case of a liquid xylene resin, its viscosity as an 80% toluene solution (at 20° C.) is from 2 to 3 poises, and in the case of a solid resin, its viscosity as a 50% xylene solution (at 20° C.) is from 0.2 to 1 poise.

Cumarone resins are prepared by copolymerizing cumarone and/or indene with styrene. The average degree of polymerization is from 500 to 1,500, the softening point is from 90° to 150° C., and the iodine value is from 15 to 60. In general, hydrocarbons, ketones, esters and chlorinated hydrocarbons are used as solvents.

Petroleum resins are produced by decomposition of a feed oil, and their properties vary depending on various conditions. In general, the softening point is from 80° to 110° C., the iodine value is from 20 to 300, and the acid value is 1 or less. In general, these petroleum resins are produced by polymerizing styrene, alkylstyrene, divinylbenzene, cyclopentadiene, and indene, for example, in residual olefins having from 5 to 12 carbon atoms in the presence of a Friedel Craft catalyst (e.g., $AlCl_3$, $AlBr_3$, $BF_3$, $SnCl_2$, and $ZnCl_2$).

Phenol resins include oil-insoluble resins produced by condensation of phenol or para-substituted phenol (substituted by alkyl, aryl or cycloalkyl having from 8 or less carbon atoms) and formaldehyde in the presence of acid catalysts, oil-soluble phenol resins modified with rosin and further esterified with glycerin, 100% oil-soluble phenol resins prepared by reacting phenol resins substituted by an alkyl or aryl group in the para- or ortho-position, and formaldehyde, resol type phenol resins prepared by condensation of para- or ortho-substituted phenol and formaldehyde in the presence of alkali catalysts, and alcohol-soluble resins prepared in the same manner as in the preparation of the above resol type phenol resins with the exception that the reaction is stopped in the condition that the resol type phenol resin is soluble in alcohols. In general, the softening point of the rosin-modified resin is from 110° to 170° C., and its acid value is from 10 to 25. The softening point of the 100% oil-soluble phenol resin is from 75° to 135° C., and its acid value is 100 or more.

Silicone resins are produced by hydrolysis of silane compounds having a lower alkyl group (containing 6 or less carbon atoms) or a phenyl group. The viscosity at 20° C. is from 20 to 1,000 cps. These silicone resins are preferably used in the present invention because they are superior in water resistance, weather resistance, and heat resistance. Toluene and xylene, for example, are used as solvents.

Amide resins are prepared by condensation of polyamines (e.g., ethylenediamine and diethylenetriamine) and dimers (dibasic acids as obtained by polymerization of unsaturated fatty acids), and are polymers containing an amide group of —CO—NH— in the molecule. The amine value is usually from 45 to 175 for solution type resins, from 180 to 400 for liquid resins, and from 75 to 120 for semi-solid resins. The softening point is from 90° to 190° C. for solid resins, and from 20° to 50° C. for semi-solid resins. In general, mixed solvents of alcohols and cellosolves with xylene or toluene, for example, are used.

Butyral resins are also called polyvinyl butyral and are prepared by butyralation of polyvinyl alcohol produced from vinyl acetate resins as described hereinafter. In general, the average degree of polymerization is from 250 to 2,000, and the degree of butyralation is from 57 to 70 mol %. They generally contain vinyl alcohol and vinyl acetate in the molecule. The viscosity as a 10% solution in a 1/1 mixture of ethyl alcohol and toluene is from 10 to 150 cps at 25° C.

Vinyl acetate resins are polyvinyl acetate and copolymers composed mainly of vinyl acetate. Polyvinyl alcohol is prepared by saponification of such vinyl acetate resins with acids or alkalis (usually sodium hydroxide), and the degree of saponification is generally more than 85%. Polyvinyl alcohol, however, is not very desirable to use because of its poor weather resistance.

Unsaturated polyester resins are prepared by reacting unsaturated dibasic acids such as maleic anhydride, fumaric acid, itaconic acid, chlorinated maleic acid, and chlorendic anhydride with glycols such as ethylene glycol, diethylene glycol, propylene glycol, dipropylene glycol, 1,3-butylene glycol, and bisphenol dioxyethyl ether, and, if desired, further with saturated dibasic acids such as phthalic anhydride, isophthalic acid, 3,6-endomethylenetetrahydrophthalic anhydride, adipic acid, and sebacic acid in an inert gas, usually at 160° to 230° C., to prepare esters, quenching the esters below 100° C., adding polymerization inhibitors to the esters, further cooling the resulting mixture, and then dissolving it in polymerizable monomers such as styrene, vinyltoluene, methyl methacrylate, and diallylphthalate (usually styrene). The acid value of the unsaturated polyester is usually 30 or less, and its viscosity at 25° C. is from 1 to 9 poises.

Melamine resins are prepared by reacting melamine and formaldehyde, with the molar ratio of melamine to formaldehyde being 1/6, in an alkaline condition (pH=8 or more) to prepare methylolmelamine, and then heating the methylolmelamine in alcohols (usually alcohols having from 1 to 4 carbon atoms, and desirably butyl alcohol) in the presence of a small amount of acids or acidic substances as a catalyst.

Vinylidene fluoride resins are polymers made mainly (at least 50 mol %) of vinylidene fluoride, and they are preferably used in the form of dispersion in solvents such as dimethylformamide, dimethylacetamide, and dimethyl sulfoxide.

Polyurethane resins are resins containing a number of urethane bonds represented by —NH—COO—. They are divided into three groups: two-component type polyurethane paints in which polyesters or polyethers are used in combination with isocyanate compounds, moisture-hardenable polyurethanes, and urethanated oils. The above polyesters are prepared by reacting organic dibasic acids (e.g., adipic acid, sebacic acid, pimelic acid, azelaic acid, phthalic anhydride, isophthalic acid, suberic acid, dimeric acid, and glutaric acid) with glycols (e.g., ethylene glycol, diethylene glycol, propylene glycol, hexanetriol, trimethylene glycol, glycerin and sorbitol). The polyethers are polymers of the above glycols. Examples of the isocyanate compounds are trilene diisocyanate, 4,4'-diphenylenemethane diisocyanate, hexamethylene diisocyanate, and xylylene diisocyanate.

Moisture-hardenable polyurethane of the above polyurethane resins is undesirable in that since it undergoes a hardening reaction on absorbing moisture in the air, it is very sensitive to moisture and readily forms pinholes or bubbles. For the reasons as described above, two-component type polyurethane paints and urethanated oils prepared by reacting drying oils (e.g., soybean oil, linseed oil and castor oil) with the above polyesters or polyethers and further with isocyanate compounds are preferred.

Aminoalkyd resin-based paints are prepared by diluting a mixture of melamine and alkyd resins as described above with solvents such as butyl alcohol, ethyl acetate, butyl acetate, toluene, and xylene, with the mixture comprising from 15 to 30% by weight of the melamine resin and from 85 to 70% by weight of the alkyd resin.

(C) Metals

Typical examples of metals which are used in the preparation of the metallic layer (B) of the present invention are aluminum, iron, nickel, copper, zinc, silver and alloys composed mainly of these metals (e.g., stainless steel and brass). These metallic layers may be untreated or may be subjected to surface treatment(s), such as chemical treatment and plating treatment. In addition, metallic layers which are coated or printed can also be used.

Of the above metals, aluminum, copper, silver and alloys made mainly (at least 50% by weight) of these metals are desirable because of their superior wave reflection performance. Particularly preferred are aluminum, copper, and alloys made mainly of the aluminum and copper.

(D) Thermoplastic Resins (II)

Thermoplastic resins (II) are used in the preparation of the inorganic filler-containing thermoplastic resin layer (C) of the present invention. Typical examples of the thermoplastic resins (II) are shown below.

Olefin polymers; polyamide resins; polycarbonate resins; styrene polymers; graft polymers resulting from graft polymerization of styrene and at least one other vinyl compound to chlorinated polyethylene or a mixture of chlorinated polyethylene and a copolymer of styrene and at least one other vinyl compound (hereinafter referred to as "impact resistant resins (A)"); impact resistant resins prepared by graft copolymerization of at least one vinyl compound selected from the group consisting of styrene, acrylonitrile, and methyl methacrylate to at least one rubber selected from the group consisting of butadiene rubber, acrylate rubber and ethylene/propylene rubber (these impact resistant resins are hereinafter referred to as "impact resistant resins (B)"); methyl methacrylate polymers, phenylene oxide polymers, aromatic polyesters, oxymethylene polymers and vinyl chloride polymers.

These thermoplastic resins (II) are mass produced industrially and widely used in various fields. They are described below in detail.

(1) Olefin Polymers*

Olefin polymers which are used as the thermoplastic resins (II) of the present invention include an ethylene homopolymer, a propylene homopolymer, an ethylene/propylene copolymer, and copolymers of ethylene and/or propylene and other α-olefins having 12 or less carbon atoms (the proportion of the α-olefin is generally 20% by weight or less). The melt index (as determined according to ASTM D-1238 at a temperature of 190° C. under a load of 2.16 kg) or melt flow index (as determined according to ASTM-1238 at a temperature of 230° C. under a load of 2.16 kg) of the olefin polymer is preferably from 0.01 to 100 g/10 min and more preferably from 0.02 to 80 g/10 min. If M.I. or MFI is less than 0.01 g/10 min, the resulting mixture is poor in moldability. On the other hand, if an olefin polymer having an M.I. or MFI of more than 100 g/10 min is used, the ultimate mold has poor mechanical properties. An ethylene homopolymer, copolymers of ethylene and a small amount of α-olefins as described above, a propylene homopolymer, and random or block copolymers of propylene, ethylene and/or other α-olefins are desirable.

These olefin polymers are produced by homo- or copolymerizing olefins by the use of a catalyst system comprising a transition metal compound and an organoaluminum compound (a so-called Ziegler catalyst), a catalyst comprising a support (e.g., silica) and a chromium-containing compound (e.g., chromium oxide) deposited on the support (a so-called Phillips catalyst), or a radical initiator (e.g., organic peroxides).

In addition, modified polyolefins prepared by graft polymerization of compounds containing at least one double bond (e.g., unsaturated carboxylic acids, monobasic carboxylic acids, and vinylsilane compounds) to the above olefin polymers can be used.

Methods of production of these olefin resins and modified polyolefins are well known.

These olefin polymers and modified polyolefins can be used singly or in combination with each other. Resin blends prepared by blending two or more of the olefin polymers and modified polyolefins in any desired ratio can also be used.

(2) Polyamide Resins*

Polyamide resins which can be used as the thermoplastic resin (II) are generally called nylon, in which the main chain is composed of repeating amido group (—CONH—). These polyamide resins are generally prepared as follows:

(1) Ring opening of lactam

(2) Condensation of amino acid

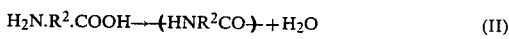

(3) Condensation of diamine and dicarboxylic acid

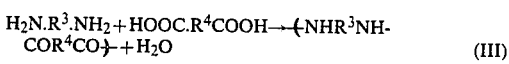

In the above formulae (I) to (III), $R^1$ is an alkylene group containing from 5 to 11 carbon atoms, $R^2$ is an alkylene group containing from 5 to 16 carbon atoms, $R^3$ is an alkylene group containing from 2 to 11 carbon atoms, and $R^4$ is an alkylene group containing from 3 to 40 carbon atoms.

Typical examples of the polyamide resins include:

nylon 6 as prepared by ring opening polymerization of ε-caprolactam;

similar polyamide resins as prepared by ring opening polymerization of γ-butyrolactam, δ-valerolactam, ξ-enantholactam, or η-capryllactam;

nylon 12 as prepared by ring opening polymerization of ω-laurolactam;

nylon 11 as prepared by heat condensation of 11-aminoundecanic acid;

nylon 66 as prepared by polycondensation of hexamethylenediamine and adipic acid; and nylon 6,10 as prepared by polycondensation of hexamethylenediamine and sebacic acid.

In addition, N-alkoxymethyl-modified nylon (type 8 nylon), transparent nylon trimethylhexamethylenediamine/terephthalic acid condensates, nylon 9, nylon 13, Q2 nylon, and the like can be used.

For these polyamide resins, the molecular weight is usually at least 10,000, preferably from 15,000 to 50,000, and more preferably from 15,000 to 30,000. The degree of polymerization is usually at least 100, preferably from 150 to 500, and more preferably from 150 to 300.

These polyamide resins are commercially produced and widely used in a wide variety of applications. Their process of production, characteristics, and so forth are described in detail, for example, in O. Fukumoto, etc., *Plastic Zairyo Koza* (*Plastic Materials*), No. 16, "Polyamide Resins", Nikkan Kogyo Shinbun Sha, Tokyo (1970) and "Encyclopedia" Vol. 10, pp. 483–597 (1969). Of these polyamide resins, polyamide resins having a viscosity (at 260° C.) of from 500 to 50,000 poises are preferred, with those having a viscosity (at 260° C.) of from 500 to 3,000 poises being particularly preferred.

(3) Polycarbonate Resins*

Polycarbonate resins which can be used as the thermoplastic resin (II) can usually be prepared by the following four methods:

(1) Ester exchange reaction between carbonic acid diesters derived from monofunctional aromatic or aliphatic hydroxy compounds and hydroxy compounds (hereinafter referred to as "Method (1)");

(2) Ester exchange reaction of dihydroxy compounds themselves, or between dihydroxy compounds and bisalkyl or bisaryl carbonate of other dihydroxy compounds (hereinafter referred to as "Method (2)");

(3) Reaction of dihydroxy compounds and phosgene in the presence of an acid coupling agent (hereinafter referred to as "Method (3)"); and (4) Reaction of dihydroxy compounds and bischlorocarbonic acid esters of dihydroxy compounds in the presence of an acid coupling agent (hereinafter referred to as "Method (4)").

Of the above-described methods, Methods (1) and (3) are industrially employed.

Method (1) is called a melting method, in which bisphenol A and diphenyl carbonate are reacted at elevated temperatures and under reduced pressure in an inert gas atmosphere in the absence or presence of an ester exchange catalyst. Ester exchange catalysts which can be used include various metals, metal alcoholates, oxides, carbonic acid salts, acetic acid salts, hydrides, organic acid alkali salts, and alkaline earth metal amides.

Method (3) is called a solvent method, in which bisphenol A and phosgene are reacted at room temperature in a solvent in the presence of an acid coupling agent (e.g., caustic alkali and pyridine).

The molecular weight of the polycarbonate resin as produced by Method (1) is usually from 5,000 to 50,000 and more usually from 10,000 to 30,000. The molecular weight of the polycarbonate resin as produced by Method (3) is usually from 10,000 to 200,000 and more usually from 20,000 to 150,000.

These polycarbonate resins are commercially produced and widely used in various applications. Their process of production, characteristics, and so forth are described in detail, for example, in Tachikawa and Sakajiri, ed., *Plastic Zairyo Koza* (*Plastic Materials*), No. 17, "Polycarbonates", Nikkan Kogyo Shinbun Sha, Tokyo (1971) and "Encyclopedia", Vol. 10, p. 710.

(4) Styrene Polymers*

Styrene polymers which are used as the thermoplastic resins (II) of the present invention include a styrene homopolymer (generally having a molecular weight of from 50,000 to 300,000), copolymers made mainly (at least 60% by weight) of styrene (i.e., copolymers of at least 60% by weight of styrene and other monomers, i.e., organic compounds containing a double bond), and impact resistant resins as described hereinafter. Typical examples of the above organic compounds containing a double bond are ethylene, vinyl acetate, maleic anhydride, acrylonitrile, and methyl methacrylate. Methods of production of these styrene polymers are well known. Impact resistant resins are produced by graft copolymerization of styrene onto butadiene rubber and styrene/butadiene rubber. This styrene/butadiene rubber is a copolymer rubber comprising at least 60% by weight of butadiene and styrene. It may be a random copolymer rubber or a block copolymer rubber. For these butadiene rubber and styrene/butadiene rubber, the Mooney viscosity is usually from 20 to 140, with the range of from 20 to 120 being particularly preferred. The graft copolymerization method includes a bulk polymerization method, a solution polymerization method, an emulsion polymerization method, and an aqueous suspension polymerization method, and a combination of the above method and a graft polymerization method (for example, a method comprising conducting bulk polymerization and then aqueous suspension polymerization). The total amount of the butadiene rubber and the styrene/butadiene rubber added to produce 100 parts by weight of the impact resistant resin is from 1 to 30 parts by weight, preferably from 1 to 25 parts by weight, and particularly preferably from 2 to 20 parts by weight. (In addition, a method may be employed in which a relatively large amount of the above rubber is used to produce a graft polymer containing a large amount of the rubber-like material, and the above styrene polymer and/or copolymer of styrene and other monomer is added to and mixed with the graft polymer. In this case, the amount of the rubber used is calculated based on the amount of the mixture.) The molecular weight of the monomer chain grafted to the rubber is usually from 1,000 to 300,000 and preferably from 2,000 to 250,000. In general, in this graft polymerization, it rarely occurs that the monomer is completely bound to the rubber. That is, a grafted material, rubber, and homopolymers of the monomer which is not linked to the rubber are present in combination. This mixture is used as such without separation of any of the grafted material, rubber and homopolymers of the monomer.

These styrene polymers are industrially produced and widely used in various fields. Their methods of production and, properties are well known.

(5) Impact Resistant Resins (A)*

The impact resistant resin (A) which is used as the thermoplastic resin (II) of the present invention contains from 5 to 40% by weight, preferably from 10 to 40% by weight, more preferably from 15 to 35% by weight, (as a total amount) of chlorinated polyethylene and a chlorinated polyethylene produced by graft polymerization of styrene and at least one other vinyl compound to chlorinated polyethylene. The impact resistant resin (A) may further contain a copolymer of styrene and at least one other vinyl compound.

The impact resistant resin (A) of the present invention is a composition prepared by mixing chlorinated polyethylene and the above styrene/vinyl compound copolymer, a graft copolymer prepared by graft polymerization of styrene and at least one other vinyl compound to chlorinated polyethylene, or a composition prepared by mixing a graft copolymer obtained by graft copolymerization of small amounts of styrene and at least one other vinyl compound to chlorinated polyethylene and the above styrene/vinyl compound copolymer. In a case that, of the impact resistant resins of the present invention, the composition is used, a composition may be used which has been prepared by mixing constituents in advance. Alternatively, they may be mixed in producing the ultimate composition of the present invention. Even if any of the above composition and graft copolymer is used as the impact resistant resin (A) of the present invention, it is important that the proportion of the non-grafted and grafted chlorinated polyethylenes in the ultimate composition is within the above-described range.

Chlorinated polyethylene to be used in the preparation of the impact resistant resin (A) can be produced by chlorinating powdered polyethylene or polyethylene particles in an aqueous suspension, or by chlorinating polyethylene dissolved in organic solvents. Chlorinated polyethylene produced by chlorinating polyethylene in an aqueous suspension is desirable. In general, amorphous or crystalline chlorinated polyethylene having a chlorine content of from 20 to 50% by weight is used. Particularly preferred is amorphous chlorinated polyethylene having a chlorine content of from 25 to 45% by weight.

The above polyethylene is an ethylene homopolymer or a copolymer of ethylene and 10% by weight or less of α-olefin (usually having 6 or less carbon atoms). In general, the density is from 0.910 to 0.970 g/cc, and the molecular weight is from 50,000 to 700,000.

Representative examples of the impact resistant resins are a grafted material prepared by graft copolymerization of styrene and acrylonitrile onto chlorinated polyethylene, a grafted material prepared by graft copolymerization of styrene and methyl methacrylate onto chlorinated polyethylene, a blended material of chlorinated polyethylene and a styrene/acrylonitrile copolymer, and a blended material of chlorinated polyethylene and an acryl resin. The acryl resin includes polymers made mainly of acrylates or methacrylates. Typical examples are polymers made mainly of methyl acrylate, butyl acrylate and/or methyl methacrylate.

(6) Impact Resistant Resin (B)

An impact resistant resin (B) which is used as the thermoplastic resin (II) of the present invention is prepared by graft copolymerization of at least one vinyl compound selected from the group consisting of styrene, acrylonitrile and methyl methacrylate onto at least one rubber selected from the group consisting of butadiene rubber, acrylate rubber, and ethylene/propylene rubber, as described in "Encyclopedia", Vol. 1, pp. 374-444 (1964).

(a) Butadiene Rubber

The butadiene rubber is a rubber made mainly (at least 60% by weight) of butadiene, including a butadiene homopolymer rubber and a copolymer rubber of butadiene and a small amount of styrene or acrylonitrile (SBR and NBR). The butadiene/styrene copolymer rubber may be a block copolymer rubber or a random copolymer rubber.

(b) Acrylate Rubber

The acrylate rubber is produced by emulsion polymerizing an acrylic acid ester (e.g., butyl acrylate) with a small amount (generally 10% by weight or less) of other monomer (e.g., acrylonitrile). It is usually called an acryl rubber.

(c) Ethylene/Propylene Rubber (EPR)

The ethylene/propylene rubber includes an ethylene/propylene copolymer rubber produced by copolymerization of ethylene and propylene, and a copolymer produced by copolymerizing ethylene and propylene (major constituents), and a small amount (usually 10% by weight or less) of a monomer such as a straight or branched diolefin containing two double bonds at the terminals (e.g., 1,4-pentadiene, 1,5-hexadiene, and 3,3-dimethyl-1,5-hexadiene) or a straight or branched diolefin containing one double bond at the terminal (e.g., 1,4-hexadiene and 6-methyl-1,5-heptadiene), or a ring-like diene hydrocarbon (e.g., bicyclo(2,2,1)-heptene-2 and its derivatives). In these polymers, it is preferred that the weight ratio of the ethylene monomer unit to the propylene monomer unit be from 30/70 to 70/30. The ethylene/propylene rubbers are produced by copolymerizing ethylene and propylene, or ethylene, propylene and the above monomer in the presence of a catalyst system comprising transition metal compounds and organoaluminum compounds.

In producing the impact resistant resins of the present invention, the rubber-like material preferably has a Mooney viscosity of from 20 to 140, with the range of from 30 to 120 being particularly preferred, although it varies depending on the type of the rubber-like material. These rubber-like materials are produced industrially and used widely in various fields. Their methods of production, properties, and uses are well known (see, for example, S. Kanbara, *Gosei Gomu Handbook* (*Synthetic Rubber Handbook*), Asakura Shoten (1967)).

(d) Preparation of Impact Resistant Resin (B)

The impact resistant resin (B) is produced by graft polymerization of at least one of styrene and other vinyl compounds (e.g., acrylonitrile and methyl methacrylate) onto the above rubber-like material. The graft polymerization method includes a bulk polymerization method, a solution polymerization method, an emulsion polymerization method, and an aqueous suspension polymerization method, and a combination of the above polymerization method (e.g., a method in which bulk polymerization is first carried out and then aqueous suspension polymerization is carried out). In general, in producing 100 parts by weight of the impact resistant resin (B), the rubber-like material is used in an amount of from 3 to 40 parts by weight, preferably from 5 to 35 parts by weight, and particularly preferably from 5 to 30 parts by weight. (In addition, a method may be employed in which a large amount of the rubber-like material is used to produce a graft polymer containing a large amount of the rubber-like material, and the above-described homo- or copolymer of styrene, acrylonitrile, and methyl methacrylate is added to the graft polymer. In this case, the amount of the rubber-like material is calculated based on the amount of the mixture.) The molecular weight of the graft chain (of styrene, acrylonitrile, and methyl methacrylate) linked to the rubber-like material is usually from 1,000 to 300,000 and preferably from 2,000 to 200,000. In this graft polymerization, it rarely occurs that the monomer is completely linked to the rubber-like material. Thus, the grafted material and homo- and copolymers of the monomer not linked to the rubber are present in combination. This mixture is used as such without separation of the homo- and copolymers.

(e) Typical Examples of Impact Resistant Resins (B)

Typical examples of the impact resistant resins (B) are shown below.

An acrylonitrile/butadiene/styrene terpolymer (ABS resin) obtained by graft copolymerization of styrene and acrylonitrile onto a butadiene homopolymer rubber, a styrene/butadiene block or random copolymer rubber (SBR), or an acrylonitrile/butadiene copolymer rubber (NBR); a methyl methacrylate/butadiene/styrene terpolymer resin (MBS resin) obtained by graft copolymerization of styrene and methyl methacrylate onto the butadiene homopolymer rubber or SBR; an acrylonitrile/acrylate/styrene terpolymer resin (AAS resin) obtained by graft copolymerization of acrylonitrile and styrene onto the acrylate rubber; and a graft copolymer resin (AES resin) obtained by graft copolymerization of acrylonitrile and styrene onto the ethylene/propylene rubber.

(7) Phenylene Oxide Polymers*

The phenylene oxide polymer which is used as the thermoplastic resin (II) of the present invention is at least one thermoplastic resin selected from the group consisting of phenylene oxide-containing condensates and polymers obtained by graft polymerization of vinyl compound (styrene or a mixture of styrene and other vinyl compound such as acrylonitrile and methyl methacrylate) onto phenylene oxide-containing condensates. The phenylene oxide polymer composition may further contain polymers obtained by graft polymerization of the vinyl compound onto the above-described rubber-like materials (i.e., butadiene rubbers, acrylate rubbers, ethylene/propylene rubbers, and chlorinated polyethylene rubbers), and/or the above-described styrene-containing polymers (styrene polymers). The total proportion of the phenylene oxide-containing condensate and the grafted phenylene oxide-containing condensate in the composition is at least 5.0% by weight, preferably at least 7.0% by weight, and particularly preferably at least 10% by weight.

(a) Phenylene Oxide-Containing Condensates

The phenylene oxide-containing condensate is polyphenylene ether (hereinafter abbreviated to "PPO"), which can be represented by formula (IV):

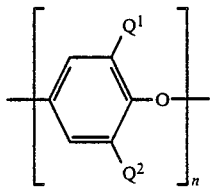

(IV)

wherein $Q^1$ and $Q^2$ may be the same or different, and are each an alkyl group having from 1 to 4 carbon atoms, and n is a positive integer of 50 or more (generally 100 or more).

(b) Grafted Phenylene Oxide-Containing Condensates

The grafted condensate is obtained by graft polymerization of styrene or a mixture of styrene and at least one comonomer selected from the group consisting of styrene containing one or more alkyl groups having 1 or 2 carbon atoms, acrylonitrile, methyl methacrylate, and butyl acrylate onto the above-described PPO, as described in "Encyclopedia", Vol. 10, pp. 92–111 (1967).

(8) Methyl Methacrylate Polymers*

Methyl methacrylate polymers which are used as the thermoplastic resins (II) of the present invention are thermoplastic resins made mainly from methyl methacrylate. Typical examples of such methyl methacrylate polymers are a methyl methacrylate homopolymer, and copolymers of methyl methacrylate and 30 mol % or less of other monomers containing at least one double bond. Monomers which can be used in these copolymers include methacrylates containing an alkyl group or cycloalkyl group having 12 or less carbon atoms (e.g., ethyl methacrylate, butyl methacrylate, and cyclohexane methacrylate), acrylates containing an alkyl group or cycloalkyl group having 12 or less carbon atoms (e.g., ethyl acrylate, butyl acrylate, and cyclohexane acrylate), vinyl compounds containing one double bond (e.g., styrene and vinyl acetate), and polyfunctional organic compounds containing at least two double bonds (e.g., ethylene dimethacrylate, propylene dimethacrylate, polyethylene glycol dimethacrylate, divinylbenzene, triallyl cyanurate, and diallyl cyanurate). In the copolymers of the methyl methacrylate polymers of the present invention, the proportion of the vinyl compound polymerized is usually 20 mol % or less and preferably 15 mol % or less. If the proportion of the vinyl compound polymerized is in excess of 20 mol %, the characteristics of the methyl methacrylate polymer are exhibited only insufficiently. The proportion of the polyfunctional organic compound polymerized is generally 10 mol % or less and preferably 8 mol % or less. If it is in excess of 10 mol %, moldability is poor.

These methyl methacrylate polymers are produced by polymerizing methyl methacrylate, singly or in combination with vinyl compounds and/or polyfunctional organic compounds in the presence of polymerization initiators (e.g., organic peroxides) according to a bulk polymerization method, a solution polymerization method, an emulsion polymerization method, or a suspension polymerization method, or a combination of these polymerization methods (e.g., bulk polymerization followed by suspension polymerization), as described in "Encyclopedia", Vol. 1, pp. 246–342 (1964). The average degree of polymerization of the methyl methacrylate polymers of the present invention is usually from 300 to 10,000, preferably from 300 to 7,000, and particularly preferably from 300 to 5,000. If methyl methacrylate polymers having an average degree of polymerization of less than 300 are used, the mechanical strength of the reflector for a circular polarization antenna is poor. On the other hand, if the average degree of polymerization is in excess of 10,000, moldability is poor.

(9) Aromatic Polyesters

Aromatic polyesters which are used as the thermoplastic resins (II) of the present invention are polyesters containing aromatic ring pendants in its repeating unit. They are polymers or copolymers derived by condensation of aromatic dicarboxylic acids or their ester-forming derivatives and diols or their ester-forming derivatives as main components.

Aromatic dicarboxylic acids which can be used for this purpose include terephthalic acid, isophthalic acid, phthalic acid, 2,6-naphthalenedicarboxylic acid, 2,7-naphthalenedicarboxylic acid, 1,5-naphthalenedicarboxylic acid, bis(p-carboxyphenyl)methane, anthracenedicarboxylic acid, 3,3'-diphenylcarboxylic acid, 4,4'-diphenyl ether dicarboxylic acid, 4,4'-bis(carboxyphenoxy)ethane, 4,4'-diphenylsulfonedicarboxylic acid, and 4,4'-tert-phenylenedicarboxylic acid, and their ester-forming derivatives.

In the production of the aromatic polyesters of the present invention, 40 mol % or less of the aromatic dicarboxylic acid may be replaced by aliphatic dicarboxylic acids such as adipic acid, sebacic acid, azelaic acid, and dodecanedionic acid, alicyclic dicarboxylic acids such as 1,3-cyclohexanedicarboxylic acid and 1,4-cyclohexanecarboxylic acid, or their ester-forming derivatives.

Diols which can be used include aliphatic diols having from 2 to 20 carbon atoms, such as ethylene glycol, 1,2-propanediol, propylene glycol, 1,4-butanediol, neopentyl glycol, 1,5-pentanediol, 1,6-hexanediol, decamethylene glycol, cyclohexanediol, and 1,4-cyclohexanedimethanol.

As part of the above diol (50 mol % at most), long chain glycols having a molecular weight of from 400 to 6,000, i.e., polyethylene glycol, poly-1,3-propylene glycol, and polytetramethylene glycol can be used.

The above aromatic dicarboxylic acids, dicarboxylic acids other than the aromatic dicarboxylic acids, diols, and long chain glycols to be used in place of the diols may be used singly or in combination with each other.

Preferred examples of the aromatic polyesters that are used in the present invention are polyethylene terephthalate, polypropylene terephthalate, polybutylene terephthalate, polyhexamethylene terephthalate, polycyclohexylenedimethylene terephthalate, polyethylene2,6-naphthalate, and polyethylene-1,2-diphenoxyethane-4,4'-dicarboxylate. Of these aromatic polyesters, polyethylene terephthalate and polybutylene terephthalate are preferred.

In connection with these aromatic polyesters, their methods of production and mechanical properties are well known, as described in "Encyclopedia", Vol. 11, pp. 62–128 (1969).

For the aromatic polyesters, the intrinsic viscosity as determined at 30° C. in a mixed solvent of phenol and tetrachloroethane (1/1 by weight) is usually from 0.4 to 1.5, preferably from 0.4 to 1.3, and particularly preferably from 0.5 to 1.3. If aromatic polyesters having an intrinsic viscosity of less than 0.4 are used, no reflector for a circular polarization antenna having a sufficiently high mechanical strength can be obtained. On the other hand, if it is in excess of 1.5, the resulting mold is deteriorated in surface properties.

(10) Oxymethylene Polymers

Oxymethylene polymers which are used as the thermoplastic resins (II) of the present invention are thermoplastic resins made mainly from formaldehyde or trioxane. Typical examples of such oxymethylene polymers are a homopolymer of formaldehyde, a homopolymer of trioxane, and copolymers of formaldehyde and/or trioxane and from 0.1 to 15% by weight (preferably from 0.1 to 10% by weight) of cyclic ethers, cyclic acetals, and/or straight chain polyacetal.

Typical examples of such cyclic ethers and cyclic acetals are compounds represented by the following formula (V):

wherein $R^5$ to $R^8$ may be the same or different, and are each a phenyl group, an alkyl group, or a halogen-substituted alkyl group, when $R^9$ is a methylene group, an oxymethylene group, or an alkyl or halogenalkyl-substituted methylene or oxymethylene group, m is 0 or an integer of 1 to 3, and when $R^9$ is a group $(OCH_2CH_2)_l$—$OCH_2$, m is 1, and l is an integer of from 1 to 3.

Of the cyclic ethers or cyclic acetals represented by the general formula (V), those compounds in which $R^5$ to $R^8$ are alkyl groups having from 1 to 5 carbon atoms are preferred. Particularly preferred are those compounds in which $R^5$ to $R^8$ are alkyl groups having from 1 to 3 carbon atoms. They may be substituted by 1 to 3 halogen atoms (preferably a chlorine atom). Furthermore, it is preferred that cyclic ethers having from 3 to 5 rings or cyclic acetals having from 5 to 9 rings be used.

Comonomers which can be used include epoxide compounds such as ethylen oxide, propylene oxide, 1,2-butylene oxide, styrene oxide, epichlorohydrin, and oxetane or its derivatives (e.g., 3,3-bischloromethyloxetane and tetrahydrofuran), cyclic formals such as 1,3-dioxacycloheptane and 1,3,6-trioxacycloheptane, and substituted products resulting from substitution of the above compounds with a methyl group, an ethyl group, a chloromethyl group, a trichloromethyl group, or a phenyl group (e.g., 4-phenyl-1,3-dioxolan, and 4-methyl-1,3-dioxolan). In addition, derivatives resulting from substitution of the cyclic acetals (e.g., the above 1,3-dioxacycloalkane) by a methyl group, an ethyl group, a phenyl group, a chloromethyl group, or a vinyl group at the 2-position thereof can be used.

Furthermore, linear polyacetals which are decomposed during polymerization and act as comonomers can be used. These linear polyacetals can be produced by polymerization or copolymerization of the above cyclic acetals, and further from dihydric alcohols (e.g., ethylene glycol, diethylene glycol, 1,3-butylene glycol, propylene glycol, and p-xylylenediol) and aldehydes (in particular, formaldehyde).

In producing the oxymethylene polymers, numerous polymerization catalysts can be used. Preferred examples of the polymerization catalysts are those containing boron fluoride, thionyl chloride, fluorosulfonic acid, methanesulfonic acid, phosphorus trichloride, titanium tetrachloride, ferric chloride, zirconium tetrachloride, aluminum trichloride, stannous chloride, and stannic chloride. Particularly preferred are boron fluoride and boron fluoride-containing substances (e.g., boron fluoride monohydrate, boron fluoride dihydrate, and boron fluoride trihydrate).

In general, the oxymethylene polymers are produced by polymerizing or copolymerizing formaldehyde and/or trioxane, or them with the above comonomers in inert organic solvents as described hereinafter at a temperature of from 20° to 115° C. (desirably from 60° to 100° C.) in the presence of the above polymerization catalysts.

Inert organic solvents which can be used for this purpose include cyclohexane, benzene, pentane, trichloroethylene, ligroin, carbon tetrachloride, octane, di-n- butyl ether, and petroleum ether. These solvents are used in an amount of 20% by weight or less, preferably from 0.25 to 10% by weight, based on the amount of polymerizable substances, i.e., trioxane, formaldehyde and comonomers.

The reduced viscosity of the oxymethylene polymer is generally from 0.2 to 3.0 (the reduced viscosity is measured at 140° C. using a solution which has been prepared by dissolving 0.5 g of the polymer in 100 ml of γ-butyrolactone containing 2% of diphenylamine). Particularly preferred is a range of from 0.5 to 3.0. The M.I. is preferably from 0.1 to 50 g/10 min and particularly preferably from 0.5 to 40 g/10 min.

The oxymethylene polymers are industrially produced and widely used in various fields. Their methods of production, and mechanical properties are well known (see "Encyclopedia", Vol. 10, pp. 319-324 (1969)).

(11) Vinyl Chloride Polymers

Vinyl chloride polymers which are used as the thermoplastic resins (II) of the present invention are a vinyl chloride homopolymer and copolymers of vinyl chloride and 50% by weight or less (preferably 45% by weight or less) of compounds copolymerizable with vinyl chloride and containing at least one double bond. The degree of polymerization for these vinyl chloride polymers is usually from 400 to 4,500 and preferably from 400 to 1,500. Typical examples of these compounds containing at least one double bond are vinylidene chloride, ethylene, propylene, vinyl acetate, acrylic acid or methacrylic acid and their esters, maleic acid and its esters, and acrylonitrile. These vinyl chloride polymers can be produced by polymerizing vinyl chloride or copolymerizing vinyl chloride and vinyl compounds as described above in the presence of free radical catalysts. Their methods of production are well known and widely used in various fields, as described in "Encyclopedia", Vol. 14, pp. 305-483 (1971).

In producing the inorganic filler-containing vinyl chloride polymers of the present invention, vinyl chloride polymers alone may be used as polymeric substances. In addition, compositions of the vinyl chloride polymers and other polymeric substances compatible therewith may be used. Examples of such polymeric substances are chlorinated polyethylene rubbers (the chlorine content is usually from 25 to 45% by weight) derived by chlorination of a homopolymer of ethylene or copolymers of ethylene and α-olefins having from 3 to 12 carbon atoms (the proportion of α-olefin is usually 20 mol % or less), having a molecular weight of from 10,000 to 1,000,000 (preferably from 10,000 to 100,000); the above-described ethylene/propylene/diene copolymer rubber (EPDM), natural rubber, chloroprene rubber, chlorosulfonated polyethylene rubber, styrene/butadiene copolymer rubber (SBR), acrylonitrile/butadiene copolymer rubber, and butadiene homopolymer rubber, the Mooney viscosity ($ML_{1+4}$) of these rubbers being generally from 10 to 150.

The amount of the rubber to be compounded is 50 parts by weight or less based on the weight of the vinyl chloride polymers.

Of the thermoplastic resins (II), olefin polymers, polyamide resins, impact resistant resins (A), impact resistant resins (B), phenylene oxide polymers, polycarbonate resins, and aromatic polyester resins are preferred in that they are excellent in moldability, are well balanced in mechanical properties such as stiffness and creep resistance and, furthermore, are superior in weather resistance. Particularly preferred are olefin polymers and impact resistant resins (B).

(E) Inorganic Fillers

As inorganic fillers to be used in the preparation of the inorganic filler-containing thermoplastic resin (II) layer, those fillers widely used in the field of synthetic resins and rubbers can be used. They are inorganic compounds that do not react with oxygen and water. Preferably used are those fillers which are not decomposed during the process of kneading or molding. The inorganic fillers can be divided into groups: metals such as aluminum, copper, iron, lead, and nickel; compounds, such as oxides and their hydrates (hydroxides), sulfuric acid salts, carbonic acid salts, and silicic acid salts of the above metals and metals such as magnesium, calcium, barium, zinc, zirconium, molybdenum, silicon, antimony, and titanium; complex salts of the above metals; and mixtures thereof. Typical examples of these inorganic fillers are the above-described metals, aluminum oxide (alumina), their hydrates, calcium oxide, magnesium oxide (magnesia), magnesium hydroxide, zinc oxide, oxides of lead such as lead oxide red and lead oxide, magnesium carbonate, calcium carbonate, basic magnesium carbonate, white carbon, asbestos, mica, talc, glass fiber, glass powder, glass beads, clay, diatomaceous earth (kaolin clay), silica, wollastonite, iron oxide, antimony oxide, titanium oxide (titania), lithopone, pumice powder, aluminum sulfate (glypsum, for example), zirconium carbonate, zirconium oxide, barium carbonate, dolomite, molybdenum disulfide, and iron sand. In the case of powdered inorganic fillers, it is preferred that the diameter be 1 mm or less (with the range of from 0.5 mm or less being more preferred). In the case of fibrous inorganic fillers, it is preferred that the diameter be from 1 to 500 microns (with the range of from 1 to 300 microns being more preferred), and the length be from 0.1 to 6 mm (with the range of from 0.1 to 5 mm being more preferred). Further, in the case of plate-shaped inorganic fillers, it is preferred that the diameter be 2 mm or less (with the range of 1 mm or less being more preferred).

Of these inorganic fillers, mica, talc, calcium carbonate, glass fiber, wollastonite are desirable in that they increase stiffness. Particularly preferred are talc, mica, and glass fiber. With regard to these inorganic fillers, details are described in "Encyclopedia", Vol. 6, pp. 740-763 and Vol. 6, pp. 610 to 690 (1976).

(F) Layer Construction (1) Thermoplastic Resin (I) Layer

When a thermoplastic resin layer is used as a surface layer of the reflector of the present invention, it functions to prevent corrosion of the metallic layer. Thus the thickness of the thermoplastic resin layer is from 5 μm to 5 mm, preferably from 10 μm to 5 mm, and particularly preferably from 10 μm to 1 mm. If the thickness of the thermoplastic resin layer is less than 5 μm, the metallic layer is corroded. Another problem is that the thermoplastic resin layer is worn out by contact with other articles or friction during use, thereby exposing the metallic layer. On the other hand, if it is in excess of 5 mm, not only a reduction in the reflectance of wave, but also an increase in production costs and further in the weight of the ultimate laminated material undesirably occur.

(2) Coating (Paint) Layer

When a coating layer is used as a surface layer of the reflector of the present invention, it functions to prevent corrosion of the metallic layer. The thickness of the coating layer is from 5 μm to 1 mm, preferably from 10 μm to 0.5 mm, and particularly preferably from 10 μm to 0.3 mm. If the thickness of the coating layer is less than 5 μm, the corrosion of the metallic layer is caused. Furthermore, the coating layer is worn out by contact with other articles or friction during use, thereby exposing the metallic layer. On the other hand, if it is in excess of 1 mm, the reflectance of wave is reduced. Furthermore, the production costs and the weight of the laminated material are undesirably increased.

(3) Metallic Layer

The metallic layer acts to reflect the wave. The thickness of the metallic layer is from 5 μm to 1 mm, preferably from 5 to 500 μm, and particularly preferably from 10 to 500 μm. If the thickness of the metallic layer is less than 5 μm, wrinkles, for example, are readily formed in the metallic layer during the process of production of the laminated material, causing problems in appearance and performance. On the other hand, if it is in excess of 1 mm, not only the weight is increased, but also the production costs are increased, and problems are encountered in bending the laminated material.

(4) Inorganic Filler-Containing Thermoplastic Resin (II) Layer

The inorganic filler content in the inorganic filler-containing thermoplastic resin (II) layer is from 10 to 80% by weight (i.e., the proportion of the thermoplastic resin (II) is from 90 to 20% by weight), preferably from 10 to 70% by weight, and particularly preferably from 10 to 60% by weight. If the inorganic filler content is less than 10% by weight, there is an extreme difference in coefficient of linear expansion between the inorganic filler-containing thermoplastic resin (II) layer and the metallic layer. Thus, there is a possibility that the inorganic filler-containing thermoplastic resin (II) layer is peeled apart from the metallic layer. Furthermore, a problem arises in that the stiffness of the laminated material is reduced. On the other hand, if it is in excess of 80% by weight, a uniform composition is difficult to produce. Even if such a uniform composition is produced, satisfactory sheets or laminated materials cannot be produced by injection molding, for example.

The thickness of the inorganic filler-containing thermoplastic resin layer is from 500 μm to 15 mm, preferably from 1 to 10 mm, and particularly preferably from 1 to 7 mm. If the thickness of the inorganic filler-containing thermoplastic resin layer is less than 500 microns, the stiffness of the layer is low and the layer is undesirably deformed or broken by the external force. On the other hand, if it is in excess of 15 mm, a long period of time is needed for cooling at the time of molding. Furthermore, problems arise in that wrinkles are formed in the surface and the weight is increased.

In producing the above-described thermoplastic resin (I) layer and inorganic filler-containing thermoplastic resin (II) layer, additives commonly used, such as stabilizers against oxygen, heat and ultraviolet rays, metal deterioration-preventing agents, flame retardants, coloring agents, electrical property-improving agents, antistatic agents, lubricants, workability-improving agents, and tackiness-improving agents may be added within the range that they do not deteriorate the characteristics of the thermoplastic resin (I) and inorganic filler-containing resin (II) layers.

In compounding the above additives to the thermoplastic resin (I) of the present invention and in producing the inorganic filler-containing thermoplastic resin (II) (including the case of compounding the above additives to the inorganic filler-containing thermoplastic resin (II)), dry blending using mixers such as a Henschel mixer commonly used in the field may be employed, or melt kneading using a Banbury mixer, a kneader, a roll mill, and a screw type extruder, for example, may be employed. In this case, a uniform composition can be obtained by a procedure in which dry blending is first applied and then the resulting composition (mixture) is melt kneaded.

It is particularly preferred that the thermoplastic resin (II) be used in the form of powder, since it can be uniformly mixed.

In this case, the composition, after being melt kneaded, is generally pelletized and then used in the subsequent molding.

In producing the inorganic filler-containing thermoplastic resin (II), all components may be mixed at the same time, or alternatively part of the components are mixed to prepare a master batch which is then mixed with the other components.

When the above composition is prepared by melt kneading, it is necessary that the melt kneading be carried out at temperatures not lower than the melting point or softening point of the thermoplastic resin (I) or (II). If, however, it is carried out at higher temperatures, the thermoplastic resins (I) and (II) are deteriorated. In general, therefore, it is carried out in the temperature range 20° C. higher (preferably more than 50° C. higher) than the melting point or softening point of the thermoplastic resin (I) or (II) but not causing deterioration of the thermoplastic resin (I) or (II).

(G) Reflector for Circular Polarization Antenna

The reflector for a circular polarization antenna of the present invention is explained with reference to the accompanying drawings.

FIG. 1 is a partial perspective view of an antenna equipped with a reflector for a circular polarization antenna. FIG. 2 is a cross sectional view of a reflector in which the surface layer is made of a thermoplastic resin (I) or paint. FIG. 3 is a partial enlarged view of the cross section of FIG. 2. In FIG. 1, A indicates a reflector of the present invention, B indicates a convertor, C indicates a convertor-supporting bar, and D indicates a reflector-supporting bar, E indicates a wire. In FIG. 2, I indicates a laminated material comprising a thermoplastic resin (I) layer or coating layer, a primer layer, a metallic layer (a metallic foil), and a primer layer (all the primer layers may or may not be present), and II indicates an inorganic filler-containing thermoplastic resin (II) layer. In FIGS. 2 and 3, 1 is an inorganic filler-containing thermoplastic resin (II) layer, 2 is a metallic layer (a metallic foil), and 3 is a thermoplastic resin layer or coating layer having superior weather resistance. 2a and 2b are primer layers. As can be understood from the above drawings, the reflector of the present invention has a structure comprising at least three layers. In order to enhance the adhesion between the thermoplastic resin layer or coating layer having superior weather resistance and the metallic layer, or between the metallic layer and the inorganic filler-containing thermoplastic resin (II) layer, primers as described hereinafter can be used. Furthermore, to fit the reflector of the present invention to a support, the inorganic filler-containing thermoplastic resin (II) layer may be provided with an attaching rib, or to reinforce the reflector, a reinforcing rib may be provided. Moreover, the support for the circular polarization antenna may be bored and fitted by the use of bolts and nuts, for example. The diameter of the reflector of the present invention is usually from 60 to 120 cm.

FIG. 4 is a cross sectional view of a reflector including an expanded inorganic filler-containing olefin polymer layer. FIG. 5 is a partially enlarged view of the cross section of FIG. 4. In FIGS. 4 and 5, 1 indicates an inorganic filler-containing olefin polymer layer and 2 indicates a metallic layer (a metallic foil). 3 indicates a thermoplastic resin (I) layer or coating layer having superior weather resistance as in FIG. 3. $2a$ and $2b$ indicate primer layers (one or both of the primer layers may not be present) $1a$ is a skin layer and $1b$ is a core layer (an expanded layer). I indicates a laminated metallic foil (metallic layer) as in FIG. 3, II is an inorganic filler-containing olefin polymer layer, and III is a thick cylindrical portion. FIG. 6 is a cross sectional view of a reflector in a special embodiment, wherein $1'$ is an inorganic filler-containing olefin polymer layer, 2 is a metallic layer (a metallic foil), $3'$ is an olefin polymer layer, and $2a'$ and $2b'$ are modified olefin polymer layer. FIG. 7 is a cross sectional view of a reflector in another embodiment. In FIG. 7, $1c$ is an inorganic filler-free thermoplastic resin (II) layer and $1d$ is a thermoplastic resin (II) layer containing an inorganic filler.

(H) Process for Production of Reflector for Circular Polarization Antenna (1) In the Case Wherein a Thermoplastic Resin (I) Layer Is Used as a Surface Layer:

A metallic foil previously laminated is produced, and this laminated metallic foil is molded into a desired form by techniques such as vacuum molding, stamping molding, and injection molding. A process for the production of the laminated metallic foil by these molding methods is described below in detail.

(a) Process for Production of Laminated Metallic Foil

Lamination of a thermoplastic resin (I) on the above metallic foil (metallic layer) can be carried out by commonly used techniques. These techniques are described below in detail.

A thermoplastic resin (I) layer or coating layer having superior weather resistance can be laminated on or bonded to the metallic layer by a dry lamination method. When thermoplastic resins (I) capable of being extruded at high temperatures are used, the thermoplastic resin (I) layer can be laminated on the metallic layer by an extrusion lamination method. In producing the laminated metallic foil by the extrusion lamination method, it is sufficient that the thermoplastic resin (I) is extruded by the use of a T-die film molding machine in the temperature range of from 240° to 370° C. so that the thickness is within the above-defined range while at the same time the extruded layer is laminated on the metallic foil (metallic layer) by the use of cooling press rolls.

When thermoplastic resins (I) or paints having superior adhesion to the metallic foil are used, the laminated metallic foil can be produced by the above-described procedure. On the other hand, in the case of thermoplastic resins or paints exhibiting no satisfactory adhesion to the metallic foil, primers (anchor coating agents) as described hereinafter that are commonly used in the field of the thermoplastic resins (I) are coated on one side of the metallic foil by a gravure coating method or a reverse coating method and then dried at 50° to 100° C. Thereafter, a thermoplastic resin film or sheet is press bonded to the primer layer by the use of a press roll maintained at 50° to 100° C.

(b) Production by Vacuum Molding Method, Etc.

In accordance with this method, a primer is coated on one surface of the metallic layer with a thermoplastic resin (I) layer laminated on the other surface, and then an inorganic filler-containint thermoplastic (II) resin is extruded in the form of a sheet by a T-die molding method, whereupon there can be obtained a laminated material comprising a thermoplastic resin (I) layer having superior weather resistance, a metallic layer, and an inorganic filler-containing thermoplastic resin (II) layer. The thus-produced laminated material (sheet) is fixed by means of iron frames or snail-shaped devices, fitted to a jig that makes easy handling, and then introduced into an apparatus where it is heated by means of ceramic heaters or wire heaters arranged at upper and lower positions. The sheet starts to melt on heating. On continuing the heating after sagging of the sheet once occurred, the sheet is stretched in the frame. At this point when the above phenomenon is observed, the sheet is in good condition for molding of the sheet, so that no wrinkles or unevenness in thickness is formed. At this point, the sheet frame is taken out of the heating apparatus, placed on the top portion of a mold, and vacuum molded under a reduced pressure of 1 atmospheric pressure, whereupon the desired mold can be obtained. Thereafter, it is cooled with air or sprayed water and taken out of the mold.

In accordance with pressure molding, a sheet which has become easy to handle is placed on a mold, a chamber for applying pressure is placed on the sheet, and then the sheet is pressed toward the mold under a pressure of from 3 to 5 atmospheric pressure while at the same time the mold is pushed upward.

(c) Production by Stamping Molding

In producing a reflector for a circular polarization antenna of the present invention, a laminated material comprising a thermoplastic resin (I) layer or coating layer having superior weather resistance, a metallic layer, and an inorganic filler-containing thermoplastic resin (II) layer as produced by the above-described vacuum molding method is placed in a squeezing mold fitted to a vertical press machine and then heat molded under a pressure of from 5 to 50 kg/cm² (preferably from 10 to 20 kg/cm²) whereupon the desired mold can be obtained. The mold is then cooled with air or sprayed water and then taken out of the mold. In this molding, the press time is usually at least 15 seconds, and generally from 15 to 40 seconds. In order to improve surface characteristics, it is preferred that the molding be performed under two-stage pressure conditions. At the first stage, the laminated material is pressed under a pressure of from 10 to 20 kg/cm² for from 15 or 40 seconds and at the second stage it is pressed under a pressure of from 40 to 50 kg/cm² for at least 5 seconds, whereupon there can be obtained a mold having superior surface smoothness. Particularly, when an inorganic filler-containing thermoplastic resin (II) layer having poor fluidity is used, it is desirable to employ the above two-stage molding method.

(d) Production by Injection Molding Method

In producing the reflector of the present invention by the injection molding method, a metallic layer with a thermoplastic resin (I) layer or coating layer having superior weather resistance laminated on one side and with a primer layer coated on the other side is subjected to insert injection molding at the time of molding the reflector. In the practice of the insert injection molding, the above metallic layer is placed between a male mold and a female mold in such a manner that the thermoplastic resin (I) layer or coating layer having superior weather resistance is in contact with the male mold and then the mold is closed. Thereafter, an inorganic filler-containing thermoplastic resin (II) is introduced into the mold and cooled, and then the mold is opened, whereupon the desired reflector is obtained. In the insert injection molding, the resin temperature is higher than the melting point of the thermoplastic resin (II) but lower than the decomposition temperature thereof. If the injection pressure is such that the gauge pressure in the nozzle portion of the cylinder of the injection molding machine is at least 40 kg/cm$^2$, molding in a form nearly equivalent with the shape of the mold can be attained. Furthermore, there can be obtained an article having good appearance. The injection pressure is usually from 40 to 140 kg/cm$^2$ and preferably from 70 to 120 kg/cm$^2$.

(2) In the Case Wherein a Paint (Coating Layer) Is Used as a Surface Layer:

Various methods can be employed in producing the reflector of the present invention using a paint (coating layer) as a surface layer. In accordance with a typical example of the methods, a primer or anchor coating agent as described hereinafter is coated on one surface of a metallic layer and then dried to form a coating layer, and the metallic layer with the above coating layer is laminated on an inorganic filler-containing thermoplastic resin (II) layer with or without application of primers. After the lamination of the metallic layer on the inorganic filler-containing thermoplastic resin (II) layer, the paint may be coated on the top surface of the metallic layer.

The reflector of the present invention can be produced by laminating an inorganic filler-containing thermoplastic resin (II) layer on a metallic layer with a coating layer provided thereon, or laminating an inorganic filler-containing thermoplastic resin (II) layer on a metallic layer and, thereafter, applying coating as described hereinafter. In either case, if the adhesion between the metallic layer and the inorganic filler-containing thermoplastic resin (II) layer is satisfactorily high, it is not necessary to coat a primer on the metallic layer. A metallic layer and an inorganic filler-containing thermoplastic resin (II) layer may be first laminated with or without a primer by the extrusion lamination method to produce a laminated material which is then molded by the vacuum molding method, pressure molding method, or stamping molding method. In addition, the reflector of the present invention may be produced using a metallic layer with a coating layer according to the insert injection molding method. Furthermore, the reflector may be produced by laminating inorganic filler-containing thermoplastic resin (II) layer and a metallic layer having or not having a coating layer and with or without application of a primer between the metallic layer and the inorganic filler-containing thermoplastic resin (II) layer and, thereafter, bonding them together under pressure while heating. In producing the reflector of the present invention, a procedure may be employed in which a mold for production of the reflector, comprising a metallic layer not having a coating layer and further not coated with a primer and an inorganic filler-containing thermoplastic resin (II) layer is first produced and, thereafter, a coating layer is provided with or without application of a primer. The above-described vacuum molding method, pressure molding method, stamping molding method, and insert injection molding method are all well known in the art; commonly used techniques can be applied.

A method of coating a paint on the metallic layer of the mold, which has been produced by the vacuum molding method, the pressure molding method, the stamping molding method, or the injection molding method and has not been coated with a paint, is not critical in the present invention. For example, a method of spraying the paint by the use of a spray gun with or without previous coating of a primer, a method of coating with a brush, and a method of coating by the use of a roll coater can be employed. Industrially, the method of using a spray gun is effective. In particular, a method of coating by the use of a robot is preferably used.

In the above vacuum molding method, pressure molding method and stamping molding method, a primer layer is not placed between the coating layer and the metallic layer. When, however, the adhesion between the paint and the metallic layer is not sufficiently satisfactory, a primer layer may be sandwiched therebetween. This primer can be applied by commonly used procedures. Usually the primer is coated on one surface of the metallic foil by a gravure coating method or a bar coating method, for example, and then dried at 50° to 100° C.

(3) Use of Expanded Inorganic Filler-Containing Olefin Polymer (II) Layer

In cases that as thermoplastic resins (II) for the inorganic filler-containing thermoplastic resin (II) layer in the production of the reflector of the present invention, olefin polymers as described above are used, blowing agents as described hereinafter may be added to the inorganic filler-containing olefin polymers so that there may be formed an expanded inorganic filler-containing olefin polymer layer comprising a skin layer and a core layer, said skin layer being a substantially unexpanded layer and said core layer being an expanded layer.

The thickness of the skin layer is usually from 5 to 45% of the total thickness of the inorganic filler-containing olefin polymer layer. If the thickness of the skin layer is less than 5% of the total thickness of the inorganic filler-containing olefin polymer layer, expansion traces (silver streaks) are formed in the surface and the appearance is not good. On the other hand, if it is in excess of 45%, sink mark (minute concave) is formed in the rib portion and the thick portion of the back surface.

As blowing agents to be added to the inorganic filler-containing olefin polymer layer constituting the core layer, any blowing agents commonly used in the art can be used. Inorganic or organic physical or chemical blowing agents can be used. Physical blowing agents are at least in a gaseous form at molding temperatures as described hereinafter and do not exert adverse influences on inorganic fillers compounded. Typical examples of such blowing agents are organic compounds such as hydrocarbons (e.g., pentane, butane, and propane), halogenated hydrocarbons, and alcohols, and inorganic elements or compounds such as nitrogen gas and carbon dioxide gas. Chemical blowing agents are those compounds which are not decomposed at ordinary temperature but are decomposed at molding temperatures as described hereinafter, thereby generating gases such as carbon dioxide gas, nitrogen gas and ammonia. Furthermore, they do not exert adverse influences on both the olefin polymers and inorganic fillers compounded. Typical examples of such blowing agents includes sodium hydrogencarbonate, ammonium hydrogencarbonate, ammonium carbonate, ammonium nitrite, and azide compounds, azo compounds (e.g., azodicarbonamide and barium azodicarboxylate), and sulfonyl hydrazide compounds.

Of these blowing agents, those compounds generating carbon dioxide gas and nitrogen are desirable. Blowing agents not generating carbon dioxide gas or nitrogen at the time of kneading (less than 150° C.) but producing it at the time of molding (less than 300° C.) are suitable. These blowing agents are described in "Encyclopedia", Vol. 2, pp. 532–565.

These blowing agents may be used singly or in combination with each other. In addition, blowing promotors may be added. The amount of the blowing promotor added varies depending on the thickness of the inorganic filler-containing olefin polymer layer, the thickness of the rib or thick portion of the reflector, and the height of the rib or thick portion. In general, it is appropriate to be from 0.1 to 20% by weight based on the weight of the inorganic filler-containing olefin polymer layer.

The average degree of expansion of the inorganic filler-containing olefin polymer layer is usually from 1.005 to 1.50, preferably from 1.005 to 1.45, and particularly preferably from 1.01 to 1.40. If the average degree of expansion of the inorganic filler-containing olefin polymer layer is less than 1.005, sink mark is formed in the surface of the ultimate mold. On the other hand, if it is in excess of 1.50, expansion traces are present in the skin layer of the inorganic filler-containing olefin polymer layer and the appearance is not satisfactory.

In producing the reflector of the present invention in accordance with this method, a metallic foil as laminated as described above according to this method, the laminated metallic foil is molded by the above-described injection molding method, whereupon there can be obtained an article (reflector for a circular polarization antenna) comprising a core layer (expanded layer) and a skin layer (smooth unexpanded layer) and having a satisfactory appearance.

In order that a layer made of this inorganic filler-containing olefin polymer (a composition of an olefin polymer and an inorganic filler) constitutes a skin layer and a core layer, a master batch containing a blowing agent may be blended with the inorganic filler-containing olefin polymer and then injection molded, or alternatively a procedure may be used in which two injection molding machines are used: an inorganic filler-containing olefin polymer not containing a blowing agent is first injected into a mold and, thereafter, prior to solidification of the central portion of the injected inorganic filler-containing olefin polymer, an inorganic filler-containing olefin polymer containing a blowing agent is injected into the central portion of the above-injected inorganic filler-containing olefin polymer through a nozzle of the other injection molding machine, whereupon a skin layer made of the first injected inorganic filler-containing olefin polymer and a core layer (expanded layer) made of the secondly injected inorganic filler-containing olefin polymer with the blowing agent compounded thereto can be formed. In practice of the insert injection molding, the above-described metallic layer is placed between the molds of the injection molding machine (in such a manner that the thermoplastic resin (I) layer having superior weather resistance is in contact with the male mold) and then the mold is closed. An inorganic filler-containing olefin polymer is injected into the mold through a gate of the mold and cooled and, thereafter, the mold is opened, whereupon the desired reflector can be produced. In this case, the injection molding temperature is higher than the melting point of the olefin polymer of the inorganic filler-containing olefin polymer, and higher than the decomposition temperature in the case of chemical blowing agents or gasification temperature in the case of physical blowing agents. When, as the olefin polymer, a propylene polymer is used, it is preferred that the insert injection molding be conducted in the temperature range of from 170° to 290° C. On the other hand, when, as the olefin polymer, an ethylene polymer is used, the insert injection molding is carried out in the temperature range of from 120° to 250° C.

(4) Use of Modified Olefin Polymer

If any one or both of the thermoplastic resin (I) and the thermoplastic resin (II) are olefin polymers, the adhesiveness between the metallic layer and the olefin polymer layer can be increased by placing a modified olefin polymer layer as described hereinafter between the metallic layer (metallic foil) and the olefin polymer layer or the inorganic filler-containing olefin polymer layer, or between the metallic layer and the olefin polymer layer and also between the metallic layer and the inorganic filler-containing olefin polymer layer.

Such modified olefin polymers are prepared by modifying the above-described olefin polymers with unsaturated carboxylic acids and/or their anhydrides as described below.

Typical examples of these unsaturated carboxylic acids and their anhydrides to be used in the preparation of the modified olefin polymer layer are monobasic carboxylic acids having 10 or less carbon atoms and containing at least one double bond (e.g., acrylic acid and methacrylic acid), dibasic carboxylic acids having 15 or less carbon atoms and containing at least one double bond (e.g., maleic acid), and anhydrides of the above dibasic carboxylic acids (e.g., maleic anhydride and hymic anhydride). Of these unsaturated carboxylic acids and their anhydrides, maleic acid and maleic anhydride are particularly preferred.

The modified olefin polymers are prepared by reacting olefin polymers with unsaturated carboxylic acid and/or their anhydrides in the presence of organic peroxides.

Any of the known methods (e.g., a solution process, a suspension process, and a melt process) can be used in production of the modified olefin polymers.

When the olefin polymers are modified with unsaturated carboxylic acids or thier anhydrides according to the solution process, the olefin polymers and unsaturated carboxylic acids and/or their anhydrides are placed in an organic non-polar solvent and heated with a radical initiator at high temperatures, whereupon the desired modified olefin polymers can be obtained. In this case/ as organic solvents, hexane, heptane, benzene, toluene, xylene, chlorobenzene, and tetrachloroethane can be used. As radical initiators, organic peroxides such as 2,5-dimethyl-2,5-di(tertbutylperoxy)hexane, 2,5-dimethyl-5,5-di(tert-butylperoxy)hexene-3 and benzoyl peroxide can be used. The reaction temperature is from 110° to 160° C. and preferably from 130° to 150° C.

In modifying the olefin polymers with unsaturated carboxylic acids or their anhydrides according to the suspension process, the olefin polymers and unsaturated carboxylic acids and/or their anhydrides are placed in a polar solvent (generally water) and further the above-described radical initiator is added, and the resulting mixture is treated under elevated pressure at a temperature of more than 100° C.

In modifying the olefin polymers with unsaturated carboxylic acids or their anhydrides according to the melt process, a melt kneader (e.g., an extruder) commonly used in the field of synthetic resins is used, and the olefin polymers, unsaturated carboxylic acids and/or their anhydrides, and radical initiators are melt kneaded in the melt kneader. In this case, the kneading temperature varies with the type of the olefin polymer and the radical initiator; usually it is in the range of from the melting point of the olefin polymer to less then 300° C. In the case of ethylene polymers, the kneading temperature is generally from 120° to 270° C., and in the case of propylene polymers, it is generally from 160° to 270° C.

The amount of the unsaturated carboxylic acid or its derivative in the modified olefin polymer is from 0.01 to 10% by weight, preferably from 0.05 to 5.0% by weight, and especially preferably from 0.1 to 5.0% by weight, based on the total weight of the modified olefin polymer. If the unsaturated carboxylic acid or its anhydride content of the modified olefin polymer is less than 0.01% by weight, a cross-linking reaction does not almost occur and, therefore, the adhesion between the olefin polymer layer and the metallic layer, and also between the metallic layer and the inorganic filler-containing olefin polymer layer is not satisfactory. On the other hand, if it is in excess of 10% by weight, the cross-linked product (modified olefin polymer layer) has seriously reduced moldability.

The thickness of the modified olefin polymer layer is from 10 to 500 microns, preferably from 10 to 400 microns, and especially preferably from 10 to 300 microns. If the thickness of the modified olefin polymer layer is less than 10 microns, no uniform adhesion can be obtained. On the other hand, if it is in excess of 500 microns, a method of lamination as described hereinafter is difficult to conduct in the production of the reflector of the present invention and furthermore it leads to an increase in product costs.

Various procedures can be employed to produce the reflector of the present invention using the above-produced modified olefin polymers.

In FIG. 6, 1' indicates an inorganic filler-containing olefin polymer layer, and 2 indicates a metallic layer (metallic foil). 3' indicates an olefin polymer layer having superior weather resistance. In addition, 2a' and 2b' indicate modified olefin polymer layers. In the reflector of the present invention, modified olefin polymers are used between the olefin polymer layer and the metallic layer and/or between the metallic layer and the inorganic filler-containing olefin polymer layer in order to increase the adhesion between the layers.

(5) Process for Production of Reflector for Circular Polarization Antenna as Shown in FIG. 6

As can be seen from FIG. 6, the reflector of the present invention comprises an olefin polymer layer 3', a modified olefin polymer layer 2a', a metallic layer 2, a modified olefin polymer layer 2b', and an inorganic filler-containing olefin polymer layer 1', which are laminated in this order. This laminate can be produced by various methods. The layers may be laminated one by one, or may be laminated at the same time. Another method which may be employed is that two to four layers are laminated in advance and then the other layers are laminated successively. Still another method is that two to four layers are laminated in advance and then a laminate of two or three of the other layers is laminated thereon. A further method which may be employed is that a laminate of two layers and a laminate of two layers are laminated, and then the other layer is laminated on the above-produced laminate. A still further method is that one layer is laminated on a laminate of two layers, and then a laminate of the other two layers is laminated thereon.

Methods of lamination which can be employed in the production of this type of reflector of the present invention include a dry lamination method and an extrusion lamination method.

The dry lamination method is a method in which laminate constituents or a laminate which has been previously produced is laminated under pressure by the use of press rolls maintained at from 50° to 200° C. In the extrusion lamination method, an olefin polymer containing an ultraviolet absorber, a modified olefin polymer, or an inorganic filler-containing olefin polymer is shaped into Layer 1', 2a', 2b' or 3', respectively, at a temperature of from 180° to 300° C. by the use of a T-die molding machine while at the same time the layers are bonded together by heating in the same manner as above to produce a laminate.

The thus-produced laminate is molded by the vacuum molding method, the stamping molding method, or the injection molding method, for example, which are generally used, whereupon the reflector of the present invention can be obtained.

(6) Special Method Using Laminated Metallic Foil

This is a special method for injection molding of the above-laminated metallic foil in the production of the reflector of the present invention. A metallic foil with a thermoplastic resin (I) layer or coating layer having superior weather resistance laminated on one side thereof and a thermoplastic resin (II) layer (Layer 1c in FIG. 7) laminated the other side is produced in the same manner as described above. This laminated metallic foil is mounted on a mold in such a manner that the thermoplastic resin (I) layer or coating layer having superior weather resistance is on the moving side of the injection molding mold and the thermoplastic resin (II) layer is on the fixed side, and the mold is closed. Then, a thermoplastic resin (II) containing an inorganic filler, which is of the same type as the thermoplastic resin (II) used in Layer 1c or has good compatibility with the thermoplastic resin (II), is injection molded in the same manner as described above.

A partially enlarged cross sectional view of the resulting reflector is shown in FIG. 7. In FIG. 7, 3 denotes the thermoplastic resin (I) layer or coating layer having superior weather resistance, and 2 denotes a metallic layer (metallic foil). 1c denotes an (inorganic filler-free)thermoplastic resin (II) layer, and 1d denotes a thermoplastic resin (II) layer containing an inorganic filler. Further, 2a and 2b denote primer layers (if any one or both of the primer layers are not used, 2a and/or 2b are not present).

In the thus-produced reflector, the thermoplastic resin (II) layer laminated on the metallic foil partially mixes with the inorganic filler-containing thermoplastic resin (II) layer and, therefore, there is no clear interface between the layers.

The thus-produced reflector has, as well as the above-described effects, the following effects.

(i) Since a thermoplastic resin (II) layer is sandwiched between an inorganic filler-containing thermoplastic resin (II) layer functioning as a structural member and a metallic foil, the adhesion between the inorganic filler-containing thermoplastic resin (II) layer and the metallic layer is greatly increased. Even if the inorganic filler-containing thermoplastic resin (II) layer and the metallic layer are attempted to separate from each other, if a suitable primer is selected, the adhesion between the metallic foil and the thermoplastic resin (II) layer can be increased to such an extent that they cannot be separated from each other without the breakdown of any one of the layers.

(ii) Since the thermoplastic resin (II) layer partially mixes with the inorganic filler-containing thermoplastic resin (II) layer during injection molding, the inorganic filler-containing thermoplastic resin (II) layer functioning as a structural member does not exert adverse influences on the mechanical strength (e.g., stiffness).

(iii) A laminated metallic foil is easy to handle. It can be stored in the form of a roll, for example.

(iv) Since the laminated metallic foil can be placed in the form of a roll at the time of injection molding, it can be supplied continuously. This greatly increases productivity.

(7) Molding Temperature

The molding temperature in the above vacuum molding method, pressure molding method, stamping molding method, and injection molding method varies with the type of the thermoplastic resin (II). Preferred molding temperatures for several thermoplastic resins (II) are shown in the table below.

TABLE

| Type of Thermoplastic Resin (II) | Vacuum Molding or Pressure Molding (°C.) | Stamping Molding (°C.) | Injection Molding (°C.) |
|---|---|---|---|
| Ethylene Polymer | 125–145 | 85–110 | 120–250 |
| Propylene Polymer | 165–175 | 125–135 | 170–290 |
| Polyamide Resin (a)* | 220–270 | 220–280 | 230–300 |
| Polyamide Resin (b)** | 230–300 | 230–300 | 240–330 |
| Polycarbonate Resin | 140–230 | 240–300 | 250–300 |
| Styrene Polymer | 110–180 | 160–230 | 160–230 |
| Impact Resistant Resin (A) | 110–200 | 110–180 | 160–240 |
| Impact Resistant Resin (B) | | | |
| ABS, AAS, AES | 140–230 | 130–260 | 190–296 |
| MBS | 150–245 | 140–270 | 200–290 |
| Phenylene Oxide Polymer | 150–250 | 130–240 | 220–300 |
| Methyl Methacrylate Polymer | 140–210 | 120–190 | 220–270 |
| PET | 130–200 | 90–180 | 250–300 |
| PBT | 100–180 | 70–160 | 230–280 |
| Oxymethylene Polymer | 160–200 | 140–200 | 190–230 |
| Vinyl Chloride Polymer | 150–200 | 130–180 | 160–200 |

*By ring-opening polymerization (e.g., polyamide 6)
**By polycondensation (e.g., polyamide 6,6)

(8) Primers

Primers commonly used in various fields can be used, although they vary depending on the type of the thermoplastic resin (I) or paint to be used to form the thermoplastic resin (I) layer or coating layer having superior weather resistance, and the type of the thermoplastic resin (II) to be used to form the inorganic filler-containing thermoplastic resin (II) layer. They can be divided into two groups: water type and solvent type. They include vinyl-, acryl-, polyamide-, epoxy-, rubber-, urethane- and titanium-based primers.

The present invention is described in greater detail with reference to the following examples.

The testing methods employed in the examples are first described below.

The peeling strength was measured as follows:

A 15 mm wide test specimen was cut off from the reflector, and the metallic layer of the test specimen was peeled apart at 180° C. at a speed of 50 mm/min according to ASTM D-903. The peeling strength was evaluated as a stregnth at which the metallic layer was separated from the test specimen.

The flexural stiffness was measured according to ASTM D-790.

The coefficient of thermal expansion was measured according to ASTM D-696.

The types and physical properties, for example, of thermoplastic resins of the thermoplastic resin layer, paints constituting the coating layer, inorganic fillers, and metallic foils are described below.

(A) Thermoplastic Resins (I)

As thermoplastic resins, polyvinylidene fluorine (hereinafter referred to as "PVdF") having a melt flow rate (as determined according to ASTM D-1238 (temperature: 250° C.; load: 10 kg)) of 6.1 g/10 min; a propylene homopolymer containing 0.4% by weight of a benzotriazole-based ultraviolet absorber and 0.5% by weight of carbon black (MFI: 0.5 g/10 min) (this propylene homopolymer is hereinafter referred to as "PP(A)"); high density polyethylene containing 0.4% by weight of a benzotriazole-based ultraviolet absorber and 0.5% by weight of carbon black (density: 0.958 g/cm$^2$; MI: 0.8 g/10 min) (this high density polyethylene is hereinafter referred to as "HDPE(1)"); a composition prepared by kneading a mixture of 20 parts by weight of chlorinated polyethylene having a Mooney viscosity (ML$_{1.4}$) of 108 (chlorine content: 3.15% by weight; amorphous; molecular weight of the polyethylene starting material: about 200,000) and 80 parts by weight of an acrylonitrile/styrene copolymer resin (acrylonitrile content: 23% by weight), said mixture further containing 2 parts by weight of a dibutyl tin maleate stabilizer (trade name: Stann BM; produced by Sankyo Yuki Gosei Co., Ltd.), for 10 minutes by the use of rolls (surface temperature: 180° C.) (this composition is hereinafter referred to as "ACS"); and a mixture prepared by compounding 20 parts by weight of dioctyl phthalate (as a plasticizer) and 5.0 parts by weight of dibutyl tin maleate (as a dehydrochlorination-inhibitor) to 100 parts by weight of a vinyl chloride homopolymer (degree of polymerization: 1,100) (this mixture is hereinafter referred to as "PVC") were used.

(B) Paints

As paints, a two-component fluorine resin (trade name: V-Furon; produced by Dainippon Toryo Co., Ltd.; hereinafter referred to as "Paint F") and a two-component polyurethane resin (trade name: Hi Urethane; produced by Nippon Yushi Co., Ltd.; hereinafter referred to as "Paint U") were used.

(C) Thermoplastic Resins (II)

(1) Olefin Polymers

As olefin polymers, a propylene/ethylene block copolymer having an MFI of 0.7 g/10 min (ethylene content: 10.5% by weight; hereinafter referred to as "PP(B)"); and a high density ethylene homopolymer having an MI of 20 g/10 min (density: 0.961 g/cm$^3$; hereinafter referred to as "HDPE(2)") were used.

(2) Polyamide Resin

As polyamide resins, a polyamide resin (melt viscosity at 250° C.: 3,000 poises; density: 1.13 g/cm$^3$) as produced by ring-opening polymerization of ε-caprolactam; and a polyamide resin (melt viscosity at 280° C.: 1,500 poises) as produced by polycondensation of hexamethylenediamine and adipic acid were used. These polyamide resins are designated, respectively, as "Nylon 6" and "Nylon 66".

(3) Polycarbonate Resin

As a polycarbonate resin, an intermediate density polycarbonate resin (density: about 1.2 g/cm$^3$; MFI: 4.5 g/10 min; hereinafter referred to as "PC") as prepared using bisphenol A as a major starting material was used.

(4) Styrene-Based Resin

Styrene was suspended in water and, after addition of an emulsifier and a catalyst, polymerized at a temperature of 90° C. to prepare a styrene resin having a melt flow index of 1.30 g/10 min (temperature: 190° C.; load: 10 kg; measured according to JIS K-6870). This styrene resin is designated as "PS". Styrene (92 parts by weight) was graft copolymerized onto 8.1 parts by weight of a styrene-butadiene random copolymer rubber (styrene content: 25.3% by weight; Mooney viscosity (ML$_{1+4}$): 25) to prepare a high impact polystyrene having a melt flow index of 13.0 g/10 min. This high impact polystyrene is designated as "HIPS".

(5) Impact Resistant Resin (A)

As impact resistant resins (A), ACS(1) and ACS(2), and Mixture (1) and Mixture (2) as prepared below were used.

Preparation of ACS(1)

A 20 liter autoclave was charged with 1,600 g of chlorinated polyethylene having a Mooney viscosity (MS$_{1+4}$ 100) of 76 (chlorine content: 40.6% by weight; the molecular weight of the polyethylene starting material: about 200,000; hereinafter referred to as "Cl-PE(a)"), 32.0 g of polyvinyl alcohol (degree of saponification: 95%), and 8.0 liters of water (ion-exchanged water). The mixture was then stirred vigorously at room temperature (about 23° C.). To the resulting suspension were added with stirring at ordinary temperature 4,560 g of styrene, 1,520 g of acrylonitrile, 320 g of fluid paraffin as a lubricant, 16.0 g of tert-butyl peroxyacetate as a polymerization initiator, and 16.0 g of tert-dodecylmercaptan as a chain transfer. The atmosphere in the reaction system was replaced by nitrogen gas and then the temperature was raised to 105° C. At this temperature, polymerization was conducted for 4 hours while stirring. Then, the polymerization was conducted at 145° C. for 2 hours. Subsequently the reaction mixture was allowed to cool to room temperature. The polymer (grafted product) formed was filtered off and thoroughly washed with water. The grafted product was dried under reduced pressure for one day and night. The polymerization conversion (based on the weight of the monomers used in polymerization) was 95.4%. The product was in the form of somewhat coarse powder. The rubber-like material content of the grafted product (hereinafter referred to as "ACS(1)") was 20.3% by weight.

To ACS(1) as prepared above was added 2% by weight of a dibutyl tin maleate-based stabilizer (trade name: Stann BM; produced by Sankyo Yuki Gosei Co., Ltd.), and the resulting mixture was kneaded for 10 minutes by the use of rolls the surface temperature of which was set at 180° C. The thus-obtained mixture was pressed for 5 minutes under a pressure of 100 kg/cm$^2$ by the use of a press machine maintained at 200° C. and then for 2 minutes under a pressure of 100 kg/cm$^2$ by the use of a cooling press machine. For the thus-produced plate, the Izod impact strength (notched) was 8.0 kg.cm/cm, the tensile strength was 325 kg/cm$^2$, and the Vicat softening point was 93.8° C.

Preparation of ACS(2)

Polymerization was conducted under the same conditions as in the case of ACS(1) except that the amounts of Cl-PE(a), styrene, and acrylonitrile used were changed to 6.0 kg, 1,280 g, and 320 g, respectively. After the polymerization was completed, filtration, washing with water, and drying were conducted in the same manner as in the case of ACS(1), whereupon a polymer (grafted product) was obtained. The polymerization conversion of the grafted product (hereinafter referred to as "ACS(2)") was 95.3%, and the grafted product was in the form of somewhat coarse powder. The rubber-like material content of ACS(2) was 79.6%.

Preparation of Mixture (1)

A ⅓ mixture of ACS(2) and an acrylonitrile/styrene copolymer resin (acrylonitrile content: 23% by weight; hereinafter referred to as "AS") was melt kneaded under the same conditions as in the case of ACS(1). The thus-obtained mixture (hereinafter referred to as "Mixture(1)") was pressed in the same manner as in the case of ACS(1) to produce a plate. For the thus-produced plate, the Izod impact strength (notched) was 7.8 kg.cm/cm, the tensile strength was 330 kg/cm$^2$, and the Vicat softening point was 93.7° C.

Preparation of Mixture (2)

100 parts by weight of chlorinated polyethylene having a Mooney viscosity (MS$_{1+4}$ 100) of 75 (chlorine content: 36.2% by weight; amorphous; the molecular weight of the polyethylene starting material: about 250,000), 400 parts by weight of AS used in the above mixture, and 2 parts by weight of the above dibutyl tin maleatebased stabilizer were melt kneaded in the same manner as in the case of ACS(1). The thus-obtained mixture (hereinafter referred to as "Mixture(2)") was pressed in the same manner as in the case of ACS(1) to produce a plate. For the thus-produced plate, the Izod impact strength (notched) was 8.0 kg.cm/cm, the tensile strength was 340 kg/cm$^2$, and the Vicat softening point was 94.5° C.

(6) Impact Resistant Resins (B)

As impact resistant resins (B), ABS, MBS, AAS and AES resins as prepared below were used.

(a) ABS Resin

A 20 liter autoclave made of stainless steel was charged with 280.0 g (as solids) of a styrenebutadiene copolymer rubber (butadiene content: 80% by weight; gel content of rubber: 80%), 2.0 g of ammonium persulfate, 80.0 g of sodium rosinate for disproportionation, 21.0 g of laurylmercaptan, and 8.0 l (liters) of water. They were uniformly mixed, and 2,520 g of styrene and 1,200 g of acrylonitrile were added thereto. The resulting mixture was stirred, and then, raised in temperature to 70° C. while stirring. At this temperature, polymerization was performed with stirring for 10 hours. To the thus-prepared polymer (grafted product)-containing latex-like material was added a 5% aqueous solution of aluminum sulfate to coagulate the grafted product. The coagulated product was washed with about 5,200 ml of an about 1% aqueous solution of sodium hydroxide, and further, with a large amount (about 30 liters) of hot water maintained at 70° C. The grafted product was dried at about 80° C. under reduced pressure one day and night. There was thus obtained 3,785 g of white powdery grafted product. The Izod impact resistance of the grafted product was 7.5 kg.cm/cm notch, and its tensile strength was 468 kg/cm$^2$. The Vicat softening point of the polymer was 101.5° C. The rubber-like material content of the grafted product was 7.3% by weight. This grafted product is hereinafter referred to as "ABS".

(b) MBS Resin

A 20 liter autoclave made of stainless steel was charged with about 12,000 ml of an aqueous dispersion containing 1,380 g of a butadiene-styrene copolymer rubber (Mooney viscosity: 50) consisting of 76.5% by weight of butadiene and 23.5% by weight of styrene. An aqueous solution of 480 g of sodium formaldehydesulfoxylate dihydrate dissolved in about 2,400 ml of water, and 160.0 g of cumene hydroperoxide were added in a stream of nitrogen while maintaining the temperature at 60° C. The mixture was stirred for 1 hour. Then, a mixture of 7,680 g of methyl methacrylate and 32.0 g of cumene hydroperoxide was added, and polymerization was allowed to proceed. After about 7 hours, the polymerization conversion ratio was 91.8%. Thereafter, a mixture of 6,880 g of styrene and 32.0 g of cumene hydroperoxide was added, and polymerization was allowed to proceed. After about 6 hours, the polymerization conversion ratio was 93.3%. To the resulting reaction solution were added an aqueous solution of hydrochloric acid and sodium chloride (salt) to coagulate it. The thus-obtained precipitate was filtered off, thoroughly washed with hot water, and then dried at a temperature of about 80° C. under reduced pressure for about 24 hours. There was thus obtained a white powdery polymer (grafted product). The Izod impact strength of the grafted product was 7.6 kg.cm/cm notch, and its tensile strength was 415 kg/cm$^2$. The Vicat softening point of the grafted product was 97.2° C. The rubber-like material content of the grafted product (hereinafter referred to as "MBS") was 9.6% by weight.

(c) AAS Resin

A 20 liter autoclave made of stainless steel was charged with about 8,000 ml of distilled water, 24.0 g of sodium dodecylbenzenesulfonate, 0.80 g of ammonium persulfate as a polymerization catalyst, and as monomers, 784 g of butyl acrylate and 16.0 g of glycidyl methacrylate. Polymerization was performed at 77° C. with stirring until the monomers are almost completely polymerized to prepare acrylic acid esterbased rubber. To the polymerization system containing the acrylic acid ester-based rubber were added 1,680 g of styrene and 720 g of acrylonitrile as monomers, and 16.0 g of potassium persulfate as a polymerization catalyst, and polymerization was performed at 83° C. for 10 hours while stirring. There was thus obtained an emulsion polymer (grafted product) containing almost no unreacted monomers. When a 5% aqueous solution of aluminum sulfate was added dropwise to the above-obtained grafted product-containing emulsion while stirring, the polymer (grafted product) precipitated. This water-containing polymer was then centrifuged to remove the water, and the polymer was fully washed with water and dried at about 50° C. under reduced pressure. The Izod impact strength of the grafted product was 24.8 kg.cm/cm notch, and its tensile strength was 350 kg/cm$^2$. The softening point was 97.6° C. The rubber-like material content of the grafted product (hereinafter referred to as "AAS") was 23.8% by weight.

(d) AES Resin

A 20 liter autoclave made of stainless steel was charged with 5,350 g of styrene as a monomer, 1,500 g of an ethylene-propylene-diene terpolymer rubber (Mooney viscosity ML$_{1+4}$ (100° C.): 45; unconjugated diene component: ethylidenenorbornene; iodine value: 25) as a rubber-like material, and 1.0 kg of n-heptane. After the air in the autoclave was replaced by nitrogen, the mixture was stirred at 50° C. for 2 hours to completely dissolve the ethylene-propylene-diene terpolymer rubber in styrene. To this reaction (polymerization) system was added 2,150 g of acrylonitrile as a monomer, and the resulting mixture was fully stirred to form a uniform solution. To the uniform solution were added 5.0 g of terpinolene and, as a catalyst, a mixture of 5.0 g of di-tert-butyl peroxide and 1.3 g of tert-butyl peracetate. The resulting polymerization system was raised in temperature to 97° C. Bulk polymerization was performed for 7 hours and 20 minutes at a nitrogen pressure of 1 kg/cm$^2$ while maintaining the temperature at 97° C. About 30 minutes before the completion of the polymerization, a solution of 15.0 g of di-tert-butyl peroxide and 15.0 g of terpinolene dissolved in 500 g of styrene was added to the reaction mixture. The thusformed syrup (containing polymer) was transferred to a 30 liter autoclave in which 11 liters of water (containing 25 g of an acrylic acid-acrylic acid ester copolymer as a suspension) had been placed, and nitrogen was passed through the autoclave to displace the air. This aqueous suspension was subjected to suspension polymerization for 2 hours with vigorous stirring at 130° C. The reaction mixture was then raised in temperature to 150° C. and was subjected to stripping for 1 hour. The thus-obtained polymer (graft-blended product) was fully washed with water and dried at 100° C. There was thus obtained 9.28 kg of a grafted product (hereinafter referred to as "AES"). The rubber-like material content of this AES was 16.0% by weight. The Izod impact strength of the AES was 37.9 kg.cm/cm notch, and its tensile strength was 350 kg/cm$^2$. The Vicat softening point was 98.0° C.

(7) Phenylene Oxide Polymers

In preparing phenylene oxide polymers, the above-prepared styrene polymer (PS), HIPS, ABS resin, MBS resin, AAS resin, AES resin, and ACS(1), and PPO and modified PPO (grafted compound) that were prepared in the manner as described below were used.

(a) PPO 2,6-Xylenol was subjected to polycondensation by the oxidative coupling method to prepare poly(2,6-dimethylphenylene-1,4-ether) (inherent viscosity (as determined in chloroform at 30° C.; unit: dl/g): 0.53; hereinafter referred to as "PPO").

(b) Modified PPO (Grafted Compound)

With 100 parts by weight of PPO were mixed 25 parts by weight of a styrene monomer, 10 parts by weight of PS prepared in (A) above, and 2.1 parts by weight of di-tert-butyl peroxide for 10 minutes by the use of a Henschel mixer. Then, the mixture was converted into a styrene-grafted PPO mixture (hereinafter referred to as "modified PPO") by the use of a biaxial extruder (diameter: 30 mm; resin temperature: 270° C.). (8) Methyl Methacrylate Polymers As methyl methacrylate polymers, a methyl methacrylate polymer having an average degree of polymerization of about 1,050 (hereinafter referred to as "PMMA(1)") and a methyl methacrylate polymer having an average degree of polymerization of about 2,920 (hereinafter referred to as "PMMA(2)") were used.

(9) Aromatic Polyesters

As aromatic polyesters, polyethylene terephthalate having an intrinsic viscosity of 0.65 (hereinafter referred to as "PET") and polybutylene terephthalate having an intrinsic viscosity of 0.85 (hereinafter referred to as "PBT") were used.

(10) Oxymethylene Polymers

As oxymethylene polymers, an oxymethylene homopolymer having an MFI of 1.0 g/10 min (hereinafter referred to as "POM(1)"), an oxymethylene copolymer containing ethylene oxide and having an MFI of 9.0 g/10 min (hereinafter referred to as "POM(2)"), and an oxymethylene copolymer containing ethylene oxide and having an MFI of 20 g/10 min (hereinafter referred to as "POM(3)") were used.

(11) Vinyl Chloride Polymers

As vinyl chloride polymers, a vinyl chloride homopolymer having a degree of polymerization of about 820 (hereinafter referred to as "PVC(2)"), a vinyl chloride/vinyl acetate copolymer (vinyl acetate content: 15% by weight; degree of polymerization: about 810; hereinafter referred to as "PVC(3)"), and a mixture of 5 parts by weight of a chlorinated polyethylene rubber (chlorine content: 30.2% by weight), said rubber being prepared by chlorinating an ethylene polymer (molecular weight: about 120,000; density: 0.941 g/cm$^3$) by the aqueous suspension method, and 100 parts by weight of PVC(2) (this mixture is hereinafter referred to as "Mixture(3)") were used.

(D) Inorganic Fillers

As inorganic fillers, talc having an average particle diameter of 3 microns (aspect ratio: about 7), mica having an average particle diameter of 3 microns (aspect ratio: about 8), glass fiber (monofilament diameter: 11 microns; cut length: 3 mm; hereinafter referred to as "GF"), and calcium carbonate having an average particle diameter of 0.8 micron (hereinafter referred to as "CaCO$_3$") were used.

(E) Metallic Foils

As metallic foils, a foil of aluminum (hereinafter referred to as "Al"), a foil of copper, a foil of brass, and a foil of silver, each having a thickness of about 20 microns were used.

(F) Blowing Agents

As blowing agents, sodium hydrogencarbonate (hereinafter referred to as "Blowing Agent (A)") and azodicarboxylic acid amide (hereinafter referred to as "Blowing Agent (B)") were used.

(G) Modified Olefin Polymers

As modified olefin polymers, a modified propylene polymer produced by dry blending 100 parts by weight of a propylene homopolymer having an MFI of 0.5 g/10 min (density: 0.900 g/cm$^3$), 0.01 part by weight of 2,5-dimethyl-2,5-di(butylperoxy)hexane (as an organic peroxide), and maleic anhydride for 5 minutes by the use of a Henschel mixer and melt kneading the resulting mixture at a resin temperature of 230° C. by the use of an extruder (the maleic anhydride content of the modified propylene polymer: 0.32% by weight; this modified propylene polymer is hereinafter referred to as "Modified PP"), and a modified ethylene polymer produced in the same manner as above except that the propylene homopolymer was replaced by an ethylene polymer having a density of 0.950 g/cm$^3$ (MI: 0.2 g/10 min) (the maleic anhydride content of the modified ethylene polymer: 0.24% by weight; this modified ethylene polymer is hereinafter referred to as "Modified PE") were used.

The above thermoplastic resins (I) were molded into films each having a thickness of 20 microns. An acryl-based primer (trade name: Vinyrol 92T; produced by Showa Kobunshi Co., Ltd.) was coated on one surface of each metallic foil in a thickness of 20 microns, and a urethane-based primer (trade name: AD-coat 335; produced by Toyo Morton Co., Ltd.) was coated on the other surface in a thickness of 20 microns. In Examples 7, 10, 19, 21, 31, 34, 43, 46, 55, 58, 67, 70, 79, 82, 91, 94, 103, 106, 115, 118, 127, 130, 138 and 149, the above urethane-based primer was coated on both surfaces of the metallic foil.

EXAMPLES 1 TO 12, AND COMPARATIVE EXAMPLES 1 AND 2

In organic filler/olefin polymer combinations (the types of the inorganic filler and olefin polymer, and the inorganic filler content of the resulting composition are shown in Table 1) were each dry blended in a Henschel mixer for 5 minutes and then pelletized at a resin temperature of 230° C. by the use of a vented extruder. The thus-produced pellets were fed to a T-die extruder and molded into a 2 mm thick sheet.

A thermoplastic resin film shown in Table 1, metallic foil with a primer as described above coated on both sides thereof, and the above-described inorganic filler-containing olefin polymer sheet were bonded together by the dry lamination method to produce a laminate. The thus-produced laminate was vacuum molded at a laminate surface temperature of 175° C. by the use of a bowl-shaped female mold (external diameter: 750 mm; height: 80 mm) to produce a reflector for a circular polarization antenna (Examples 1 and 2).

Laminates were produced in the same manner as in Examples 1 and 2. Each laminate was stamping molded at a surface temperature of 135° C. first under a pressure of 20 kg/cm$^2$ for 30 seconds and then under a pressure of 50 kg/cm$^2$ for 20 seconds to produce a reflector for a circular polarization antenna (the shape of a bowl used was the same as in Example 1) (Examples 3 and 4).

Laminates were produced in the same manner as in Examples 1 to 4, except that an inorganic filler-containing olefin polymer sheet was not laminated. Each laminate was then placed on an injection molding machine (clamping force: 1,500 tons) in such a manner that the thermoplastic resin film was in contact with the male mold. After the mold was closed, a composition comprising an olefin polymer and an inorganic filler (the type of the olefin polymer and inorganic filler, and the inorganic filler content of the composition are shown in Table 1) was insert injection molded to produce a reflector of the same shape as in Example 1 (Examples 5 to 12 and Comparative Examples 1 and 2). No inorganic filler was used in Comparative Example 2 and a thermoplastic resin film was not used in Comparative Example 1.

The above-produced reflectors were each measured for the modulus of elasticity and coefficient of linear expansion of the inorganic filler-containing olefin polymer layer, and the peeling strength of the metallic foil from the inortanic filler-containing olefin polymer layer. The results are shown in Table 1.

Nylon 66 in Examples 17 to 24 and Comparative Examples 3 and 4. The results are shown in Table 2.

TABLE 1

| Example Number | Type of Thermoplastic Resin | Type of Metal of Metallic Foil | Type of Olefin | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 1 | PVdF | Al | PP(B) | Talc | 40 | 7.5 | 45,000 | $5 \times 10^{-5}$ |
| 2 | HDPE(1) | Copper | " | Mica | " | 7.8 | 71,000 | $4 \times 10^{-5}$ |
| 3 | PVC | Al | " | Talc | " | 7.5 | 45,000 | $5 \times 10^{-5}$ |
| 4 | PVdF | Silver | hdpe(2) | " | " | 7.8 | 37,000 | $5 \times 10^{-5}$ |
| 5 | " | Al | PP(B) | GF | 30 | 8.5 | 53,000 | $4 \times 10^{-5}$ |
| 6 | AcS | Brass | " | CaCO$_3$ | 55 | 8.8 | 33,000 | $8 \times 10^{-5}$ |
| 7 | PP(A) | Al | " | Talc | 40 | 8.1 | 45,000 | $5 \times 10^{-5}$ |
| 8 | PVdF | " | " | " | " | 8.6 | 45,000 | $5 \times 10^{-5}$ |
| 9 | " | " | " | CaCO$_3$ | 55 | 8.0 | 33,000 | $8 \times 10^{-5}$ |
| 10 | HDPE(1) | " | " | Talc | 40 | 8.5 | 45,000 | $5 \times 10^{-5}$ |
| 11 | PVdF | Silver | " | " | " | 8.2 | 45,000 | $5 \times 10^{-5}$ |
| 12 | " | Al | " | Mica | " | 8.1 | 71,000 | $4 \times 10^{-5}$ |
| Comp. Ex. 1 | — | " | " | Talc | " | 7.4 | 45,000 | $5 \times 10^{-5}$ |
| Comp. Ex. 2 | PVdF | " | " | — | 0 | 7.3 | 15,000 | $12 \times 10^{-5}$ |

TABLE 2

| Example Number | Type of Thermoplastic Resin | Type of Metal of Metallic Foil | Type of Polyamide Resin | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 13 | PVdF | Al | Nylon 6 | Talc | 40 | 5.5 | 74,000 | $5 \times 10^{-5}$ |
| 14 | HDPE | Copper | " | Mica | " | 5.0 | 80,000 | $4 \times 10^{-5}$ |
| 15 | PVC | Al | " | Talc | " | 5.5 | 74,000 | $5 \times 10^{-5}$ |
| 16 | PVdF | Silver | " | " | " | 5.8 | " | " |
| 17 | " | Al | Nylon 66 | GF | 30 | 6.1 | 82,000 | $3 \times 10^{-5}$ |
| 18 | ACS | Brass | " | CaCO$_3$ | 55 | 6.5 | 59,000 | $7 \times 10^{-5}$ |
| 19 | PP(A) | Al | " | Talc | 40 | 6.3 | 76,000 | $5 \times 10^{-5}$ |
| 20 | PVdF | " | Nylon 6 | " | " | 6.2 | 74,000 | $5 \times 10^{-5}$ |
| 21 | " | " | Nylon 66 | CaCO$_3$ | 55 | 6.3 | 76,000 | $5 \times 10^{-5}$ |
| 22 | HDPE | " | " | Talc | 40 | " | " | " |
| 23 | PVdF | Silver | " | " | " | " | " | " |
| 24 | " | Al | " | Mica | " | 6.5 | 83,000 | $4 \times 10^{-5}$ |
| Comp. Ex. 3 | — | " | " | Talc | " | 6.3 | 76,000 | $5 \times 10^{-5}$ |
| Comp. Ex. 4 | PVdF | " | " | — | 0 | 5.5 | 28,000 | $10 \times 10^{-5}$ |

EXAMPLES 13 TO 24, AND COMPARATIVE EXAMPLES 3 AND 4

Using inorganic filler/polyamide resin combinations as shown in Table 2, reflectors for a circular polarization antenna were produced in the same manner as in Examples 1 to 12 and Comparative Examples 1 and 2, respectively; except that the inorganic filler and the polyamide resin were dry blended and pelletized at a resin temperature of 300° C. in Examples 13 to 24, the vacuum molding was carried out at a lamination surface temperature of 240° C. for Nylon 6 or 270° C. for Nylon 66 in Examples 13 and 14, the stamping molding was carried out at a surface temperature of 240° C. for Nylon 6 or 270° C. for Nylon 66 in Examples 15 and 16, and the insert injection molding was carried out at a resin temperature of 250° C. for Nylon 6 or 280° C. for Nylon 66 in Examples 17 to 24 and Comparative Examples 3 and 4. The results are shown in Table 2.

EXAMPLES 25 TO 36, AND COMPARATIVE EXAMPLES 5 AND 6

Using inorganic filler/polycarbonate resin (PC) combinations as shown in Table 3, reflectors for a circular polarization antenna were produced in the same manner as in Examples 1 to 12 and Comparative Examples 1 and 2, respectively; except that the inorganic filler and the polycarbonate resin were dry blended and pelletized at a temperature of 300° C. in Examples 25 to 36, the vacuum molding was carried out at a lamination surface temperature of 180° C. in Examples 25 and 26, the stamping molding was carried out at a surface temperature of 170° C. in Examples 27 and 28, and the insert injection molding was carried out at a resin temperature of 280° C. in Examples 29 to 36 and Comparative Examples 5 and 6. The results are shown in Table 3.

TABLE 3

| Example Number | Type of Thermoplastic Resin | Type of Metal of Metallic Foil | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|
| 25 | PVdF | Al | Talc | 40 | 6.5 | 58,000 | $5 \times 10^{-5}$ |
| 26 | HDPE | Copper | Mica | " | 6.0 | 62,000 | $3.5 \times 10^{-5}$ |
| 27 | PVC | Al | Talc | " | 6.5 | 58,000 | $4 \times 10^{-5}$ |
| 28 | PVdF | Silver | " | " | 6.8 | " | " |
| 29 | " | Al | " | " | 7.1 | " | " |
| 30 | ACS | Brass | " | " | 7.5 | " | " |
| 31 | PP(A) | Al | GF | 10 | 6.5 | 35,000 | $4.5 \times 10^{-5}$ |
| 32 | PVdF | " | " | 20 | 6.8 | 50,000 | $2.5 \times 10^{-5}$ |

TABLE 3-continued

| Example Number | Type of Thermoplastic Resin | Type of Metal of Metallic Foil | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|
| 33 | " | " | " | 30 | 7.1 | 67,000 | 2 × 10$^{-5}$ |
| 34 | HDPE | " | " | 30 | " | " | " |
| 35 | PVdF | Silver | Mica | 40 | 6.5 | 62,000 | 3.5 × 10$^{-5}$ |
| 36 | " | Al | CaCO$_3$ | " | 6.3 | 37,000 | 6 × 10$^{-5}$ |
| Comp. Ex. 5 | — | " | Talc | " | 6.5 | 58,000 | 4 × 10$^{-5}$ |
| Comp. Ex. 6 | PVdF | " | — | 0 | 6.5 | 22,000 | 8 × 10$^{-5}$ |

EXAMPLES 37 TO 48, AND COMPARATIVE EXAMPLES 7 AND 8

Using inorganic filler/styrene polymer combinations as shown in Table 4, reflectors for a circular polarization antenna were produced in the same manner as in Examples 1 to 12 and Comparative Examples 1 and 2, respectively; except that the inorganic filler and the styrene polymer were dry blended and pelletized at a resin temperature of 200° C. in Examples 37 to 48, the vacuum molding was carried out at a lamination surface temperature of 140° C. in Examples 37 and 38, the stamping molding was carried out at a resin temperature of 130° C. in Examples 39 and 40, and the insert injection molding was carried out at a resin temperature of 200° C. in Examples 41 to 48 and Comparative Examples 7 and 8. The results are shown in Table 4.

EXAMPLES 49 TO 60, AND COMPARATIVE EXAMPLES 9 AND 10

Using inorganic filler/impact resistant resin (A) combinations as shown in Table 5, reflectors for a circular polarization antenna were produced in the same manner as in Examples 1 to 12 and Comparative Examples 1 and 2, respectively; except that the inorganic filler and the impact resistant resin (A) were dry blended and pelletized at a resin temperature of 200° C. in Examples 49 to 60, the vacuum molding was carried out at a lamination surface temperature of 140° C. in Examples 49 and 50, the stamping molding was carried out at a surface temperature of 130° C. in Examples 51 and 52, and the insert injection molding was carried out at a resin temperature of 200° C. in Examples 53 to 60 and Comparative Examples 9 and 10. The results are shown in Table 5.

TABLE 4

| Example Number | Type of Thermoplastic Resin | Type of Metal of Metallic Foil | Type of Styrene Polymer | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 37 | PVdF | Al | HIPS | Talc | 30 | 6.8 | 45,000 | 5.0 × 10$^{-5}$ |
| 38 | HDPE | Copper | " | Mica | " | 5.5 | 49,000 | 4.0 × 10$^{-5}$ |
| 39 | PVC | Al | " | Talc | " | 6.8 | 45,000 | 5.0 × 10$^{-5}$ |
| 40 | PVdF | Silver | " | Talc | " | 5.0 | " | " |
| 41 | " | Al | PS | GF | 10 | 6.0 | 55,000 | 3.5 × 10$^{-5}$ |
| 42 | ACS | Brass | " | " | 20 | 6.1 | 64,000 | 3.0 × 10$^{-5}$ |
| 43 | PP(A) | Al | " | " | 30 | 6.3 | 70,000 | 2.5 × 10$^{-5}$ |
| 44 | PVdF | " | " | " | " | " | " | " |
| 45 | " | " | HIPS | " | " | 6.8 | 50,000 | 3.0 × 10$^{-5}$ |
| 46 | HDPE | " | " | Talc | " | 7.2 | 45,000 | 5.0 × 10$^{-5}$ |
| 47 | PVdF | Silver | PS | CaCO$_3$ | " | 6.3 | 38,000 | 6.5 × 10$^{-5}$ |
| 48 | " | Al | " | Mica | " | 6.8 | 68,000 | 4.0 × 10$^{-5}$ |
| Comp. Ex. 7 | — | " | HIPS | " | " | 6.5 | 49,000 | 4.0 × 10$^{-5}$ |
| Comp. Ex. 8 | PVdF | " | " | — | 0 | 6.1 | 19,000 | 8.0 × 10$^{-5}$ |

TABLE 5

| Example Number | Type of Thermoplastic Resin | Type of Metal of Metallic Foil | Type of Impact Resistant Resin (A) | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 49 | PVdF | Al | ACS(1) | Talc | 30 | 5.3 | 46,000 | 5.0 × 10$^{-5}$ |
| 50 | HDPE | Copper | Mixture(2) | Mica | " | 4.8 | 50,000 | 4.0 × 10$^{-5}$ |
| 51 | PVC | Al | ACS(1) | Mica | " | 5.3 | 46,000 | 5.0 × 10$^{-5}$ |
| 52 | PVdF | Silver | Mixture(1) | " | " | 4.5 | 47,000 | " |
| 53 | " | Al | ACS(1) | " | " | 5.8 | 46,000 | " |
| 54 | ACS | Brass | " | GF | " | 4.5 | 73,000 | 2.5 × 10$^{-5}$ |
| 55 | PP(A) | Al | " | " | " | 5.1 | " | " |
| 56 | PVdF | " | Mixture(1) | CaCO$_3$ | 50 | 5.5 | 35,000 | 7.0 × 10$^{-5}$ |
| 57 | " | " | " | Talc | 30 | 4.5 | 47,000 | 5.0 × 10$^{-5}$ |
| 58 | HDPE | " | Mixture(2) | " | " | 5.1 | 46,000 | " |
| 59 | PVdF | Silver | ACS(1) | Mica | " | 4.5 | 51,000 | 4.0 × 10$^{-5}$ |
| 60 | " | Al | " | " | " | 5.3 | " | " |
| Comp. Ex. 9 | — | " | " | " | " | " | " | " |
| Comp. Ex. 10 | PVdF | " | " | — | 0 | 5.6 | 21,000 | 9.0 × 10$^{-5}$ |

EXAMPLES 61 TO 72, AND COMPARATIVE EXAMPLES 11 AND 12

Using inorganic filler/impact resistant resin (B) combinations as shown in Table 6, reflectors for a circular polarization antenna were produced in the same manner as in Examples 1 to 12 and Comparative Examples 1 and 2, respectively; except that the inorganic filler and the impact resistant resin (B) were dry blended and pelletized at a resin temperature of 210° C. in Examples 61 to 72 (230° C. in Example 68), the vacuum molding was carried out at a lamination surface temperature of 170° C. in Examples 61 and 62, the stamping, molding was carried out at a surface temperature of 160° C. in Examples 63 and 64, ahd the insert injection molding was carried out at a resin temperature of 230° C. in Examples 65 to 72 (245° C. in Example 68) and Comparative Examples 11 and 12. The results are shown in Table 6.

TABLE 6

| Example Number | Type of Thermoplastic Resin | Type of Metal of Metallic Foil | Type of Impact Resistant Resin(B) | Inorganic Filler Type | Content (wt %) | Peeling Strength (kg/15 mm) | Flexural Modulus (kg/cm²) | Coefficient of Linear Expansion (cm/cm °C.) |
|---|---|---|---|---|---|---|---|---|
| 61 | PVdF | Al | ABS | Talc | 30 | 4.5 | 58,000 | 4.0 × 10⁻⁵ |
| 62 | HDPE | Copper | AAS | " | " | 4.1 | 56,000 | " |
| 63 | PVC | Al | AES | " | " | 4.5 | 53,000 | " |
| 64 | PVdF | Silver | AAS | Mica | " | 4.3 | 58,000 | 3.0 × 10⁻⁵ |
| 65 | " | Al | " | GF | " | 5.1 | 80,000 | 2.5 × 10⁻⁵ |
| 66 | ACS | Brass | " | " | " | 4.5 | " | " |
| 67 | PP(A) | Al | " | Talc | " | 5.2 | 56,000 | 4.0 × 10⁻⁵ |
| 68 | PVdF | " | MBS | " | " | 4.8 | 57,000 | " |
| 69 | " | " | AES | GF | " | 4.9 | 65,000 | 2.5 × 10⁻⁵ |
| 70 | HDPE | " | " | " | " | " | " | " |
| 71 | PVdF | Silver | " | Talc | " | 4.8 | 53,000 | 4.0 × 10⁻⁵ |
| 72 | " | Al | ABS | " | " | 4.9 | 58,000 | " |
| Comp. Ex. 11 | — | " | AAS | " | " | 5.2 | 56,000 | " |
| Comp. Ex. 12 | PVdF | " | — | | 0 | " | 21,000 | 8.0 × 10⁻⁵ |

EXAMPLES 73 TO 84, AND COMPARATIVE EXAMPLES 13 AND 14

Using inorganic filler/phenylene oxide polymer combinations as shown in Table 7, reflectors for a circular polarization antenna were produced in the same manner as in Examples 1 to 12 and Comparative Examples 1 and 2, respectively; except that the inorganic filler and the phenylene oxide polymer were dry blended and pelletized at a resin temperature of 250° C. in Examples 73 to 84, the vacuum molding was carried out at a lamination surface temperature of 180° C. in Examples 73 and 74, the stamping molding was carried out at a surface temperature of 170° C. in Examples 75 and 76, and the insert injection molding was carried out at a resin temperature of 260° C. in Examples 77 to 84 and Comparative Example 13 and 14. The results are shown in Table 7.

TABLE 7

| Example Number | Type of Thermoplastic Resin | Type of Metal of Metallic Foil | Weight Ratio of PPO to Other Resin | Inorganic Filler Type | Content (wt %) | Peeling Strength (kg/15 mm) | Flexural Modulus (kg/cm²) | Coefficient of Linear Expansion (cm/cm °C.) |
|---|---|---|---|---|---|---|---|---|
| 73 | PVdF | Al | ACS(85%) | Talc | 30 | 4.0 | 51,000 | 5.0 × 10⁻⁵ |
| 74 | HDPE | Copper | HIPS(80%) | " | " | 4.1 | 45,000 | " |
| 75 | PVC | Al | ABS(85%) | " | " | 4.3 | 53,000 | 4.0 × 10⁻⁵ |
| 76 | PVdF | Silver | PS(85%) | Mica | " | 4.5 | 49,000 | " |
| 77 | " | Al | MBS(85%) | GF | " | 4.8 | 80,000 | " |
| 78 | ACS | Brass | AAS(85%) | " | " | 5.0 | 78,000 | 4.0 × 10⁻⁵ |
| 79 | PP(A) | Al | AES(85%) | Talc | " | 4.8 | 53,000 | " |
| 80 | PVdF | " | PS(80%) | " | " | 4.6 | 47,000 | 5.0 × 10⁻⁵ |
| 81 | " | " | PPO grafted material | GF | " | 5.1 | 71,000 | 3.0 × 10⁻⁵ |
| 82 | HDPE | " | AAS(85%) | CaCO₃ | 50 | 4.9 | 40,000 | 7.0 × 10⁻⁵ |
| 83 | PVdF | Silver | PS(80%) | Talc | 30 | 4.7 | 49,000 | 5.0 × 10⁻⁵ |
| 84 | " | Al | PS(80%) | " | " | 4.8 | 48,000 | " |
| Comp. Ex. 13 | — | " | PS(80%) | " | " | " | " | " |
| Comp. Ex. 14 | PVdF | " | PS(80%) | — | 0 | " | 25,000 | 8.0 × 10⁻⁵ |

EXAMPLES 85 TO 96, AND COMPARATIVE EXAMPLES 15 AND 16

Using inorganic filler/methyl methacrylate polymer combinations as shown in Table 8, reflectors for a circular polarization antenna were produced in the same manner as in Examples 1 to 12 and Comparative Examples 1 and 2, respectively; except that the inorganic filler and the methyl methacrylate polymer were dry blended and pelletized at a resin temperature of 230° C. in Examples 85 to 96, the vacuum molding was carried out at a lamination surface temperature of 150° C. in Examples 85 and 86, the stamping molding was carried out at a surface temperature of 140° C. in Examples 87 and 88, and the insert injection molding was carried out at a resin temperature of 230° C. in Examples 89 and 96 and Comparative Examples 15 and 16. The results are shown in Table 8.

TABLE 8

| Example Number | Type of Thermoplastic Resin | Type of Metal of Metallic Foil | Type of Methyl Methacrylate Polymer | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 85 | PVdF | Al | PMMA(2) | Talc | 40 | 3.1 | 72,000 | $4 \times 10^{-5}$ |
| 86 | HDPE | Copper | " | Mica | " | 2.9 | 81,000 | $3 \times 10^{-5}$ |
| 87 | PVC | Al | " | Talc | " | 3.1 | 72,000 | $4 \times 10^{-5}$ |
| 88 | PVdF | Silver | " | Mica | " | 2.8 | 81,000 | $3 \times 10^{-5}$ |
| 89 | " | Al | PMMA(1) | Talc | " | 3.8 | 73,000 | $4 \times 10^{-5}$ |
| 90 | ACS | Brass | " | " | " | 3.5 | 73,000 | $4 \times 10^{-5}$ |
| 91 | PP(A) | Al | " | " | " | 3.8 | 73,000 | $4 \times 10^{-5}$ |
| 92 | PVdF | " | " | GF | 30 | 4.0 | 77,000 | $3 \times 10^{-5}$ |
| 93 | " | " | " | CaCO$_3$ | 55 | 4.1 | 65,000 | $6 \times 10^{-5}$ |
| 94 | HDPE | Al | " | Talc | 40 | 3.8 | 73,000 | $4 \times 10^{-5}$ |
| 95 | PVdF | Silver | " | " | " | 3.3 | 73,000 | $4 \times 10^{-5}$ |
| 96 | " | Al | " | Mica | " | 3.7 | 82,000 | $3 \times 10^{-5}$ |
| Comp. Ex. 15 | — | " | " | Talc | " | 3.8 | 73,000 | $4 \times 10^{-5}$ |
| Comp. Ex. 16 | PVdF | " | " | — | 0 | 3.5 | 30,000 | $8 \times 10^{-5}$ |

EXAMPLES 97 TO 108, AND COMPARATIVE EXAMPLES 17 AND 18

Using inorganic filler/aromatic polyester combination as shown in Table 9, reflectors for a circular polarization antenna were produced in the same manner as in Examples 1 to 12 and Comparative Examples 1 and 2, respectively; except that the inorganic filler and the aromatic polyester were dry blended and pelletized at a resin temperature of 280° C. in Examples 97 to 108, the vacuum molding was carried out at a lamination surface temperature of 150° C. in Examples 97 and 98, the stamping molding was carried out at a surface temperature of 130° C. in Examples 99 and 100, and the insert injection molding was carried out at a resin temperature of 270° C. in Examples 101 to 108 and Comparative Examples 17 and 18. The results are shown in Table 9.

EXAMPLES 109 TO 120, AND COMPARATIVE EXAMPLES 19 AND 20

Using inorganic filler/oxymethylene polymer combinations as shown in Table 10, reflectors for a circular polarization antenna were produced in the same manner as in Examples 1 to 12 and Comparative Examples 1 and 2, respectively; except that the inorganic filler and the oxymethylene polymer were dry blended and pelletized at a resin temperature of 200° C. in Examples 109 to 120, the vacuum molding was carried out at a lamination surface temperature of 180° C. in Examples 109 and 110, the stamping molding was carried out at a surface temperature of 170° C. in Examples 111 and 112, and the insert injection molding was carried out at a resin temperature of 210° C. in Examples 113 to 120 and Comparative Examples 19 and 20. The results are shown in Table 10.

TABLE 9

| Example Number | Type of Thermoplastic Resin | Type of Metal of Metallic Foil | Type of Aromatic Polyester | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 97 | PVdF | Al | PET | Talc | 40 | 3.5 | 68,000 | $2.2 \times 10^{-5}$ |
| 98 | HDPE | Copper | " | " | " | 2.9 | " | " |
| 99 | PVC | Al | " | GF | 30 | 3.8 | 77,000 | $1.8 \times 10^{-5}$ |
| 100 | PVdF | Silver | PBT | " | " | 4.1 | 93,000 | $2.5 \times 10^{-5}$ |
| 101 | " | Al | " | " | " | 4.5 | " | " |
| 102 | ACS | Brass | " | " | " | 3.8 | " | " |
| 103 | PP(A) | Al | " | " | " | 4.5 | " | " |
| 104 | PVdF | " | PET | " | " | 3.8 | 77,000 | $1.8 \times 10^{-5}$ |
| 105 | " | " | PBT | Talc | 40 | 4.1 | 78,000 | $3.1 \times 10^{-5}$ |
| 106 | HDPE | " | " | " | " | " | " | " |
| 107 | PVdF | Silver | " | CaCO$_3$ | 50 | 4.5 | 40,000 | $5.5 \times 10^{-5}$ |
| 108 | " | Al | " | Mica | 40 | 3.9 | 81,000 | $2.8 \times 10^{-5}$ |
| Comp. Ex. 17 | — | " | " | GF | 30 | 4.5 | 93,000 | $2.5 \times 10^{-5}$ |
| Comp. Ex. 18 | PVdF | " | " | — | 0 | 4.3 | 23,000 | $9.0 \times 10^{-5}$ |

TABLE 10

| Example Number | Type of Thermoplastic Resin | Type of Metal of Metallic Foil | Type of Oxymethylene Polymer | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 109 | PVdF | Al | POM(1) | Talc | 30 | 2.5 | 50,000 | $7 \times 10^{-5}$ |
| 110 | HDPE | Copper | " | Mica | " | 2.3 | 54,000 | $6 \times 10^{-5}$ |
| 111 | PVC | Al | " | Talc | " | 2.8 | 50,000 | $7 \times 10^{-5}$ |
| 112 | PVdF | Silver | " | Mica | " | 2.2 | 54,000 | $6 \times 10^{-5}$ |
| 113 | " | Al | POM(2) | Talc | " | 3.1 | 48,000 | $7 \times 10^{-5}$ |
| 114 | ACS | Brass | " | GF | 25 | 2.8 | 65,000 | $5 \times 10^{-5}$ |
| 115 | PP(A) | Al | " | " | " | 3.0 | " | " |
| 116 | PVdF | " | " | " | " | " | " | " |
| 117 | " | " | POM(3) | " | " | 3.2 | 64,000 | " |

TABLE 10-continued

| Example Number | Type of Thermoplastic Resin | Type of Metal of Metallic Foil | Type of Oxymethylene Polymer | Inorganic Filler Type | Inorganic Filler Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 118 | HDPE | " | " | CaCO$_3$ | 40 | 3.3 | 40,000 | $9 \times 10^{-5}$ |
| 119 | PVdF | Silver | " | Talc | 30 | 2.9 | 48,000 | $7 \times 10^{-5}$ |
| 120 | " | Al | " | " | " | 3.2 | " | " |
| Comp. Ex. 19 | — | " | " | " | " | " | " | " |
| Comp. Ex. 20 | PVdF | " | " | — | 0 | 3.0 | 26,000 | $13 \times 10^{-5}$ |

EXAMPLES 121 TO 132, AND COMPARATIVE EXAMPLES 21 AND 22

Inorganic filler/vinyl chloride polymer combinations (to 100 parts by weight of the vinyl chloride polymer were compounded 30 parts by weight of dioctyl phthalate (DOP) and 25 parts by weight of dibenzyl phthalate as plasticizers, and 3 parts by weight of tribasic lead sulfate and 1 part by weight of dibasic lead stearate as dehydrochlorination inhibitors; the types of the inorganic filler and vinyl chloride and the inorganic filler content of the resulting composition are shown in Table 11; in Comparative Example 22, no inorganic filler was added) were each dry blended in the same manner as in Example 1 and then pelletized at a resin temperature of 190° C. by the use of a vented extruder. These pellets were molded into a sheet in the same manner as in Examples 1 to 12.

A thermoplastic resin film as shown in Table 11 (in Comparative Example 21, this film was not used), metallic foil with a primer coated on both sides thereof, and inorganic filler-containing vinyl chloride polymer sheet were bonded together by the dry lamination method to produce a laminate. This laminate was vacuum molded in the same manner as in Examples 1 and 2 at a laminate surface temperature of 170° C. to produce a reflector for a circular polarization antenna (Examples 121, 122, 127 to 132, and Comparative Examples 21 and 22).

Laminates produced in the same manner as in Examples 121 and 122 (the types of the inorganic filler and vinyl chloride polymers, the inorganic content of the composition, and the type of the metallic foil used in preparation of each laminate are shown in Table 11) were stamping molded in the same manner as in Examples 3 and 4 at a surface temperature of 135° C. (the shape of the mold was the same as used in Example 1) to produce a reflector for a circular polarization antenna (Examples 123 and 124).

On one side of each metallic foil having a thermoplastic resin film laminated on the other side as shown in Table 11 was inserted injection molded an inorganic filler/vinyl chloride resin composition (the types of the inorganic filler and vinyl chloride polymer, and the inorganic filler content of the composition are shown in Table 11) in the same manner as in Examples 5 to 12 to produce a reflector of the same shape as in Example 1 (Examples 125 to 132 and Comparative Examples 21 and 22).

The thus-produced reflectors were measured for the modulus of elasticity and coefficient of linear expansion of the inorganic filler-containing vinyl chloride polymer layer, and the peeling strength of the metallic foil from the inorganic filler-containing vinyl chloride polymer layer. The results are shown in Table 11.

TABLE 11

| Example Number | Type of Thermoplastic Resin | Type of Metal of Metallic Foil | Type of Vinyl Chloride Polymer | Inorganic Filler Type | Inorganic Filler Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 121 | PVdF | Al | PVC(2) | Talc | 30 | 4.1 | 50,000 | $5 \times 10^{-5}$ |
| 122 | HDPE | Copper | " | Mica | " | 3.8 | 56,000 | $4 \times 10^{-5}$ |
| 123 | PVC | Al | " | Talc | " | 4.1 | 50,000 | $5 \times 10^{-5}$ |
| 124 | PVdF | Silver | " | Mica | " | 3.9 | 56,000 | $4 \times 10^{-5}$ |
| 125 | " | Al | PVC(3) | Talc | " | 4.7 | 41,000 | $6 \times 10^{-5}$ |
| 126 | ACS | Brass | " | Mica | " | 4.5 | 43,000 | $5 \times 10^{-5}$ |
| 127 | PP(A) | Al | " | GF | " | 4.3 | 58,000 | $4 \times 10^{-5}$ |
| 128 | PVdF | " | " | " | " | 4.3 | " | " |
| 129 | " | " | Mixture(3) | " | " | 4.5 | 62,000 | " |
| 130 | HDPE | " | " | " | " | 4.5 | " | " |
| 131 | PVdF | Silver | " | CaCO$_3$ | " | 3.9 | 35,000 | $7 \times 10^{-5}$ |
| 132 | " | Al | " | " | " | 4.1 | " | " |
| Comp. Ex. 21 | — | " | PVC(2) | Talc | " | 4.1 | 50,000 | $5 \times 10^{-5}$ |
| Comp. Ex. 22 | PVdF | " | " | — | 0 | 4.3 | 26,000 | $10 \times 10^{-5}$ |

EXAMPLES 133 TO 144, AND COMPARATIVE EXAMPLES 23 AND 24

Propylene homopolymer having MFI of 2.0 g/10 min (hereinafter referred to as "PP(C)") and high density ethylene homopolymer having MI of 0.8 g/10 min (density: 0.950 g/cm$^3$; hereinafter referred to as "HDPE(3)") were each molded into a film having a thickness of 50 microns.

Further, a metallic foil as shown in Table 12 was coated with the above-described acryl-based primer (20 microns in dry thickness) on one surface and the abovedescribed urethane-based primer (20 microns in dry thickness) on the other surface. (In Examples 138 and 139, the both surfaces of the metallic foil were coated with the urethane-based primer.

A thermoplastic resin film as shown in Table 12 (in Comparative Example 23, the film was not used), the above-described metallic foil coated with the primer(s) on both sides thereof and the PP(C) film or the HDPE(3) film were bonded together by the dry lamination method to produce a lamianted metallic foil.

Inorganic filler/olefin polymer combinations (the types of the inorganic filler and olefin polymer, and the inorganic filler content of the resulting composition are shown in Table 12; in Comparative Example 24, no inorganic filler was added) were each dry blended in the same manner as in Examples 1 to 12.

The thus-produced laminated metallic foils were each mounted on an injection molding machine (clamping force: 1,500 tons) in such a manner that the olefin polymer layer was in contact with the fixed mold. After the mold was closed, a composition composed of an olefin polymer and an inorganic filler (the types of the olefin polymer and inorganic filler, and the inorganic filler content of the composition are shown in Table 12) was insert injection molded under the conditions of injection pressure 80 kg/cm² and resin temperature 240° C. to produce a reflector for a circular polarization antenna of the same shape as in Example 1.

The thus-produced reflectors were measured for the modulus of elasticity and coefficient of linear expansion of the inorganic filler-containing olefin polymer layer, and the peeling strength of the metallic foil from the inorganic filler-containing olefin polymer layer. The results are shown in Table 12.

To the thus-produced composition was added 0.3% by weight of Blowing Agent (A) or 0.5% by weight of Blowing Agent (B), and the resulting mixture was dry blended to produce an expandable composition.

The thus-produced laminated metallic foil was molded by two procedures. One of the procedures was that the lamianted metallic foil was injection molded by the use of one injection molding machine (clamping force: 1,500 tons; Examples 144, 146 and 150 to 153). The other procedure was such that two injection molding machines (clamping force: 1,500 tons) were used, and a composition not containing a blowing agent was injected and further a composition containing a blowing agent was injected through the same nozzle head as above (Examples 147 to 149, and 154 and Comparative Examples 25 and 26). The laminated metallic foil was mounted on a moving mold surface in such a manner that the olefin polymer layer was in contact with the fixed mold surface). After the mold was closed, a composition composed of an olefin polymer and an inorganic filler (the types of the olefin polymer and inorganic filler, and the inorganic filler content of the composition are shown in Table 13-1) was insert injection molded under the conditions of injection pressure 80 kg/cm² and resin temperature 270° C. to produce a reflector of the same shape as in Example 1.

TABLE 12

| Example Number | Type of Thermoplastic Resin | Type of Metal of Metallic Layer | Type of Laminate Olefin Polymer | Inorganic Filler-Containing Olefin Polymer Type of Thermoplastic Polymer | Type of Inorganic Filler | Content (wt %) | Peeling Strength (kg/15 mm) | Flexural Modulus (kg/cm²) | Coefficient of Linear Expansion (cm/cm °C.) |
|---|---|---|---|---|---|---|---|---|---|
| 133 | PVdF | Al | PP(C) | PP(C) | Talc | 40 | Coagulation Breakdown | 45,000 | $5 \times 10^{-5}$ |
| 134 | " | " | " | " | Mica | " | Coagulation Breakdown | 71,000 | $4 \times 10^{-4}$ |
| 135 | " | " | " | " | GF | 30 | Coagulation Breakdown | 53,000 | $4 \times 10^{-4}$ |
| 136 | " | " | " | " | CaCO₃ | 55 | Coagulation Breakdown | 33,000 | $8 \times 10^{-5}$ |
| 137 | " | " | HDPE(3) | HDPE(3) | Talc | 40 | Coagulation Breakdown | 37,000 | $5 \times 10^{-5}$ |
| 138 | PP(A) | " | PP(C) | PP(C) | " | " | Coagulation Breakdown | 45,000 | $5 \times 10^{-5}$ |
| 139 | HDPE(2) | " | " | " | " | " | Coagulation Breakdown | " | " |
| 140 | ACS | Copper | " | " | " | " | Coagulation Breakdown | " | " |
| 141 | PVC | Brass | " | " | " | " | Coagulation Breakdown | " | " |
| 142 | PVdF | Silver | " | " | " | " | Coagulation Breakdown | " | " |
| 143 | " | Copper | " | " | " | " | Coagulation Breakdown | " | " |
| Comp. Ex. 23 | — | Al | " | " | " | " | Coagulation Breakdown | " | " |
| Comp. Ex. 24 | PVdF | " | " | " | " | " | Coagulation Breakdown | 15,000 | $12 \times 10^{-5}$ |

EXAMPLES 144 TO 154, AND COMPARATIVE EXAMPLES 25 AND 26

Laminated metallic foils were produced in the same manner as in Examples 133 to 143.

In addition, in the same manner as in Example 133 to 143, an inorganic filler-containing olefin polymer composition was produced.

The thus-produced reflectors were measured for the modulus of elasticity and coefficient of linear expansion of the inorganic filler-containing olefin polymer layer and the peeling strength of the metallic foil from the inorganic filler-containing olefin polymer layer. The results are shown in Table 13-2.

TABLE 13-1

| Example Number | Type of Thermoplastic Resin | Type of Metal of Metallic Foil | Inorganic Filler-Containing Olefin Polymer | | | Type of Blowing Agent |
|---|---|---|---|---|---|---|
| | | | Type of Olefin Polymer | Type of Inorganic Filler | Content (wt %) | |
| 144 | PVdF | Al | PP(B) | Talc | 40 | (B) |
| 145 | " | " | " | Mica | " | " |
| 146 | " | " | " | GF | 30 | " |
| 147 | " | " | " | CaCO$_3$ | 55 | (A) |
| 148 | " | " | HDPE(2) | Talc | 40 | " |
| 149 | PP(A) | " | PP(B) | " | " | " |
| 150 | HDPE(1) | " | " | " | " | (B) |
| 151 | ACS | Copper | " | " | " | " |
| 152 | PVC | Brass | " | " | " | " |
| 153 | PVdF | Silver | " | " | " | (A) |
| 154 | " | Copper | " | " | " | (B) |
| Comp. Ex. 25 | — | Al | " | " | " | (A) |
| Comp. Ex. 26 | PVdF | " | " | — | 0 | " |

TABLE 13-2

| Example No. | Peeling Strength (kg/15 mm) | Flexural Modulus (kg/cm$^2$) | Coefficient of Linear Expansion (cm/cm °C.) |
|---|---|---|---|
| 144 | 7.5 | 44,000 | $5 \times 10^{-5}$ |
| 145 | 7.8 | 69,000 | $4 \times 10^{-4}$ |
| 146 | 8.5 | 51,000 | $4 \times 10^{-4}$ |
| 147 | 8.8 | 32,000 | $8 \times 10^{-5}$ |
| 148 | 7.8 | 36,000 | $5 \times 10^{-5}$ |
| 149 | 8.1 | 44,000 | " |
| 150 | 8.6 | " | " |
| 151 | 7.9 | " | " |
| 152 | 8.8 | " | " |
| 153 | 8.0 | " | " |
| 154 | 7.9 | " | " |
| Comparative Example 25 | 7.4 | " | " |
| Comparative Example 26 | 7.3 | 15,000 | $12 \times 10^{-5}$ |

In the following Examples 155 to 308 and Comparative Examples 27 to 52, coated metal foils as shown below were used.

That is, on one side of each metallic foil as shown in Tables 14 to 26 was coated an epoxy resinbased primer (trademark: V Furon Primer; produced by Dainippon Toryo Co., Ltd.) in a dry thickness of 20 microns, which was then dried. A paint as shown in Tables 14 to 26 was coated on the primer layer of the metallic foil in a dry thickness of 30 microns and then allowed to stand one day and night. On the other side of the metallic foil, which had been coated with the primer and paint on one side, a urethane-based primer (trademark: AD-coat 335; produced by Toyo Morton Co., Ltd.) was coated in a dry thickness of 15 microns and dried.

EXAMPLES 155 TO 166 AND COMPARATIVE EXAMPLES 27 AND 28

Inorganic filler and olefin polymer (the types of the inorganic filler and olefin polymer, and the inorganic filler content of the resulting composition are shown in Table 14; in Comparative Example 28, no inorganic filler was added) were blended in the same manner as in Example 1 to obtain an inorganic filler-containing olefin polymer sheet.

The coated metallic foil, and the inorganic filler-containing olefin polymer sheet were bonded together in the same manner as in Example 1 according to the dry lamination method to produce a laminate. This laminate was vacuum molded at a laminate surface temperature of 175° C. to produce a reflector for a circular polarization antenna (Examples 155 and 156).

Laminates produced in the same manner as in Examples 155 and 156 (the types of the inorganic filler and olefin polymer, the inorganic filler content of the composition, and the type of the inorganic filler used in prepareation of each laminate are shown in Table 14) were stamping molded in the same manner as in Examples 3 and 4 to produce a reflector (Examples 157 and 158).

The above-described epoxy-based primer was coated on one side of each metallic foil as shown in Table 14 in a dry thickness of 20 microns and then a paint as shown in Table 14 was further coated thereon in the same manner as above and then dried. In addition, the above-described urethane-based primer was coated on the other side of the metallic foil in a dry thickness of 15 microns and then dried. The thus-coated laminate was insert injection molded in the same manner as in Example 5 to 12 and Comparative Examples 1 and 2 to produce a reflector of the same shape as in Example 1 (Examples 159 to 166 and Comparative Examples 27 and 28).

The thus-produced reflectors were measured for the modulus of elasticity and coefficient of linear expansion of the inorganic filler-containing olefin polymer layer, and the peeling strength of the metallic foil from the inorganic filler-containing olefin polymer layer. The results are shown in Table 14.

TABLE 14

| Example No. | Type of Paint | Type of Metal | Type of Olefin Polymer | Inorganic Filler | | Peeling Strength (kg/15 mm) | Flexural Modulus (kg/cm$^2$) | Coefficient of Linear Expansion (cm/cm °C.) |
|---|---|---|---|---|---|---|---|---|
| | | | | Type | Content (wt %) | | | |
| 155 | Paint F | Al | PP(B) | Talc | 40 | 7.5 | 45,000 | $5 \times 10^{-5}$ |
| 156 | " | Copper | " | Mica | " | 7.8 | 71,000 | $4 \times 10^{-5}$ |
| 157 | " | Al | " | Talc | " | 7.5 | 45,000 | $5 \times 10^{-5}$ |
| 158 | " | Silver | HDPE(2) | " | " | 7.8 | 37,000 | $4 \times 10^{-5}$ |
| 159 | " | Al | PP(B) | " | " | 8.0 | 45,000 | $5 \times 10^{-5}$ |
| 160 | Paint U | " | " | " | " | " | " | " |
| 161 | " | Brass | " | CaCO$_3$ | 55 | 8.5 | 33,000 | $8 \times 10^{-5}$ |

TABLE 14-continued

| Example No. | Type of Paint | Type of Metal | Type of Olefin Polymer | Inorganic Filler Type | Content (wt %) | Peeling Strength (kg/15 mm) | Flexural Modulus (kg/cm²) | Coefficient of Linear Expansion (cm/cm °C.) |
|---|---|---|---|---|---|---|---|---|
| 162 | " | Silver | " | Talc | 40 | 8.2 | 45,000 | $5 \times 10^{-5}$ |
| 163 | " | Al | " | Mica | " | 8.1 | 71,000 | $4 \times 10^{-5}$ |
| 164 | Paint F | " | " | GF | 30 | 8.5 | 53,000 | " |
| 165 | " | " | " | CaCO₃ | 55 | 8.0 | 33,000 | $8 \times 10^{-5}$ |
| 166 | " | " | " | Mica | 40 | 8.1 | 71,000 | $4 \times 10^{-5}$ |
| Comparative Example 27 | — | " | " | Talc | " | 7.5 | 45,000 | $5 \times 10^{-5}$ |
| Comparative Example 28 | Paint F | " | " | — | 0 | " | 15,000 | $12 \times 10^{-5}$ |

EXAMPLES 167 TO 178 AND COMPARATIVE EXAMPLES 29 AND 30

Inorganic filler/polyamide resin combinations (the types of the inorganic filler and polyamide resin, and the inorganic filler content of the resulting composition are shown in Table 15; in Comparative Example 30, no inorganic filler was added) were each processed in the same manner as in Example 1 to produce a sheet.

The coated metallic foil as described above and the inorganic filler-containing polyamide resin sheet were bonded together by the dry lamination method to produce a laminate. This laminate was vacuum molded in the same manner as in Examples 15 and 16 to produce a reflector for a circular polarization antenna (Examples 167 and 168).

Laminates produced in the same manner as in Examples 168 and 169 (the types of the inorganic filler and polyamide resin, the inorganic filler content of the composition, and the type of the metallic foil used in preparation of each laminate are shown in Table 15) were stamping molded in the same manner as in Examples 17 to 24 (the shape of the mold was the same as used in Example 1) to produce a reflector (Examples 169 and 170).

On one side of each metallic foil as shown in Table 15 was insert injection molded a laminate (produced in the same manner as in Examples 159 to 166) in the same manner as in Examples 17 to 24 to produce a reflector of the same shape as in Example 1 (Examples 171 to 178, and Comparative Examples 29 and 30).

The thus-produced reflectors were measured for the modulus of elasticity and coefficient of linear expansion of the inorganic filler-containing polyamide resin, and the peeling strength of the metallic foil from the inorganic filler-containing polyamide resin layer. The results are shown in Table 15.

TABLE 15

| Example No. | Type of Coating Layer | Type of Metal of Metallic Foil | Type of Polyamide Resin | Inorganic Filler Type | Content (wt %) | Peeling Strength (kg/15 mm) | Flexural Modulus (kg/cm²) | Coefficient of Linear Expansion (cm/cm °C.) |
|---|---|---|---|---|---|---|---|---|
| 167 | Paint F | Al | Nylon 6 | Talc | 40 | 5.5 | 74,000 | $5 \times 10^{-5}$ |
| 168 | " | Copper | " | Mica | " | 5.0 | 80,000 | $4 \times 10^{-5}$ |
| 169 | " | Al | " | Talc | " | 5.5 | 74,000 | $5 \times 10^{-5}$ |
| 170 | " | Silver | Nylon 66 | " | " | 5.8 | 76,000 | " |
| 171 | " | Al | " | Mica | " | 6.1 | 83,000 | $4 \times 10^{-5}$ |
| 172 | Paint U | " | " | GF | 30 | 6.5 | 82,000 | $3 \times 10^{-5}$ |
| 173 | " | Brass | " | CaCO₃ | 50 | " | 59,000 | $7 \times 10^{-5}$ |
| 174 | " | Silver | Nylon 6 | Talc | 40 | 6.3 | 74,000 | $5 \times 10^{-5}$ |
| 175 | " | Al | " | " | " | 6.2 | " | " |
| 176 | Paint F | " | Nylon 66 | GF | 30 | 6.3 | 82,000 | $3 \times 10^{-5}$ |
| 177 | " | " | " | CaCO₃ | 50 | 6.5 | 59,000 | $7 \times 10^{-5}$ |
| 178 | " | " | " | GF | 30 | " | 82,000 | $3 \times 10^{-5}$ |
| Comparative Example 29 | — | " | " | Talc | 40 | 6.2 | 76,000 | $5 \times 10^{-5}$ |
| Comparative Example 30 | Paint F | " | " | — | 0 | 5.5 | 28,000 | $10 \times 10^{-5}$ |

EXAMPLES 179 TO 190 AND COMPARATIVE EXAMPLES 31 AND 32

Inorganic filler/polycarbonate combinations (tye types of the inorganic filler and polycarbonate resin, and the inorganic filler content of the resulting composition are shown in Table 16; in Comparative Example 32, no inorganic filler was added) were each processed in the same manner as in Example 1 to produce a sheet.

The above-described coated metallic foil and the inorganic filler-containing polycarbonate resin sheet were bonded together by the dry lamination method to produce a laminate. This laminate was vacuum molded in the same manner as in Examples 25 and 26 at a laminate surface temperature of 180° C. to produce a reflector for a circular polarization antenna (Examples 179 and 180).

Laminates produced in the same manner as in Examples 179 and 180 (the types of the inorganic filler and polycarbonate resin, the inorganic filler content of the composition, and the type of the metallic foil used in preparation of each laminate are shown in Table 16) were stamping molded in the same manner as in Examples 27 and 28 (the shape of the mold was the same as used in Example 1) to produce a reflector (Examples 181 and 182).

On one side of each metallic foil as shown in Table 16 was insert injection molded a laminate (produced in the same manner as in Examples 159 to 166) in the same manner as in Examples 29 to 36 to produce a reflector of the same shape as in Example 1 (Examples 183 to 190, and Comparative Examples 31 and 32).

The thus-produced reflectors were measured for the modulus of elasticity and coefficient of linear expansion of the inorganic filler-containing polycarbonate resin, and the peeling strength of the metallic foil from the inorganic filler-containing polycarbonate resin layer. The results are shown in Table 16.

as in Examples 39 and 40 (the shape of the mold was the same as used in Example 1) to produce a reflector (Examples 193 and 194).

On one side of each metallic foil as shown in Table 17 was insert injection molded a laminate (produced in the same manner as in Examples 159 to 166) in the same manner as in Examples 29 to 36 to produce a reflector of the same shape as in Example 1 (Examples 195 to 202,

TABLE 16

| Example No. | Type of Coating Layer | Type of Metal of Metallic Foil | Inorganic Filler | | Peeling Strength (kg/15 mm) | Flexural Modulus (kg/cm$^2$) | Coefficient of Linear Expansion (cm/cm °C.) |
|---|---|---|---|---|---|---|---|
| | | | Type | Content (wt %) | | | |
| 179 | Paint F | Al | Talc | 40 | 6.5 | 58,000 | 4.0 × 10$^{-5}$ |
| 180 | " | Copper | Mica | " | 6.0 | 62,000 | 3.5 × 10$^{-5}$ |
| 181 | " | Al | Talc | " | 6.5 | 58,000 | 4.0 × 10$^{-5}$ |
| 182 | " | Silver | " | " | " | " | " |
| 183 | " | Al | " | " | 7.1 | " | " |
| 184 | Paint U | " | " | " | " | " | " |
| 185 | " | Brass | GF | 10 | 6.5 | 35,000 | 4.5 × 10$^{-5}$ |
| 186 | " | Silver | " | 20 | 6.8 | 50,000 | 2.5 × 10$^{-5}$ |
| 187 | " | Al | " | 30 | 7.1 | 67,000 | 2.0 × 10$^{-5}$ |
| 188 | Paint F | " | " | " | " | " | " |
| 189 | " | " | Mica | 40 | 6.5 | 62,000 | 3.5 × 10$^{-5}$ |
| 190 | " | " | CaCO$_3$ | " | 6.3 | 37,000 | 6.0 × 10$^{-5}$ |
| Comparative Example 31 | — | " | Talc | " | 6.5 | 58,000 | 4.0 × 10$^{-5}$ |
| Comparative Example 32 | Paint F | " | — | 0 | " | 22,000 | 8.0 × 10$^{-5}$ |

EXAMPLES 191 TO 202 AND COMPARATIVE EXAMPLES 33 AND 34

Inorganic filler/styrene polymer combinations (the types of the inorganic filler and styrene polymer, and the inorganic filler content of the resulting composition are shown in Table 17; in Comparative Example 34, no inorganic filler was added) were each processed in the same manner as in Example 37 to produce a sheet.

The above-described coated metallic foil and the inorganic filler-containing styrene polymer sheet were bonded together by the dry lamination method to produce a laminate. This laminate was vacuum molded in the same manner as in Examples 37 and 38 to produce a reflector for a circular polarization antenna (Examples 191 and 192).

Laminates produced in the same manner as in Examples 191 and 192 (the types of the inorganic filler and styrene polymer, the inorganic filler content of the composition, and the type of the metallic foil are shown in Table 17) were stamping molded in the same manner and Comparative Examples 33 and 34).

The thus-produced reflectors were measured for the modulus of elasticity and coefficient of linear expansion of the inorganic filler-containing styrene polymer layer, and the peeling strength of the metallic foil from the inorganic filler-containing styrene polymer layer. The results are shown in Table 17.

TABLE 17

| Example No. | Type of Coating Layer | Type of Metal of Metallic Foil | Type of Styrene Polymer | Inorganic Filler | | Peeling Strength (kg/15 mm) | Flexural Modulus (kg/cm$^2$) | Coefficient of Linear Expansion (cm/cm °C.) |
|---|---|---|---|---|---|---|---|---|
| | | | | Type | Content (wt %) | | | |
| 191 | Paint F | Al | HIPS | Talc | 30 | 6.8 | 45,000 | 5 × 10$^{-5}$ |
| 192 | " | Copper | " | Mica | " | 5.5 | 49,000 | 4 × 10$^{-5}$ |
| 193 | " | Al | " | Talc | " | 6.8 | 45,000 | 5 × 10$^{-5}$ |
| 194 | " | Silver | " | " | " | 5.0 | " | " |
| 195 | " | Al | PS | GF | 10 | 6.0 | 55,000 | 3.5 × 10$^{-5}$ |
| 196 | Paint U | " | " | " | 20 | 6.1 | 64,000 | 3 × 10$^{-5}$ |
| 197 | " | Brass | " | " | 30 | 6.3 | 70,000 | 2.5 × 10$^{-5}$ |
| 198 | " | Silver | " | " | " | 5.9 | " | " |
| 199 | " | Al | HIPS | " | " | 6.8 | 50,000 | 3 × 10$^{-5}$ |
| 200 | Paint F | " | " | Talc | " | 7.2 | 45,000 | 5 × 10$^{-5}$ |
| 201 | " | " | PS | CaCO$_3$ | " | 6.3 | 38,000 | 6.5 × 10$^{-5}$ |
| 202 | " | " | " | Mica | " | 6.8 | 68,000 | 4 × 10$^{-5}$ |
| Comparative Example 33 | — | " | HIPS | " | " | 6.5 | 49,000 | " |
| Comparative Example 34 | Paint F | " | " | — | 0 | 6.1 | 19,000 | 8 × 10$^{-5}$ |

EXAMPLES 203 TO 214 AND COMPARATIVE EXAMPLES 35 AND 36

Inorganic filler/impact resistant resin (A) combinations (the types of the inorganic filler and impact resistant resin (A), and the inorganic filler content of the resulting composition are shown in Table 18; in Comparative Example 36, no inorganic filler was added) were each processed in the same manner as in Example 49 to produce a sheet.

The above-described coated metallic foil and the inorganic filler-containing impact resistant resin (A)

sheet were bonded together by the dry lamination method to produce a laminate. This laminate was vacuum molded in the same manner as in Examples 49 and 50 to produce a reflector for a circular polarization antenna (Examples 203 and 204).

Laminates produced in the same manner as in Examples 203 and 204 (the types of the inorganic filler and impact resistant resin, the inorganic filler content of the composition, and the type of the metallic foil are shown in Table 18) were stamping molded in the same manner as in Examples 51 and 52 (the shape of the mold was the same as used in Example 1) to produce a reflector (Examples 205 and 206).

On one side of each metallic foil as shown in Table 18 was insert injection molded a laminate (produced in the same manner as in Examples 159 to 166) in the same manner as in Examples 53 to 60 to produce a reflector of the same shape as in Example 1 (Examples 207 to 214, and Comparative Examples 35 and 36).

The thus-produced reflectors were measured for the modulus of elasticity and coefficient of linear expansion of the inorganic filler-containing impact resistant resin (A) layer, and the peeling strength of the metallic foil from the inorganic filler-containing impact resistant (A) layer. The results are shown in Table 18.

resulting composition are shown in Table 19; in Comparative Example 38, no inorganic filler was added) were each processed in the same manner as in Examples 61 to 72 to produce a sheet.

The above-described coated metallic foil and the inorganic filler-containing impact resistant resin (B) sheet were bonded together by the dry lamination method to produce a laminate. This laminate was vacuum molded in the same manner as in Examples 61 and 62 to produce a reflector for a circular polarization antenna (Examples 215 and 216).

Laminates produced in the same manner as in Examples 215 and 216 (the types of the inorganic filler and impact resistant resin, the inorganic filler content of the composition, and the type of the metallic foil are shown in Table 19) were stamping molded in the same manner as in Examples 63 and 64 (the shape of the mold was the same as in Example 1) to produce a reflector (Examples 217 and 218).

On one side of each metallic foil as shown in Table 19 was insert injection molded a laminate (produced in the same manner as in Examples 159 to 166) in the same manner as in Examples 65 to 72 to produce a reflector of the same shape as in Example 1 (Examples 219 to 226, and Comparative Examples 37 and 38).

TABLE 18

| Example No. | Type of Paint | Type of Metal of Metallic Foil | Type of Impact Resistant Resin (A) | Inorganic Filler Type | Inorganic Filler Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 203 | Paint F | Al | ACS(1) | Talc | 30 | 5.3 | 46,000 | $5.0 \times 10^{-5}$ |
| 204 | " | Copper | Mixture(2) | Mica | " | 4.8 | 50,000 | $4.0 \times 10^{-5}$ |
| 205 | " | Al | ACS(1) | Talc | " | 5.3 | 46,000 | $5.0 \times 10^{-5}$ |
| 206 | " | Silver | Mixture(1) | " | " | 4.5 | 47,000 | " |
| 207 | " | Al | ACS (1) | " | " | 5.8 | 46,000 | " |
| 208 | Paint U | " | " | GF | " | 5.1 | 73,000 | $2.5 \times 10^{-5}$ |
| 209 | " | Brass | " | " | " | 4.5 | " | " |
| 210 | " | Silver | Mixture(1) | CaCO$_3$ | 50 | " | 35,000 | $7.0 \times 10^{-5}$ |
| 211 | " | Al | " | Talc | 30 | " | 47,000 | $5.0 \times 10^{-5}$ |
| 212 | Paint F | " | Mixture(2) | " | " | 5.1 | 46,000 | " |
| 213 | " | " | Mixture(1) | Mica | " | 4.8 | 52,000 | $4.0 \times 10^{-5}$ |
| 214 | " | " | ACS(1) | " | " | 5.3 | 51,000 | " |
| Comparative Example 35 | — | " | " | " | " | " | " | " |
| Comparative Example 36 | Paint U | " | " | — | 0 | 5.6 | 21,000 | $9.0 \times 10^{-5}$ |

EXAMPLES 215 TO 226 AND COMPARATIVE EXAMPLES 37 AND 38

Inorganic filler/impact resistant resin (B) combinations (the types of the inorganic filler and impact resistant resin (B), and the inorganic filler content of the The thus-produced reflectors were measured for the modulus of elasticity and coefficient of linear expansion of the inorganic filler-containing impact resistant resin (B) layer, and the peeling strength of the metallic foil from the inorganic filler-containing impact resistant resin (B) layer. The results are shown in Table 19.

TABLE 19

| Example No. | Type of Coating Layer | Type of Metal of Metallic Foil | Type of Impact Resistant Resin (B) | Inorganic Filler Type | Inorganic Filler Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 215 | Paint F | Al | ABS | Talc | 30 | 4.5 | 58,000 | $4.0 \times 10^{-5}$ |
| 216 | " | Copper | AAS | " | " | 4.1 | 56,000 | " |
| 217 | " | Al | AES | " | " | 4.5 | 53,000 | " |
| 218 | " | Silver | AAS | Mica | " | 4.3 | 58,000 | $3.0 \times 10^{-5}$ |
| 219 | " | Al | " | GF | " | 5.1 | 80,000 | $2.5 \times 10^{-5}$ |
| 220 | Paint U | " | " | " | " | 4.5 | " | " |
| 221 | " | Brass | " | Talc | " | 5.2 | 56,000 | $4.0 \times 10^{-5}$ |
| 222 | " | Silver | MBS | " | " | 4.8 | 57,000 | " |
| 223 | " | Al | AES | GF | " | 4.9 | 65,000 | $2.5 \times 10^{-5}$ |
| 224 | Paint F | " | " | " | " | " | " | " |
| 225 | " | " | " | Talc | " | 4.8 | 53,000 | $4.0 \times 10^{-5}$ |
| 226 | " | " | ABS | CaCO$_3$ | 50 | 3.9 | 35,000 | $6.0 \times 10^{-5}$ |
| Comparative Example 37 | — | " | AAS | " | 30 | 5.2 | 56,000 | $4.0 \times 10^{-5}$ |

TABLE 19-continued

| Example No. | Type of Coating Layer | Type of Metal of Metallic Foil | Type of Impact Resistant Resin (B) | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| Comparative Example 38 | Paint F | " | " | — | 0 | " | 21,000 | 8.0 × 10$^{-5}$ |

EXAMPLES 227 TO 238 AND COMPARATIVE EXAMPLES 39 AND 40

Inorganic filler/phenylene oxide polymer combinations (the types of the inorganic filler and phenylene oxide polymer, and the inorganic filler content of the resulting composition are shown in Table 20; in Comparative Example 40, no inorganic filler was added) were each processed in the same manner as in Examples 73 to 84 to produce a sheet.

The above-described coated metallic foil and the inorganic filler-containing phenylene oxide polymer sheet were bonded together by the dry lamination method to produce a laminate. This laminate was vacuum molded in the same manner as in Examples 73 and 74 to produce a reflector for a circular polarization antenna (Examples 227 and 228).

Laminates produced in the same manner as in Examples 227 and 228 (the types of the inorganic filler and phenylene oxide polymer, the inorganic filler content of the composition, and the type of the metallic foil are shown in Table 20) were stamping molded in the same manner as in Examples 75 or 76 (the shape of the mold was the same as used in Example 1) to produce a reflector (Examples 229 and 230).

On one side of each metallic foil as shown in Table 20 was insert injection molded a laminate (produced in the same manner as in Examples 159 to 166) in the same manner as in Examples 77 to 84 to produce a reflector of the same shape as in Example 1 (Examples 231 to 238, and Comparative Examples 39 and 40).

The thus-produced reflectors were measured for the modulus of elasticity and coefficient of linear expansion of the inorganic filler-containing phenylene oxide polymer layer, and the peeling strength of the metallic foil from the inorganic filler-containing phenylene oxide polymer layer. The results are shown in Table 20.

EXAMPLES 239 TO 250 AND COMPARATIVE EXAMPLES 41 AND 42

Inorganic filler/methyl methacrylate polymer combinations (the types of the inorganic filler and methyl methacrylate polymer, and the inorganic filler content of the resulting composition are shown in Table 21; in Comparative Example 42, no inorganic filler was added) were each processed in the same manner as in Examples 85 to 96 to produce a sheet.

The above-described coated metallic foil and the inorganic filler-containing methyl methacrylate polymer sheet were bonded together by the dry lamination method to produce a laminate. This laminate was vacuum molded in the same manner as in Examples 85 and 86 to produce a reflector for a circular polarization antenna (Examples 239 and 240).

Laminates produced in the same manner as in Examples 239 and 240 (the types of the inorganic filler and methyl methacrylate polymer, the inorganic filler content of the composition, and the type of the metallic foil are shown in Table 21) were stamping molded in the same manner as in Examples 87 and 88 (the shape of the mold was the same as used in Example 1) to produce a reflector (Examples 241 and 242).

On one side of each metallic foil as shown in Table 21 was insert injection molded a laminate (produced in the same manner as in Examples 159 to 166) in the same manner as in Examples 89 to 96 to produce a reflector of the same shape as in Example 1 (Examples 243 to 250, and Comparative Examples 41 and 42).

The thus-produced reflectors were measured for the modulus of elasticity and coefficient of linear expansion of the inorganic filler-containing methyl methacrylate polymer layer, and the peeling strength of the metallic foil from the inorganic fillercontaining methyl methacrylate polymer layer. The results are shown in Table 21.

TABLE 20

| Example No. | Type of Coating Layer | Type of Metal of Metallic Foil | PPO/Other Resin Weight Ratio | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 227 | Paint F | Al | ACS (85) | Talc | 30 | 4.0 | 51,000 | 5 × 10$^{-5}$ |
| 228 | " | Copper | HIPS (80) | " | " | 4.1 | 45,000 | " |
| 229 | " | Al | ABS (85) | " | " | 4.3 | 53,000 | 4 × 10$^{-5}$ |
| 230 | " | Silver | PS (85) | Mica | " | 4.5 | 49,000 | " |
| 231 | " | Al | MBS (85) | GF | " | 4.8 | 80,000 | " |
| 232 | Paint U | " | AAS (85) | " | " | 4.9 | 78,000 | " |
| 233 | " | Brass | AES (85) | Talc | " | 4.7 | 53,000 | " |
| 234 | " | Silver | PS (80) | " | " | " | 47,000 | 5 × 10$^{-5}$ |
| 235 | " | Al | PPO grafted material | GF | " | 5.1 | 71,000 | 3 × 10$^{-5}$ |
| 236 | Paint F | " | AAS (85) | CaCO$_3$ | 50 | 4.9 | 40,000 | 7 × 10$^{-5}$ |
| 237 | " | " | PS (80) | Talc | 30 | 4.8 | 49,000 | 5 × 10$^{-5}$ |
| 238 | " | " | " | " | " | " | 48,000 | " |
| Comparative Example 39 | — | " | " | " | " | " | " | " |
| Comparative Example 40 | Paint F | " | " | — | 0 | " | 25,000 | 8 × 10$^{-5}$ |

TABLE 21

| Example No. | Type of Paint | Type of Metal of Metallic Foil | Type of Methyl Methacrylate Polymer | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 239 | Paint F | Al | PMMA (2) | Talc | 40 | 3.1 | 72,000 | $4 \times 10^{-5}$ |
| 240 | " | Copper | " | Mica | " | 2.9 | 81,000 | $3 \times 10^{-5}$ |
| 241 | " | Al | " | Talc | " | 3.1 | 72,000 | $4 \times 10^{-5}$ |
| 242 | " | Silver | " | Mica | " | 2.8 | 81,000 | $3 \times 10^{-5}$ |
| 243 | " | Al | PMMA (1) | Talc | " | 3.8 | 73,000 | $4 \times 10^{-5}$ |
| 244 | Paint U | " | " | Mica | " | 3.7 | 82,000 | $3 \times 10^{-5}$ |
| 245 | " | Brass | " | Talc | " | 3.5 | 73,000 | $4 \times 10^{-5}$ |
| 246 | " | Silver | " | " | " | 3.3 | " | " |
| 247 | " | Al | " | GF | 30 | 4.0 | 77,000 | $3 \times 10^{-5}$ |
| 248 | Paint F | " | " | " | " | " | " | " |
| 249 | " | " | " | CaCO$_3$ | 55 | 4.1 | 65,000 | $6 \times 10^{-5}$ |
| 250 | " | " | " | Mica | 40 | 3.7 | 82,000 | $3 \times 10^{-5}$ |
| Comparative Example 41 | — | " | " | Talc | " | 3.8 | 73,000 | $4 \times 10^{-5}$ |
| Comparative Example 42 | Paint F | " | " | — | 0 | 3.5 | 30,000 | $8 \times 10^{-5}$ |

EXAMPLES 251 TO 262 AND COMPARATIVE EXAMPLES 43 AND 44

Inorganic filler/aromatic polyester combinations (the types of the inorganic filler and aromatic polyester, and the inorganic filler content of the resulting composition are shown in Table 22; in Comparative Example 44, no inorganic filler was added) were each processed in the same manner as in Examples 97 to 108 to produce a sheet.

The above-described coated metallic foil and the inorganic filler-containing aromatic polyester sheet were bonded together by the dry lamination method to produce a laminate. This laminate was vacuum molded in the same manner as in Examples 97 or 98 at a laminate surface temperature of 150° C. to produce a reflector for a circular polarization antenna (Examples 251 and 252).

Laminates produced in the same manner as in Examples 251 and 252 (the types of the inorganic filler and aromatic polyester, the inorganic filler content of the composition, and the type of the metallic foil are shown in Table 22) were stamping molded in the same manner as in Examples 99 or 100 (the shape of the mold was the same as used in Example 1) to produce a reflector (Examples 253 and 254).

On one side of each metallic foil as shown in Table 22 was insert injection molded a laminate (produced in the same manner as in Examples 159 to 166) in the same manner as in Examples 101 to 108 to produce a reflector of the same shape as in Example 1 (Examples 255 to 262, and Comparative Examples 43 and 44).

The thus-produced reflectors were measured for the modulus of elasticity and coefficient of linear expansion of the inorganic filler-containing aromatic polyester layer, and the peeling strength of the metallic foil from the inorganic filler-containing aromatic polyester layer. The results are shown in Table 22.

TABLE 22

| Example No. | Type of Paint | Type of Metal of Metallic Foil | Type of Ester Polymer | Inorganic Filler Type | Content (wt %) | Peeling Strength of Metallic Foil (kg/15 mm) | Flexural Modulus (kg/cm$^2$) | Coefficient of Linear Expansion (cm/cm °C.) |
|---|---|---|---|---|---|---|---|---|
| 251 | Paint F | Al | PET | Talc | 40 | 3.5 | 68,000 | $2.2 \times 10^{-5}$ |
| 252 | " | Copper | " | " | " | 2.9 | " | " |
| 253 | " | Al | " | GF | 30 | 3.8 | 77,000 | $1.8 \times 10^{-5}$ |
| 254 | " | Silver | PBT | " | " | 4.1 | 93,000 | $2.5 \times 10^{-5}$ |
| 255 | " | Al | " | " | " | 4.5 | " | " |
| 256 | Paint U | " | " | " | " | " | " | " |
| 257 | " | Brass | " | " | " | 3.8 | " | " |
| 258 | " | Silver | PET | " | " | 3.1 | 77,000 | $1.8 \times 10^{-5}$ |
| 259 | " | Al | " | " | " | 3.8 | " | " |
| 260 | Paint F | " | PBT | Talc | 40 | 4.1 | 78,000 | $3.1 \times 10^{-5}$ |
| 261 | " | " | " | Mica | " | 3.9 | 81,000 | $2.8 \times 10^{-5}$ |
| 262 | " | " | " | CaCO$_3$ | " | 4.7 | 40,000 | $5.5 \times 10^{-5}$ |
| Comparative Example 43 | — | " | " | GF | 30 | 4.5 | 93,000 | $2.5 \times 10^{-5}$ |
| Comparative Example 44 | Paint F | " | " | — | 0 | 4.3 | 23,000 | $9.0 \times 10^{-5}$ |

EXAMPLES 263 TO 274 AND COMPARATIVE EXAMPLES 45 AND 46

Inorganic filler/oxymethylene polymer combinations (the types of the inorganic filler and oxymethylene polymer, and the inorganic filler content of the resulting composition are shown in Table 23; in Comparative Example 46, no inorganic filler was added) were each processed in the same manner as in Examples 109 to 120 to produce a sheet.

The above-described coated metallic foil and the inorganic filler-containing oxymethylene polymer sheet were bonded together by the dry lamination method to produce a laminate. This laminate was vacuum molded in the same manner as in Example 109 or 110 by the use of a bowl shaped female mold (external diameter: 750 mm; height: 80 mm) at a laminate surface temperature of 150° C. to produce a reflector for a circular polarization antenna (Examples 263 and 264).

Laminates produced in the same manner as in Examples 263 and 264 (the types of the inorganic filler and oxymethylene polymer, the inorganic filler content of the composition, and the type of the metallic foil are shown in Table 23) were each stamping molded in the same manner as in Examples 111 or 112 (the shape of the mold was the same as used in Example 1) to produce a reflector for a circular polarization antenna (Examples 265 and 266).

One one side of each metallic foil as shown in Table 23 was insert injection molded a laminate (produced in the same manner as in Examples 159 to 166) in the same manner as in Examples 113 to 120 to produce a reflector of the same shape as in Example 1 (Examples 267 to 274, and Comparative Examples 45 and 46).

The thus-produced reflectors were measured for the modulus of elasticity and coefficient of linear expansion of the inorganic filler-containing oxymethylene polymer layer, and the peeling strength of the metallic foil from the inorganic filler-containing oxymethylene polymer layer. The results are shown in Table 23.

processed in the same manner as in Examples 121 to 132 to produce a sheet.

The above-described coated metallic foil and the inorganic filler-containing vinyl chloride polymer sheet were bonded together by the dry lamination method to produce a laminate. This laminate was vacuum molded in the same manner as in Example 121 or 122 to produce a reflector for a circular polarization antenna (Examples 275, 276, 281, 296 and Comparative Examples 47 and 48).

Laminates produced in the same manner as in Examples 275 and 276 (the types of the inorganic filler and vinyl chloride polymer, the inorganic filler content of the composition, and the type of the metallic foil are shown in Table 24) were stamping molded in the same manner as in Example 123 or 124 (the shape of the mold was the same as used in Example 1) to produce a reflector (Examples 277 and 278).

On one side of each metallic foil as shown in Table 24 was insert injection molded a laminate (produced in the same manner as in Examples 159 to 166) in the same manner as in Examples 125 to 132 to produce a reflector of the same shape as in Example 1 (Examples 279 and 280).

The thus-produced reflectors were measured for the modulus of elasticity and coefficient of linear expansion of the inorganic filler-containing vinyl chloride polymer layer, and the peeling strength of the metallic foil from the inorganic filler-containing vinyl chloride polymer layer. The results are shown in Table 24.

TABLE 23

| Example No. | Type of Paint | Type of Metal of Metallic Foil | Type of Resin | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 263 | Paint F | Al | POM (1) | Talc | 30 | 2.5 | 50,000 | $7 \times 10^{-5}$ |
| 264 | " | Copper | " | Mica | " | 2.3 | 54,000 | $6 \times 10^{-5}$ |
| 265 | " | Al | " | Talc | " | 2.8 | 50,000 | $7 \times 10^{-5}$ |
| 266 | " | Silver | " | Mica | " | 2.2 | 54,000 | $6 \times 10^{-5}$ |
| 267 | " | Al | POM (2) | Talc | " | 3.1 | 48,000 | $7 \times 10^{-5}$ |
| 268 | Paint U | " | " | GF | 25 | 3.0 | 65,000 | $5 \times 10^{-5}$ |
| 269 | " | Brass | " | " | " | 2.8 | " | " |
| 270 | " | Silver | " | " | " | 2.7 | " | " |
| 271 | " | Al | POM (3) | " | " | 3.2 | 64,000 | " |
| 272 | Paint F | " | " | CaCO$_3$ | 40 | 3.3 | 40,000 | $9 \times 10^{-5}$ |
| 273 | " | " | " | Talc | 30 | 3.2 | 48,000 | $7 \times 10^{-5}$ |
| 274 | " | " | " | Mica | " | 3.0 | 51,000 | $6 \times 10^{-5}$ |
| Comparative Example 45 | — | " | " | Talc | " | 3.2 | 48,000 | $7 \times 10^{-5}$ |
| Comparative Example 46 | Paint F | " | " | — | 0 | 3.0 | 26,000 | $13 \times 10^{-5}$ |

EXAMPLES 275 TO 286 AND COMPARATIVE EXAMPLES 47 AND 48

Inorganic filler/vinyl chloride resin combinations (the types of the inorganic filler and vinyl chloride resin polymer, and the inorganic filler content of the resulting composition are shown in Table 24; in Comparative Example 48, no inorganic filler was added) were each

TABLE 24

| Example No. | Type of Paint | Type of Metal of Metallic Foil | Type of PVC Resin | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| 275 | Paint F | Al | PVC (2) | Talc | 30 | 4.1 | 50,000 | $5 \times 10^{-5}$ |
| 276 | " | Copper | " | Mica | " | 3.8 | 56,000 | $4 \times 10^{-5}$ |
| 277 | " | Al | " | Talc | " | 4.1 | 50,000 | $5 \times 10^{-5}$ |
| 278 | " | Silver | " | Mica | " | 3.9 | 56,000 | $4 \times 10^{-5}$ |
| 279 | " | Al | PVC (3) | Talc | " | 4.7 | 41,000 | $6 \times 10^{-5}$ |
| 280 | Paint U | " | " | Mica | " | 4.2 | 43,000 | $5 \times 10^{-5}$ |
| 281 | " | Brass | " | GF | " | 4.1 | 58,000 | $4 \times 10^{-5}$ |
| 282 | " | Silver | " | " | " | 4.0 | " | " |
| 283 | " | Al | " | Mixture (A) | " | 4.5 | 62,000 | " |
| 284 | Paint F | " | " | " | " | " | " | " |
| 285 | " | " | " | CaCO$_3$ | " | 4.1 | 35,000 | $7 \times 10^{-5}$ |
| 286 | Paint U | " | " | " | " | " | " | " |
| Comparative Example 47 | — | " | PVC (2) | Talc | " | " | 50,000 | $5 \times 10^{-5}$ |

TABLE 24-continued

| Example No. | Type of Paint | Type of Metal of Metallic Foil | Type of PVC Resin | Inorganic Filler Type | Content (wt %) | Peeling Strength (kg/15 mm) | Flexural Modulus (kg/cm$^2$) | Coefficient of Linear Expansion (cm/cm °C.) |
|---|---|---|---|---|---|---|---|---|
| Comparative Example 48 | Paint F | " | " | — | 0 | 4.3 | 26,000 | $10 \times 10^{-5}$ |

EXAMPLES 287 TO 297 AND COMPARATIVE EXAMPLES 49 AND 50

PP(C) and HDPE(3) as described above were each molded into a film having a thickness of 50 microns. The olefin polymer films and a metallic foil with a coating layer were bonded together by the dry lamination method to produce a laminated metallic foil.

In addition, an inorganic filler/olefin polymer composition (the types of the inorganic filler and olefin polymer, and the inorganic filler content of the composition are shown in Table 25; in Comparative Example 50, the inorganic filler was not added) was prepared in the same manner as in Examples 133 to 144.

Using the thus-produced laminated metallic foil, insert injection molding was conducted in the same manner as in Examples 133 to 144 to produce a reflector of the same shape as in Example 1.

The thus-produced reflectors were measured for the modulus of elasticity and coefficient of linear expansion of the inorganic filler-containing olefin polymer layer, and the peeling strength of the metallic foil from the inorganic filler-containing olefin polymer. The results are shown in Table 25.

EXAMPLES 298 TO 308 AND COMPARATIVE EXAMPLES 51 AND 52

An inorganic filler/olefin polymer composition (the types of the inorganic filler and olefin polymer, and the inorganic filler content of the composition are shown in Table 26; in Comparative Example 52, the inorganic filler was not added) was prepared in the same manner as in Examples 1 to 12.

To the above composition was added 0.3% by weight of Blowing Agent (B) or 0.5% by weight of Blowing Agent (A), and the resulting mixture was dry blended in the same manner as in Examples 144 to 154 to prepare an expandable composition.

The above-produced coated metallic foil was placed on a moving mold surface in the injection molding method as in Examples 144 to 154 (Examples 298 to 300, and 304 to 307) or the injection molding method as in Examples 147 to 149 and 154 (Examples 301 to 303 and 308, and Comparative Examples 51 and 52). After the mold was closed, a reflector was produced in the same manner as in Examples 144 to 154.

The thus-produced reflectors were measured for the modulus of elasticity and coefficient of linear expansion of the inorganic filler-containing olefin polymer layer, and the peeling strength of the metallic foil from the inorganic filler-containing olefin polymer layer. The results are shown in Table 26.

TABLE 25

| Example No. | Type of Coating Layer | Type of Metal of Metallic Foil | Type of Laminate Olefin Polymer | Inorganic Filler-Containing Polymer | | | Peeling Strength (kg/15 mm) | Flexural Modulus (kg/cm$^2$) | Coefficient of Linear Expansion (cm/cm °C.) |
|---|---|---|---|---|---|---|---|---|---|
| | | | | Type of Olefin Polymer | Type of Inorganic Filler | Content (wt %) | | | |
| 287 | Paint F | Al | PP(C) | PP(B) | Talc | 40 | Cohesive Failure | 45,000 | $5 \times 10^{-5}$ |
| 288 | " | " | " | " | Mica | " | Cohesive Failure | 71,000 | $4 \times 10^{-5}$ |
| 289 | " | " | " | " | GF | 30 | Cohesive Failure | 53,000 | " |
| 290 | " | " | " | " | CaCO$_3$ | 55 | Cohesive Failure | 33,000 | $8 \times 10^{-5}$ |
| 291 | " | " | HDPE(3) | HDPE(2) | Talc | 40 | Cohesive Failure | 37,000 | $5 \times 10^{-5}$ |
| 292 | Paint U | " | PP(C) | PP(B) | " | " | Cohesive Failure | 45,000 | " |
| 293 | " | Brass | " | " | " | " | Cohesive Failure | " | " |
| 294 | " | Silver | " | " | " | " | Cohesive Failure | " | " |
| 295 | " | Al | " | " | Mica | " | Cohesive Failure | 71,000 | $4 \times 10^{-5}$ |
| 296 | Paint F | Copper | " | " | Talc | " | Cohesive Failure | 45,000 | $5 \times 10^{-5}$ |
| 297 | " | Brass | " | " | " | " | Cohesive Failure | " | " |
| Comparative Example 49 | — | Al | " | " | " | " | Cohesive Failure | " | " |
| Comparative Example 50 | Paint F | " | " | " | — | 0 | Cohesive Failure | 15,000 | $12 \times 10^{-5}$ |

TABLE 26

| Example No. | Type of Paint | Type of Metal of Metallic Foil | Inorganic Filler-Containing Olefin Polymer | | | Type of Blowing Agent | Peeling Strength (kg/15 mm) | Flexural Modulus (kg/cm$^2$) | Coefficient of Linear Expansion (cm/cm °C.) | Average Expansion Ratio |
|---|---|---|---|---|---|---|---|---|---|---|
| | | | Type of Olefin Polymer | Type of Inorganic Filler | Content (wt %) | | | | | |
| 298 | Paint F | Al | PP(B) | Talc | 40 | (B) | 7.5 | 44,000 | 5 × 10$^{-5}$ | 1.20 |
| 299 | " | " | " | Mica | " | " | 7.8 | 69,000 | 4 × 10$^{-4}$ | 1.15 |
| 300 | " | " | " | GF | 30 | " | 8.5 | 51,000 | " | 1.10 |
| 301 | " | " | " | CaCO$_3$ | 55 | (A) | 8.8 | 32,000 | 8 × 10$^{-5}$ | 1.05 |
| 302 | " | " | HDPE(2) | Talc | 40 | " | 7.8 | 36,000 | 5 × 10$^{-5}$ | 1.23 |
| 303 | Paint U | " | PP(B) | " | " | " | 8.1 | 44,000 | " | " |
| 304 | " | Brass | " | " | " | (B) | 8.8 | " | " | 1.20 |
| 305 | " | Silver | " | " | " | " | 8.0 | " | " | " |
| 306 | " | Al | " | Mica | " | " | 8.4 | 69,000 | 4 × 10$^{-5}$ | 1.15 |
| 307 | Paint F | Copper | " | Talc | " | (A) | 7.9 | 44,000 | 5 × 10$^{-5}$ | 1.20 |
| 308 | " | Brass | " | " | " | (B) | 8.7 | " | " | 1.23 |
| Comp. Ex. 51 | — | Al | " | " | " | (A) | 7.4 | " | " | " |
| Comp. Ex. 52 | Paint F | " | " | — | 0 | " | 7.3 | 15,000 | 12 × 10$^{-5}$ | " |

EXAMPLES 309 TO 317 AND COMPARATIVE EXAMPLES 53 AND 54

As ultraviolet absorber-containing olefin polymers, PP(A) and HDPE(1) were used.

The above ultraviolet absorber-containing olefin polymer was molded into a 200 micron thick film as an olefin polymer layer having superior weather resistance (Layer A). Between a metallic foil as shown in Table 27 (Layer C) and the above olefin polymer layer having superior weather resistance was sandwiched a film of a modified olefin polymer as shown in Table 27 (thickness: 50 microns; Layer B) by extrusion lamination (sandwich lamination) using a T-die at a temperature of 220° C. In addition, a modified olefin polymer layer (Layer D) was bonded to Layer C of the above laminate consisting of Layers A, B and C by the same extrusion lamination method as above. An inorganic filler and an olefin polymer (the types of the inorganic filler and olefin polymer, and the inorganic filler content of the composition are shown in Table 27; in Comparative Example 54, the inorganic filler was not added) were dry blended in the same manner as in Example 1 and then pelletized at a resin temperature of 230° C. by the use of a vented extruder. These pellets were molded into a sheet having a thickness of 2 mm by the use of a T-die molding machine.

The thus-produced inorganic filler-containing olefin polymer sheet was laminated on the above laminate consisting of Layers A, B, C and D at 280° C. by the dry lamination method. The thus-produced five-layer laminate was vacuum molded at 175° C. (surface temperature of the laminate) by the use of a bowl-shaped female mold (external diameter: 750 mm; height: 80 mm) to produce a reflector for a circular polarization antenna (Examples 309 and 310).

Five-layer laminates produced in the same manner as in Examples 309 and 310 (the types of the inorganic filler and olefin polymer, the inorganic filler content of the composition, and the type of the inorganic filler are shown in Table 27) were each subjected to two-stage stamping molding; under a pressure of 20 kg/cm$^2$ for 30 seconds at the first stage and under a pressure of 50 kg/cm$^2$ for 20 seconds at the second stage, at a surface temperature of 135° C. (the shape of the mold used was the same as used in Example 1) to produce a reflector (Examples 311 and 312).

The above-produced laminate consisting of Layers A, B, C and D was mounted on an injection molding machine (clamping force: 1,500 tons) in such a manner that the olefin polymer film (Layer A) having superior weather resistance was in contact with the male mold. After the mold was closed, insert injection molding was conducted using a composition composed of an inorganic filler and an olefin resin (the types of the inorganic filler and olefin resin, and the inorganic filler content of the composition are shown in Table 27) under the conditions of injection pressure 80 kg/cm$^2$ and resin temperature 240° C. to produce a reflector of the same shape as in Example 1 (Examples 313 to 317, and Comparative Examples 53 and 54).

The thus-produced reflectors were measured for the modulus of elasticity and coefficient of linear expansion of the inorganic filler-containing olefin polymer layer, and the peeling strength of the metallic foil from the inorganic filler-containing olefin polymer layer. The results are shown in Table27. The term "cohesive failure" in the column of the peeling strength in Table 27 means that the metallic layer (metallic foil) is cut or broken by the strong adhesive force.

TABLE 27

| Example No. | Type of Olefin Polymer Having Superior Resistance | Type of Metal | Type of Modified Polymer | Type of Olefin Polymer | Inorganic Filler | | Peeling Strength (kg/15 mm) | Flexural Modulus (kg/cm$^2$) | Coefficient of Linear Expansion (cm/cm °C.) |
|---|---|---|---|---|---|---|---|---|---|
| | | | | | Type | Content (wt %) | | | |
| 309 | PP(A) | Al | Modified PP | PP(B) | Talc | 40 | Cohesive Failure | 45,000 | 5 × 10$^{-5}$ |
| 310 | HDPE(1) | " | Modified PE | HDPE(2) | Mica | " | Cohesive Failure | 71,000 | 4 × 10$^{-5}$ |
| 311 | PP(A) | Copper | Modified PP | PP(B) | Talc | " | Cohesive Failure | 45,000 | 5 × 10$^{-5}$ |

TABLE 27-continued

| Example No. | Type of Olefin Polymer Having Superior Resistance | Type of Metal | Type of Modified Polymer | Type of Olefin Polymer | Inorganic Filler Type | Inorganic Filler Content (wt %) | Peeling Strength (kg/15 mm) | Flexural Modulus (kg/cm²) | Coefficient of Linear Expansion (cm/cm °C.) |
|---|---|---|---|---|---|---|---|---|---|
| 312 | HDPE(1) | Al | Modified PE | HDPE(2) | " | " | Cohesive Failure | " | " |
| 313 | PP(A) | " | Modified PP | PP(B) | " | " | Cohesive Failure | " | " |
| 314 | HDPE(1) | " | Modified PE | HDPE(2) | GF | 30 | Cohesive Failure | 44,000 | 4 × 10⁻⁵ |
| 315 | PP(A) | " | Modified PP | PP(B) | " | " | Cohesive Failure | 53,000 | " |
| 316 | HDPE(1) | Copper | Modified PE | HDPE(2) | " | " | Cohesive Failure | 44,000 | " |
| 317 | PP(A) | Al | Modified PP | PP(B) | CaCO₃ | 55 | Cohesive Failure | 33,000 | 8 × 10⁻⁵ |
| Comp. Ex. 53 | — | " | " | " | GF | 30 | Cohesive Failure | 53,000 | 4 × 10⁻⁵ |
| Comp. Ex. 54 | PP(A) | " | " | " | — | 0 | Cohesive Failure | 15,000 | 12 × 10⁻⁵ |

EXAMPLES 318 TO 326 AND COMPARATIVE EXAMPLES 55 AND 56

An epoxy resin-based primer (trade name: V-Furon Primer; produced by Dainippon Toryo Co., Ltd.) was coated on one side of a metallic foil as shown in Table 28 in a dry thickness of 20 microns and then dried. A paint as shown in Table 28 was coated on the primer layer of the metallic foil in a dry thickness of 30 microns and then was allowed to stand for one day and night. On the other side of the metallic foil of the above-produced laminate, a modified olefin polymer as shown in Table 28 was provided in the form of a film (thickness: 50 microns) at 220° C. by the use of a T-die; that is, the modified olefin polymer layer was bonded to the metallic layer. An inorganic filler and an olefin polymer (the types of the inorganic filler and olefin polymer, and the inorganic filler content of the composition are shown in Table 28; in Comparative Example 56, the inorganic filler was not added) were dry blended in the same manner as in Example 1 and pelletized at a resin temperature of 230° C. by the use of a vented extruder. These pellets were molded into a 2 mm thick sheet by the use of a T-die molding machine.

The thus-produced laminate, consisting of the coating layer, primer layer, metallic layer, and modified olefin layer, was laminated on an inorganic filler-containing olefin polymer sheet by the dry lamination method at 280° C. The thus-produced fine-layer laminate was vacuum molded at 175° C. (surface temperature of the laminate) by the use of a bowl-shaped female mold (external diameter: 750 mm; height: 80 mm) to produce a reflector for a circular polarization antenna (Examples 318 and 319).

Five-layer laminates produced in the same manner as in Examples 318 and 319 (the types of the inorganic filler and olefin polymer, the inorganic filler content of the composition, and the type of the metallic foil are shown in Table 28) were each subjected to two-stage stamping molding; under a pressure of 20 kg/cm² for 30 seconds at the first stage and under a pressure of 50 kg/cm² for 20 seconds at the second stage, at a surface temperature of 135° C. (the shape of the mold used was the same as in Example 1) to produce a reflector (Examples 320 and 321).

The above-produced laminates were each amounted on an injection molding machine (clamping force: 1,500 tons) in such a manner that the coating layer having superior weather resistance was in contact with the male mold. After the mold was closed, insert injection molding was conducted using an olefin resin/inorganic filler composition (the types of the olefin resin and inorganic filler, and the inorganic filler content of the composition are shown in Table 28) under the conditions of injection pressure 80 kg/cm² and resin temperature 240° C. to produce a reflector of the same shape as in Example 1 (Examples 322 to 326, and Comparative Examples 55 and 56).

The thus-produced reflectors were measured for the modulus of elasticity and coefficient of linear expansion of the inorganic filler-containing olefin polymer layer, and the peeling strength of the metallic foil from the inorganic filler-containing olefin polymer layer. The results are shown in Table 28.

TABLE 28

| Example No. | Type of Paint | Type of Metal | Type of Modified Olefin Polymer | Type of Olefin Polymer | Inorganic Filler Type | Inorganic Filler Content (wt %) | Peeling Strength (kg/15 mm) | Flexural Modulus (kg/cm²) | Coefficient of Linear Expansion (cm/cm °C.) |
|---|---|---|---|---|---|---|---|---|---|
| 318 | Paint F | Al | Modified PP | PP(B) | Talc | 40 | Cohesive Failure | 45,000 | 5 × 10⁻⁵ |
| 319 | " | " | Modified PE | HDPE(2) | Mica | " | Cohesive Failure | 71,000 | 4 × 10⁻⁵ |
| 320 | " | Copper | Modified PP | PP(B) | Talc | " | Cohesive Failure | 45,000 | 5 × 10⁻⁵ |
| 321 | " | Al | Modified PE | HDPE(2) | " | " | Cohesive Failure | " | " |
| 322 | Paint U | " | Modified PP | PP(B) | " | " | Cohesive Failure | " | " |
| 323 | " | " | Modified PE | HDPE(2) | GF | 30 | Cohesive | 44,000 | 4 × 10⁻⁵ |

TABLE 28-continued

| Example No. | Type of Paint | Type of Metal | Type of Modified Olefin Polymer | Type of Olefin Polymer | Inorganic Filler Type | Content (wt %) | Peeling Strength (kg/15 mm) | Flexural Modulus (kg/cm²) | Coefficient of Linear Expansion (cm/cm °C.) |
|---|---|---|---|---|---|---|---|---|---|
| 324 | " | " | Modified PP | PP(B) | " | " | Failure Cohesive Failure | 53,000 | " |
| 325 | " | Copper | Modified PE | HDPE(2) | " | " | Cohesive Failure | 44,000 | " |
| 326 | Paint F | Al | Modified PP | PP(B) | CaCO₃ | 55 | Cohesive Failure | 33,000 | 8 × 10⁻⁵ |
| Comparative Example 55 | — | " | " | " | GF | 30 | Cohesive Failure | 53,000 | 4 × 10⁻⁵ |
| Comparative Example 56 | Paint F | " | " | " | — | 0 | Cohesive Failure | 15,000 | 12 × 10⁻⁵ |

While the invention has been described in detail and with reference to specific embodiments thereof, it will be apparent to one skilled in the art that various changes and modifications can be made therein without departing from the spirit and scope thereof.

What is claimed is:

1. A reflector for a circular polariztion antenna, comprising in sequence
    (A) a thermoplastic resin layer having a thickness of from 5 μm to 5 mm;
    (B) a metallic layer having a thickness of from 5 μm to 1 mm; and
    (C) an inorganic filler-containing thermoplastic resin layer having a thickness of from 500 μm to 15 mm and an inorganic filler content of from 10 to 80% by weight.

2. A reflector for a circular polarization antenna as in claim 1,
    wherein said thermoplastic resin layer (A) is one having a thickness of from 10 μm to 5 mm;
    wherein said metallic layer (B) is one having a thickness of from 5 to 500 μm; and
    wherein said inorganic filler-containing thermoplastic resin layer (C) is one having a thickness of from 1 to 10 mm and an inorganic filler content of from 10 to 70% by weight.

3. A reflector for a circular polarization antenna as in claim 1,
    wherein said thermoplastic resin layer (A) is one having a thickness of from 10 μm to 1 mm;
    wherein said metallic layer (B) is one having a thickness of from 10 to 500 μm; and
    wherein said inorganic filler-containing thermoplastic resin layer (C) is one having a thickness of from 1 to 7 mm and an inorganic filler content of from 10 to 60% by weight.

4. A reflector for a circular polarization antenna as in claim 1, wherein
    layer (A) comprises a thermoplastic resin selected from the group consisting of (1) a homopolymer of a monomer containing a double bond selected from the group consisting of ethylene, propylene, vinylidene fluoride, vinyl chloride, and styrene, (2) a copolymer comprising at least 50% by weight of said monomers, (3) an acrylonitrile/styrene copolymer, (4) a resin comprising mainly methylmethacrylate, (5) a graft copolymer of styrene onto a rubber, (6) a polyamide resin, (7) a polyester resin, (8) a polyphenylene oxide resin, (9) a polycarbonate resin, and (10) a modified resin prepared by graft polymerization of an organic compound containing at least one double bond onto a thermoplastic resin as defined in (1) through (9);
    layer (B) is formed of a member selected from the group consisting of aluminum, iron, nickel, copper, zinc, silver, and an alloy composed mainly of said metals; and
    the inorganic filler-containing thermoplastic resin layer (C) comprises a thermoplastic resin selected from the group consisting of (1) an olefin polymer, (2) a polyamide resin, (3) a polycarbonate resin, (4) styrene polymer, (5) an impact resistant resin comprising chlorinated polyethylene and a chlorinated polyethylene produced by graft polymerization of styrene and at least one other vinyl compound, (6) an impact resistant resin prepared by graft polymerization of at least one vinyl compound selected from the group consisting of styrene, acrylonitrile, and methyl mehtacrylate onto at least one rubber selected from the group consisting of butadiene rubber, acrylate rubber, and ethylene/propylene rubber, (7) a phenylene oxide polymer, (8) a methyl methacrylate polymer, (9) an aromatic polyester, (10) an oxymethylene polymer, and (11) a vinyl chloride polymer.

5. A reflector for a circular polarization antenna as in claim 4, additionally comprising a first primer layer between the thermoplastic resin layer (A) and the metallic layer (B), and a second primer layer between the metallic layer (B) and the inorganic filler-containing thermoplastic resin layer (C).

6. A reflector for a circular polarization antenna as in claim 4, wherein the inorganic filler-containing thermoplastic resin layer (C) comprises an expanded olefin polymer layer comprising a core layer and a skin layer on the sides of said core layer, said skin layers being a substantially unexpanded layer and said core layer being an expanded layer.

7. A reflector for a circular polarization antenna as in claim 1, wherein
    layer (A) comprises a thermoplastic resin selected from the group consisting of (1) a fluorine-containing resin, (2) a resin composition comprising mainly vinyl chloride, ethylene, propylene, or a combination of ethylene and propylene, in combination with an ultraviolet absorber, and (3) a modified resin prepared by graft polymerization of an organic compound contalning at least one double bond onto a methyl methacrylate resin;
    layer (B) is formed of a member selected from the group consisting of aluminum, copper, silver, and an alloy composed mainly of said metals; and the inorganic filler-containing thermoplastic resin layer (C) comprises a thermoplastic resin selected from the group consisting of (1) an olefin polymer, (2) a polyamide resin, (3) an impact resistant resin comprising chlorinated polyethylene and a chlorinated polyethylene produced by graft polymerization of styrene and at least one other vinyl compound, (4) an impact resistant resin prepared by graft polymerization of at least one vinyl compound selected from the group consisting of styrene, acrylonitrile, and methyl methacrylate onto at least one rubber selected from the group consisting of butadiene rubber, acrylate, rubber, and ethylene/propylene rubber, (5) a phenylene oxide polymer, (6) a polycarbonate resin, and (7) an aromatic polyester resin.

8. A reflector for a circular polarization antenna as in claim 7, additionally comprising a first primer layer between the thermoplastic resin layer and the metallic layer (B), and a second primer layer between the metallic layer (B) and the inorganic filler-containing thermoplastic resin layer (C).

9. A reflector for a circular polarization antenna as in claim 8, wherein the inorganic filler-containing thermoplastic resin layer (C) comprises an expanded olefin polymer layer comprising a core layer and a skin layer on the sides of said core layer, said skin layers being a substantially unexpanded layer and said core layer being an expanded layer.

10. A reflector for a circular polarization antenna as in claim 7, wherein the inorganic filler-containing thermoplastic resin layer (C) comprises an expanded olefin polymer layer comprising a core layer and a skin layer on the sides of said core layer, said skin layers being a substantially unexpanded layer and said core layer being an expanded layer.

11. A reflector for a circular polarization antenna as in claim 1, additionally comprising a first primer layer between the thermoplastic resin layer (A) and the metallic layer (B), and a second primer layer between the metallic layer (B) and the inorganic filler-containing thermoplastic resin layer (C).

12. A reflector for a circular polarization antenna as in claim 1, wherein the inorganic filler-containing thermoplastic resin layer (C) comprises an expanded olefin polymer layer comprising a core layer and a skin layer on the sides of said core layer, said skin layers being a substantially unexpanded layer and said core layer being an expanded layer.

13. A reflector for a circular polarization antenna as in claim 1, wherein said inorganic filler-containing thermoplastic resin layer (C) contains an inorganic filler selected from the group consisting of aluminum, copper, iron, lead, nickel, magnesium, calcium, barium, zinc, zirconium, molybdenum, silicon, antimony, titanium, aluminum oxide, aluminum oxide hydrates, calcium oxide, magnesium oxide, magnesium hydroxide, zinc oxide, lead oxide, magnesium carbonate, calcium carbonate, basic magnesium carbonate, white carbon, asbestos, mica, talc, glass fiber, glass powder, glass beads, clay, diatomaceous earth, silica, wollastonite, iron oxide, antimony oxide, titanium oxide, lithopone, pumice powder, aluminum sulfate, zirconium carbonate, zirconium oxide, barium carbonate, dolomite, molybdenum disulfide, and iron sand.

14. A reflector for a circular polarization antenna as in claim 13, wherein said inorganic filler is selected from the group consisting of mica, talc, calcium carbonate, glass fiber and wollastonite.

15. A reflector for a circular polarization antenna as in claim 14, wherein said inorganic filler is talc, mica or glass fiber.

16. A reflector for a circular polarization antenna as in claim 1, wherein said inorganic filler-containing thermoplastic resin layer (C) contains an inorganic filler selected from the group consisting of a powdered filler having a diameter of 1 mm or less, a fibrous filler having a diameter of from 1 to 500 $\mu$m and a length of from 0.1 to 6 mm, and a plate-shaped filler having a diameter of 2 mm or less.

17. A reflector for a circular polarization antenna as in claim 1, wherein said reflector is produced by insert injection molding.

18. A reflector for a circular polarization antenna as in claim 17, wherein said insert injection molding comprises laminating the metallic layer (B) with said thermoplastic resin layer (A), placing said laminated metallic layer between a male mold and a female mold in a manner such that said thermoplastic resin layer (A) is in contact with the male mold, closing the mold, and then injecting into the mold an inorganic filler-containing thermoplastic resin to form said inorganic filler-containing thermoplastic resin layer (C).

19. A reflector for a circular polariztion antenna, comprising in sequence
(A) a coating layer having a thickness of from 5 $\mu$m to 1 mm;
(B) a metallic layer having a thickness of from 5 $\mu$m to 1 mm; and
(C) an inorganic filler-containing thermoplastic resin layer having a thickness of from 500 $\mu$m to 15 mm and an inorganic filler content of from 10 to 80% by weight.

20. A reflector for a circular polarization antenna as in claim 19,
wherein said coating layer (A) is one having a thickness of from 10 $\mu$m to 0.5 mm;
wherein said metallic layer (B) is one having a thickness of from 5 to 500 $\mu$m; and
wherein said inorganic filler-containing thermoplastic resin layer (C) is one having a thickness of from 1 to 10 mm and an inorganic filler content of from 10 to 70% by weight.

21. A reflector for a circular polarization antenna as in claim 20, wherein
layer (A) comprises a coating layer formed by a paint selected from the group consisting of (1) an unsaturated or saturated polyester resin-based paint, (2) a polyurethane resin-based paint prepared by reacting polyester polyol, polyether polyol, or polyurethane polyol with diisocyanates, (3) an aminoalkyd resin-based paint, (4) an acryl resin-based paint, (5) a melamine resin-based paint, (6) an epoxy resin-based paint, (7) a silicone resin-based paint, (8) a vinyl chloride resin-based paint, (9) an acrylurethane resin-based paint, (10) an amide resin-based paint, and (11) a fluorine-containing resin-based paint;
layer (B) is formed of a member selected from the group consisting of aluminum, iron, nickel, copper, zinc, silver, and an alloy composed mainly of said metals; and
the inorganic filler-containing thermoplastic resin layer (C) comprises a thermoplastic resin selected from the group consisting of (1) an olefin polymer, (2) a polyamide resin, (3) a polycarbonate resin, (4) a styrene polymer, (5) an impact resistant resin comprising chlorinated polyethylene and a chlorinated polyethylene produced by graft polymerization of styrene and at least one other vinyl compound, (6) an impact resistant resin prepared by graft polymerization of at least one vinyl compound selected from the group consisting of styrene, acrylonitrile, and methyl methacrylate onto at least one rubber selected from the group consisting of butadiene rubber, acrylate rubber, and ethylene/propylene rubber, (7) a phenylene oxide polymer, (8) a methyl methacrylate polymer, (9) an aromatic polyester, (10) an oxymethylene polymer, and (11) a vinyl chloride polymer.

22. A reflector for a circular polarization antenna as in claim 19,
wherein said coating layer (A) is one having a thickness of 10 μm to 0.3 mm;
wherein said metallic layer (B) is one having a thickness of from 10 to 500 μm; and
wherein said inorganic filler-containing thermoplastic resin layer (C) is one having a thickness of from 1 to 7 mm and an inorganic filler content of from 10 to 60% by weight.

23. A reflector for a circular polarization antenna as in claim 19, wherein
layer (A) comprises a coating layer formed by a paint selected from the group consisting of (1) an unsaturated or saturated polyester resin-based paint, (2) a polyurethane resin-based paint prepared by reacting a member selected from the group consisting of polyester polyol, polyether polyol, and polyurethane polyol with diisocyanates, (3) an aminoalkyd resin-based paint, (4) an acryl resin-based paint, (5) a melamine resin-based paint, (6) an epoxy resin-based paint, (7) a silicone resin-based paint, (8) a vinyl chloride resin-based paint, (9) an acrylurethane resin-based paint, (10) an amide resin-based paint, and (11) a fluorine-containing resin-based paint;
layer (B) is formed of a member selected from the group consisting of aluminum, iron, nickel, copper, zinc, silver, and an alloy composed mainly of said metals; and
the inorganic filler-containing thermoplastic resin layer (C) comprises a thermoplastic resin selected from the group consisting of (1) an olefin polymer, (2) a polyamide resin, (3) a polycarbonate resin, (4) a styrene polymer, (5) an impact resistant resin comprising chlorinated polyethylene and a chlorinated polyethylene produced by graft polymerization of styrene and at least one other vinyl compound, (6) an impact resistant resin prepared by graft polymerization of at least one vinyl compound selected from the group consisting of styrene, acrylonitrile, and methyl methacrylate onto at least one rubber selected from the group consisting of butadiene rubber, acrylate rubber, and ethylene/propylene rubber, (7) a phenylene oxide polymer, (8) a methyl methacrylate polymer, (9) an aromatic polyester, (10) an oxymethylene polymer, and (11) a vinyl chloride polymer.

24. A reflector for a circular polarization antenna as in claim 23, additionally comprising a first primer layer between the coating layer (A) and the metallic layer (B), and a second primer layer between the metallic layer (B) and the inorganic filler-containing thermoplastic resin layer (C).

25. A reflector for a circular polarization antenna as in claim 23, wherein the inorganic filler-containing thermoplastic resin layer (C) comprises an expanded olefin polymer layer comprising a core layer and a skin layer on the sides of said core layer, said skin layers being a substantially unexpanded layer and said core layer being an expanded layer.

26. A reflector for a circular polarization antenna as in claim 1, wherein
layer (A) comprises a coating layer formed by a paint having good weather resistance selected from the group consisting of (1) a polyurethane resin-based paint, (2) an acryl resin-based paint, (3) an epoxy resin-based paint, (4) a silicone resin-based paint, (5) an aminoalkyd resin-based paint, and (6) a vinylidene fluoride resin-based paint;
layer (B) is formed of a member selected from the group consisting of aluminum, copper, silver, and an alloy composed mainly of said metals; and
the inorganic filler-containing thermoplastic resin layer (C) comprises a thermoplastic resin selected from the group consisting of (1) an olefin polymer, (2) a polyamide resin, (3) an impact resistant resin comprising chlorinated polyethylene and a chlorinated polyethylene produced by graft polymerization of styrene and at least one other vinyl compound, (4) an impact resistant resin prepared by graft polymerization of at least one vinyl compound selected from the group consisting of styrene, acrylonitrile, and methyl methacrylate onto at least one rubber selected from the group consisting of butadiene rubber, acrylate, rubber, and ethylene/propylene rubber, (5) a phenylene oxide polymer, (6) a polycarbonate resin, and (7) an aromatic polyester resin.

27. A reflector for a circular polarization antenna as in claim 26, additionally comprising a first primer layer between the coating layer (A) and the metallic layer (B), and a second primer layer between the metallic layer (B) and the inorganic filler-containing thermoplastic resin layer (C).

28. A reflector for a circular polarization antenna as in claim 27, wherein the inorganic filler-containing thermoplastic resin layer (C) comprises an expanded olefin polymer layer comprising a core layer and a skin layer on the sides of said core layer, said skin layers being a substantially unexpanded layer and said core layer being an expanded layer.

29. A reflector for a circular polarization antenna as in claim 26, wherein the inorganic filler-containing thermoplastic resin layer (C) comprises an expanded olefin polymer layer comprising a core layer and a skin layer on the sides of said core layer, said skin layers being a substantially unexpanded layer and said core layer being an expanded layer.

30. A reflector for a circular polarization antenna as in claim 19, additionally comprising a first primer layer between the coating layer (A) and the metallic layer (B), and a second primer layer between the metallic layer (B) and the inorganic filler-containing thermoplastic resin layer (C).

31. A reflector for a circular polarization antenna as in claim 19, wherein the inorganic filler-containing thermoplastic resin layer (C) comprises an expanded olefin polymer layer comprising a core layer and a skin layer on the sides of said core layer, said skin layers being a substantially unexpanded layer and said core layer being an expanded layer.

32. A reflector for a circular polarization antenna as in claim 19, wherein said inorganic filler-containing thermoplastic resin layer (C) contains an inorganic filler selected from the group consisting of aluminum, copper, iron, lead, nickel, magnesium, calcium, barium, zinc, zirconium, molybdenum, silicon, antimony, titanium, aluminum oxide, aluminum oxide hydrates, calcium oxide, magnesium oxide, magnesium hydroxide, zinc oxide, lead oxide, magnesium carbonate, calcium carbonate, basic magnesium carbonate, white carbon, asbestos, mica, talc, glass fiber, glass powder, glass beads, clay, diatomaceous earth, silica, wollastonite, iron oxide, antimony oxide, titanium oxide, lithopone, pumice powder, aluminum sulfate, zirconium carbonate, zirconium oxide, barrium carbonate, dolomite, molybdenum disulfide, and iron sand.

33. A reflector for a circular polarization antenna as in claim 32, wherein said inorganic filler is selected from the group consisting of mica, talc, calcium carbonate, glass fiber and wollastonite.

34. A reflector for a circular polarization antenna as in claim 33, wherein said inorganic filler is talc, mica or glass fiber.

35. A reflector for a circular polarization antenna as in claim 19, wherein said inorganic filler-containing thermoplastic resin layer (C) contains an inorganic filler selected from the group consisting of a powdered filler having a diameter of 1 mm or less, a fibrous filler having a diameter of from 1 to 500 $\mu$m and a length of from 0.1 to 6 mm, and a plate-shaped filler having a diameter of 2 mm or less.

36. A reflector for a circular polarization antenna as in claim 19, wherein said reflector is produced by insert injection molding.

37. A reflector for a circular polarization antenna as in claim 36, wherein said insert injection molding comprises laminating the metallic layer (B) with said coating layer (A), placing said laminated metallic layer between a male mold and a female mold in a manner such that said coating layer (A) is in contact with the male mold, closing the mold, and then injecting into the mold an inorganic filler-containing thermoplastic resin to form said inorganic filler-containing thermoplastic resin layer (C).

* * * * *